US012570858B2

(12) United States Patent
Urakawa et al.

(10) Patent No.: US 12,570,858 B2
(45) Date of Patent: Mar. 10, 2026

(54) CURABLE COMPOSITION, CURED PRODUCT, CURED FILM, DISPLAY PANEL, AND METHOD FOR PRODUCING CURED FILM

(71) Applicant: TOKYO OHKA KOGYO CO., LTD., Kawasaki (JP)

(72) Inventors: Kazuki Urakawa, Kawasaki (JP); Dai Shiota, Kawasaki (JP)

(73) Assignee: TOKYO OHKA KOGYO CO., LTD., Kawasaki (JP)

( * ) Notice: Subject to any disclaimer, the term of this patent is extended or adjusted under 35 U.S.C. 154(b) by 18 days.

(21) Appl. No.: 17/816,168

(22) Filed: Jul. 29, 2022

(65) Prior Publication Data

US 2023/0099775 A1 Mar. 30, 2023

(30) Foreign Application Priority Data

Aug. 6, 2021 (JP) ................................ 2021-130257

(51) Int. Cl.
*C09D 4/00* (2006.01)
*C08K 3/22* (2006.01)

(52) U.S. Cl.
CPC ........ *C09D 4/00* (2013.01); *C08K 2003/2241* (2013.01); *C08K 2201/005* (2013.01)

(58) Field of Classification Search
CPC .................................. C09D 4/00; C09C 1/48
See application file for complete search history.

(56) References Cited

U.S. PATENT DOCUMENTS

2018/0334533 A1 11/2018 Someya et al.
2020/0139433 A1* 5/2020 Matsumoto .............. C09C 1/48

FOREIGN PATENT DOCUMENTS

| | | | |
|---|---|---|---|
| CN | 108957952 A | 12/2018 |
| JP | 2005-283905 A | 10/2005 |
| JP | 2009-298995 A | 12/2009 |
| JP | 2010-241985 A | 10/2010 |
| WO | WO 2021/065796 A1 | 4/2021 |

* cited by examiner

*Primary Examiner* — Dah-Wei D. Yuan
*Assistant Examiner* — Andrew J Bowman
(74) *Attorney, Agent, or Firm* — Knobbe, Martens, Olson & Bear, LLP

(57) ABSTRACT

A curable composition capable of forming a cured product having a high transparency, a resistance to loss of transparency when heated, and an excellent organic solvent resistance, a cured product of the curable composition, and a method for producing a cured film using the curable composition. A polymerizable fluorene compound having a radical polymerizable group-containing group or a cationic polymerizable group-containing group and a fluorene skeleton as a polymerizable compound, and thermal initiator as an initiator are used in a curable composition including a polymerizable compound, metal oxide microparticles (B) including titanium oxide microparticles, an initiator, and a solvent.

8 Claims, No Drawings

CURABLE COMPOSITION, CURED PRODUCT, CURED FILM, DISPLAY PANEL, AND METHOD FOR PRODUCING CURED FILM

BACKGROUND OF THE INVENTION

Field of the Invention

The present invention relates to a curable composition including a polymerizable compound (A), metal oxide microparticles (B), an initiator (C), and a solvent (S), a cured product of the curable composition, and a method for producing a cured film using the above-mentioned curable composition.

Related Art

Heretofore, a curable composition containing, as a curable component, a cationic polymerizable compound such as an epoxy compound and a radical polymerizable compound having a (meth)acryloyl group has been used in various application.

There has been known, as a cationic polymerizable curable composition, a curable composition containing fluorene derivatives having a specific structure as a photocationic polymerizable compound (see Patent Document 1). Use of the curable composition mentioned in Patent Document 1 enables formation of a cured product having high refractive index.

Patent Document 1: Japanese Unexamined Patent Application, Publication No. 2005-283905

SUMMARY OF THE INVENTION

As mentioned above, use of the curable composition mentioned in Patent Document 1 enables formation of a cured product having high refractive index. However, a material having high refractive index is required to achieve higher refractive index. For example, it can be expected that higher refractive index of a cured product is achieved by mixing an inorganic filler such as titanium oxide microparticles used for achieving high refractive index in the curable composition mentioned in Patent Document 1. However, inclusion of titanium oxide microparticles in the curable composition has a problem that a formation of a cured product having a high transparency, a resistance to loss of transparency when heated, and an excellent organic solvent resistance is difficult.

In light of the above problems, the present invention has been made and an object thereof is to provide a curable composition capable of forming a cured product having a high transparency, a resistance to loss of transparency when heated, and an excellent organic solvent resistance, a cured product of the curable composition, and a method for producing a cured film using the above-mentioned curable composition.

The present inventors have found that the above problems can be solved by using a polymerizable fluorene compound (A1) having a radical polymerizable group-containing group or a cationic polymerizable group-containing group and a fluorene skeleton as a polymerizable compound (A), and thermal initiator (C1) as an initiator (C) in a curable composition including a polymerizable compound (A), metal oxide microparticles (B) including titanium oxide microparticles (B1), an initiator (C), and a solvent (S). Thus, the present invention has been completed. Specifically, the present invention provides the followings.

A first aspect of the present invention is directed to a curable composition including a polymerizable compound (A), metal oxide microparticles (B), an initiator (C), and a solvent (S), in which the polymerizable compound (A) includes a polymerizable fluorene compound (A1) having a radical polymerizable group-containing group or a cationic polymerizable group-containing group and a fluorene skeleton, metal oxide microparticles (B) includes titanium oxide microparticles (B1), and the initiator (C) includes a thermal initiator (C1).

A second aspect of the present invention is directed to a cured product of the curable composition according to the first aspect.

A third aspect of the present invention is directed to a method for forming a cured film including:

applying the curable composition according to the first aspect onto a substrate to form a coating film, and heating the coating film.

According to the present invention, it is possible to provide a curable composition capable of forming a cured product having a high transparency, a resistance to loss of transparency when heated, and an excellent organic solvent resistance, a cured product of the curable composition, and a method for producing a cured film using the above-mentioned curable composition.

DETAILED DESCRIPTION OF THE INVENTION

<<Curable Composition>>

A curable composition includes a polymerizable compound (A), metal oxide microparticles (B), an initiator (C), and a solvent (S). The polymerizable compound (A) includes a polymerizable fluorene compound (A1) having a radical polymerizable group-containing group or a cationic polymerizable group-containing group and a fluorene skeleton. The metal oxide microparticles (B) includes titanium oxide microparticles (B1). The initiator (C) includes a thermal initiator (C1). By using the above-described curable composition, a cured product having a high transparency, a resistance to loss of transparency when heated, and an excellent organic solvent resistance can be formed.

Essential or optional components included in the curable composition will be described below.

<Polymerizable Compound (A)>

As described above, the polymerizable compound (A) includes the polymerizable fluorene compound (A1) having a radical polymerizable group-containing group or a cationic polymerizable group-containing group and a fluorene skeleton. The polymerizable compound (A) may include other polymerizable compound (A2) having a radical polymerizable group-containing group or a cationic polymerizable group-containing group and not corresponding to the polymerizable fluorene compound (A1).

In view of high transparency of the cured product, a ratio of a mass of the polymerizable fluorene compound (A1) is preferably 50% by mass or more, more preferably 70% by mass or more, further preferably 80% by mass or more, still more preferably 90% by mass or more, particularly preferably 95% by mass or more, and most preferably 100% by mass, relative to a mass of the polymerizable compound (A).

[Polymerizable Fluorene Compound (A1)]

The polymerizable fluorene compound (A1) has a radical polymerizable group-containing group or a cationic polymerizable group-containing group, and a fluorene skeleton.

As the radical polymerizable group-containing group, typically, a group having an ethylenically unsaturated double bond is exemplified. As the ethylenically unsaturated double bond-containing group, an alkenyl group-containing group containing an alkenyl group such as a vinyl group or an allyl group is preferred, and a (meth)acryloyl group is more preferred. Typically, an epoxy group-containing group, an episulfide group-containing group, an oxetanyl group-containing group, a vinyloxy group-containing group, and the like are exemplified as the cationic polymerizable group. Among these, the epoxy group-containing group and the vinyloxy group-containing group are preferred. As the epoxy group-containing group, an alicyclic epoxy group-containing group and a glycidyl group are preferred. The alicyclic epoxy group is an alicyclic group in which two carbon atoms as ring-constituting atoms of adjacent positions on the alicyclic group bond with each other via an oxygen atom. In other words, the alicyclic epoxy group includes a three-membered ring composed of two carbon atoms and one oxygen atom on an aliphatic ring.

In the description and claims of the present application, (meth)acryl means both acryl and methacryl, (meth)acryloyl means both acryloyl and methacryloyl, and (meth)acrylate means both acrylate and methacrylate.

A number of the radical polymerizable group-containing group or the cationic polymerizable group-containing group in the polymerizable fluorene compound (A1) is not particularly limited. Typically, the number of the radical polymerizable group-containing group or the cationic polymerizable group-containing group in the polymerizable fluorene compound (A1) is preferably 1 or more and 4 or less, more preferably 2 or more and 4 or less, and particularly preferably 2.

In the description, when the polymerizable fluorene compound (A1) has a polycyclic skeleton in which one or more other rings are fused to the fluorene ring, the polymerizable fluorene compound (A1) is also understood to have a fluorene skeleton. Examples of other rings includes a benzene ring, a cyclopentane ring, a cyclohexane ring, and the like.

In view of ease of synthesis and availability, good polymerization reactivity, and ease of obtaining the cured product with high refractive index, a compound represented by the following formula (a1) is preferred as the polymerizable fluorene compound (A1). The cured product with high refractive index is easily formed by using the polymerizable fluorene compound (A1) represented by the following formula (a1) and the metal oxide microparticles (B) described below in combination.

(a1)

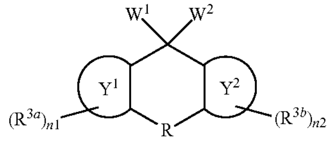

wherein, in the formula (a1), $W^1$ and $W^2$ each independently represent a group represented by the following formula (a2):

(a2)

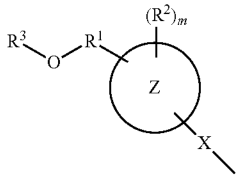

wherein, in the formula (a2), a ring Z represents an aromatic hydrocarbon ring, X represents a single bond or a group represented by —S—, $R^1$ represents a single bond, an alkylene group having 1 or more and 4 or less carbon atoms, or an alkyleneoxy group having 1 or more and 4 or less carbon atoms, and when $R^1$ is an alkyleneoxy group, the oxygen atom in the alkyleneoxy group is bonded with a ring Z, $R^2$ represents a monovalent hydrocarbon group, a hydroxy group, a group represented by —$OR^{4a}$, a group represented by —$SR^{4b}$, an acyl group, an alkoxycarbonyl group, a halogen atom, a nitro group, a cyano group, a mercapto group, a carboxy group, an amino group, a carbamoyl group, a group represented by —$NHR^{4c}$, a group represented by —$N(R^{4d})_2$, a sulfo group, or a group in which at least a part of hydrogen atoms bonded to the carbon atom included in a monovalent hydrocarbon group, a group represented by —$OR^{4a}$, a group represented by —$SR^{4b}$, an acyl group, an alkoxycarbonyl group, a group represented by —$NHR^{4c}$, or a group represented by —$N(R^{4d})_2$ is/are substituted with a monovalent hydrocarbon group, a hydroxy group, a group represented by —$OR^{4a}$, a group represented by —$SR^{4b}$, an acyl group, an alkoxycarbonyl group, a halogen atom, a nitro group, a cyano group, a mercapto group, a carboxyl group, an amino group, a carbamoyl group, a group represented by —$NHR^{4c}$, a group represented by —$N(R^{4d})_2$, a mesyloxy group, or a sulfo group, $R^{4a}$ to $R^{4d}$ independently represent a monovalent hydrocarbon group, m represents an integer of 0 or more, $R^3$ represents a hydrogen atom, a vinyl group, a thiiran-2-ylmethyl group, a glycidyl group, or a (meth)acryloyl group, both $W^1$ and $W^2$ do not have a hydrogen atom as $R^3$, a ring $Y^1$ and a ring $Y^2$ represent the same or different aromatic hydrocarbon ring, R represents a single bond, an optionally substituted methylene group, an ethylene group which is optionally substituent and includes a heteroatom between two carbon atoms, a group represented by —O—, a group represented by —NH—, or a group represented by —S—, $R^{3a}$ and $R^{3b}$ independently represent a cyano group, a halogen atom, or a monovalent hydrocarbon group, and n1 and n2 independently represent an integer of 0 or more and 4 or less.

In the formula (a2), examples of the ring Z include a benzene ring, a fused polycyclic aromatic hydrocarbon ring [for example, a fused di- to tetracyclic aromatic hydrocarbon ring, such as a fused dicyclic hydrocarbon ring (e.g., a $C_{8-20}$ fused dicyclic hydrocarbon ring such as a naphthalene ring, and preferably a $C_{10-16}$ fused dicyclic hydrocarbon ring) or a fused tricyclic aromatic hydrocarbon ring (e.g., an anthracene ring, a phenanthrene ring, etc.)], and the like. The ring Z is preferably a benzene ring or a naphthalene ring, and more preferably a naphthalene ring. $W^1$ and $W^2$ in the formula (a1) each independently represent a group represented by the following formula (a2), so that $W^1$ and $W^2$ each include a ring Z. The ring Z included in $W^1$ and the ring Z included in $W^2$ may be the same or different and, for example, one ring may be a benzene ring and the other ring may be a naphthalene ring, and any of rings is particularly preferably a naphthalene ring.

There is no particular limitation on the substitution position of the ring Z bonded to the carbon atoms, to which both $W^1$ and $W^2$ are directly bonded, via X. For example, when the ring Z is a naphthalene ring, the group corresponding to the ring Z bonded to the carbon atom may be a 1-naphthyl group, a 2-naphthyl group, or the like.

In the formula (a2), X independently represents a single bond, or a group represented by —S—, and typically a single bond.

In the formula (a2), $R^1$ includes, for example, a single bond; an alkylene group having 1 or more and 4 or less carbon atoms, such as a methylene group, an ethylene group, a trimethylene group, a propylene group, or a butane-1,2-diyl group; and a alkyleneoxy group having 1 or more and 4 or less carbon atoms, such as a methyleneoxy group, an ethyleneoxy group, or a propyleneoxy group; and is preferably a single bond; a $C_{2-4}$ alkylene group (particularly, a $C_{2-3}$ alkylene group such as an ethylene group or a propylene group); a $C_{2-4}$ alkyleneoxy group (particularly, a $C_{2-3}$ alkylene group such as an ethyleneoxy group or a propyleneoxy group), and more preferably a single bond. When $R^1$ is an alkyleneoxy group, the oxygen atom in the alkyleneoxy group is bonded with the ring Z. $W^1$ and $W^2$ in the formula (a1) each independently represent a group represented by the following formula (a2), so that $W^1$ and $W^2$ each contain $R^1$ as a divalent group. $R^1$ included in $W^1$ and $R^1$ included in $W^2$ may be the same or different.

In the formula (a2), an examples of $R^2$ include a monovalent hydrocarbon group such as an alkyl group (e.g., a $C_{1-12}$ alkyl group such as a methyl group, an ethyl group, a propyl group, an isopropyl group, or a butyl group, preferably a $C_{1-8}$ alkyl group, and more preferably a $C_{1-6}$ alkyl group), an cycloalkyl group (a $C_{5-10}$ cycloalkyl group such as a cyclohexyl group, preferably a $C_{5-8}$ cycloalkyl group, and more preferably a $C_{5-6}$ cycloalkyl group), an aryl group (e.g., a $C_{6-14}$ aryl group such as a phenyl group, a tolyl group, a xylyl group, or a naphthyl group, preferably a $C_{6-10}$ aryl group, and more preferably a $C_{6-2}$ aryl group), and an aralkyl group (a $C_{6-10}$ aryl-$C_{1-4}$ alkyl group such as a benzyl group or an phenethyl group); a hydroxy group; a group represented by —$OR^{4a}$ [wherein $R^{4a}$ represents a monovalent hydrocarbon group (the above-mentioned monovalent hydrocarbon group, etc.)] such as an alkoxy group (a $C_{1-12}$ alkoxy group such as a methoxy group, an ethoxy group, a propoxy group, or a butoxy group, preferably a $C_{1-8}$ alkoxy group, and more preferably a $C_{1-6}$ alkoxy group), a cycloalkoxy group (a $C_{5-10}$ cycloalkoxy group such as a cyclohexyloxy group), an aryloxy group (a $C_{6-10}$ aryloxy group such as a phenoxy group), or an aralkyloxy group (e.g., a $C_{6-10}$ aryl-$C_{1-4}$ alkyloxy group such as a benzyloxy group); a group represented by —$SR^{4b}$ [wherein $R^{4b}$ represents a monovalent hydrocarbon group (the above-mentioned monovalent hydrocarbon group, etc.)] such as an alkylthio group (a $C_{1-12}$ alkylthio group such as a methylthio group, an ethylthio group, a propylthio group, or a butylthio group, preferably a $C_{1-8}$ alkylthio group, and more preferably a $C_{1-6}$ alkylthio group), a cycloalkylthio group (a $C_{5-10}$ cycloalkylthio group such as a cyclohexylthio group), an arylthio group (a $C_{6-10}$ arylthio group such as a phenylthio group), an aralkylthio group (e.g., a $C_{6-10}$ aryl-$C_{1-4}$ alkylthio group such as a benzylthio group); an acyl group (a $C_{1-6}$ acyl group such as an acetyl group); an alkoxycarbonyl group (a $C_{1-4}$ alkoxy-carbonyl group such as a methoxycarbonyl group); a halogen atom (a fluorine atom, a chlorine atom, a bromine atom, an iodine atom, etc.); a nitro group; a cyano group; a mercapto group; a carboxyl group; an amino group; a carbamoyl group; a group represented by —$NHR^{4c}$ [wherein Roc represents a monovalent hydrocarbon group (the above-mentioned monovalent hydrocarbon group)] such as an alkylamino group (a $C_{1-12}$ alkylamino group such as a methylamino group, an ethylamino group, a propylamino group, or a butylamino group, preferably a $C_{1-8}$ alkylamino group, and more preferably a $C_{1-6}$ alkylamino group), an cycloalkylamino group (a $C_{5-10}$ cycloalkylamino group such as a cyclohexylamino group), an arylamino group (a $C_{6-10}$ arylamino group such as a phenylamino group), or an aralkylamino group (e.g., a $C_{6-10}$ aryl-$C_{1-4}$ alkylamino group such as a benzylamino group); a group represented by —$N(R^{4d})_2$ [wherein $R^{4d}$ independently represents a monovalent hydrocarbon group (the above-mentioned monovalent hydrocarbon group, etc.)] such as a dialkylamino group (a di($C_{1-12}$ alkyl)amino group such as a dimethylamino group, a diethylamino group, a dipropylamino group, or a dibutylamino group, preferably a di($C_{1-8}$ alkyl)amino group, and more preferably a di($C_{1-6}$ alkyl) amino group), a dicycloalkylamino group (a di($C_{5-10}$ cycloalkyl)amino group such as a dicyclohexylamino group), a diarylamino group (a di($C_{6-10}$ aryl)amino group such as a diphenylamino group), or a diaralkylamino group (e.g., a di($C_{6-10}$ aryl-$C_{1-4}$ alkyl)amino group such as a dibenzylamino group); a (meth)acryloyloxy group; a sulfo group; and a group in which at least a part of hydrogen atoms bonded to the carbon atom included in the monovalent hydrocarbon group, a group represented by —$OR^{4a}$, a group represented by —$SR^{4b}$, an acyl group, an alkoxycarbonyl group, a group represented by —$NHR^{4c}$, or a group represented by —$N(R^{4d})_2$ is/are substituted with the monovalent hydrocarbon group, a hydroxy group, a group represented by —$OR^{4a}$, a group represented by —$SR^{4b}$, an acyl group, an alkoxycarbonyl group, a halogen atom, a nitro group, a cyano group, a mercapto group, a carboxyl group, an amino group, a carbamoyl group, a group represented by —$NHR^{4c}$, a group represented by —$N(R^{4d})_2$, a (meth)acryloyloxy group, a mesyloxy group, or a sulfo group [for example, an alkoxyaryl group (e.g., a $C_{1-4}$ alkoxy $C_{6-10}$ aryl group such as a methoxyphenyl group), an alkoxycarbonylaryl group (e.g., a $C_{1-4}$ alkoxy-carbonyl $C_{6-10}$ aryl group such as a methoxycarbonylphenyl group or an ethoxycarbonylphenyl group)], and the like.

Among these, $R^2$ may be typically a monovalent hydrocarbon group, a group represented by —$OR^{4a}$, a group represented by —$SR^{4b}$, an acyl group, an alkoxycarbonyl group, a halogen atom, a nitro group, a cyano group, a group represented by —$NHR^{4c}$, a group represented by —$N(R^{4d})_2$, or the like.

Examples of preferred $R^2$ include a monovalent hydrocarbon group [for example, an alkyl group (e.g., a $C_{1-6}$ alkyl group), a cycloalkyl group (e.g., a $C_{5-8}$ cycloalkyl group), an aryl group (e.g., a $C_{6-10}$ aryl group), an aralkyl group (e.g., a $C_{6-8}$ aryl-$C_{1-2}$ alkyl group), etc.], an alkoxy group (a $C_{1-4}$ alkoxy group, etc.), and the like. Particularly, $R^{2a}$ and $R^{2b}$ are preferably a monovalent hydrocarbon group (particularly, an alkyl group), such as an alkyl group [a $C_{1-4}$ alkyl group (particularly, a methyl group)], or an aryl group [e.g., a $C_{6-10}$ aryl group (particularly, a phenyl group)].

When m is an integer of 2 or more, plural $R^2$(s) may be different or may be the same. $R^2$ included in $W^1$ and $R^2$ included in $W^2$ may be the same or different.

In the formula (a2), the number m of $R^2$ can be selected according to types of the ring Z and may be, for example, 0 or more and 4 or less, preferably 0 or more and 3 or less, and more preferably 0 or more and 2 or less. m in $W^1$ and m in $W^2$ may be the same or different.

In the formula (a3), $R^3$ is a hydrogen atom, a vinyl group, a thiiran-2-ylmethyl group, a glycidyl group, or a (meth) acryloyl group. Both $W^1$ and $W^2$ do not contain a hydrogen atom as $R^3$. Any of a vinyloxy group, a thiiran-2-ylmethyl group, and a glycidyl group is a cationic polymerizable functional group. Therefore, the compound, which is represented by the formula (a1) and has, as $R^3$, a vinyl group, a thiiran-2-ylmethyl group, or a glycidyl group, is a cationic polymerizable compound. Meanwhile, the compound, which is represented by the formula (a1) and has, as $R^3$, a (meth)acryloyl group, is a radical polymerizable compound.

$R^3$ included in $W^1$ and $R^3$ contained in $W^2$ may be the same or different as long as both $R^3$(s) are not hydrogen atoms. Both $R^3$ included in $W^1$ and $R^3$ contained in $W^2$ are preferably a vinyl group, a thiiran-2-ylmethyl group, or a glycidyl group, and more preferably the same group selected from the group consisting of a vinyl group, a thiiran-2-ylmethyl group, and a glycidyl group. Both $R^3$ included in $W^1$ and $R^3$ included in $W^2$ are also preferably (meth)acryloyl groups.

$R^3$ is preferably a vinyl group, a glycidyl group, or a (meth)acryloyl group since it is easy to synthesize and obtain the compound represented by the formula (a1). Since it is possible to decrease types of the component contained in the curable composition, the compound represented by the formula (a1) preferably has only a group selected from a vinyl group, a thiiran-2-ylmethyl group, and a glycidyl group as a reactive group, or only a (meth)acryloyl group as a reactive group.

In the formula (a1), examples of the rings $Y^1$ and $Y^2$ includes a benzene ring and a fused polycyclic aromatic hydrocarbon ring [for example, a fused di- to tetracyclic aromatic hydrocarbon ring, such as a fused dicyclic hydrocarbon ring (e.g., a $C_{8-20}$ fused dicyclic hydrocarbon ring such as a naphthalene ring, and preferably a $C_{10-16}$ fused dicyclic hydrocarbon ring), and a fused tricyclic aromatic hydrocarbon ring (e.g., an anthracene ring, a phenanthrene ring, etc.). The rings $Y^1$ and $Y^2$ are preferably a benzene ring or a naphthalene ring, and more preferably a benzene ring. The rings $Y^1$ ring $Y^2$ may be the same or different and, for example, one ring may be a benzene ring and the other ring may be a naphthalene ring.

In the formula (a1), R represents a single bond, an optionally substituted methylene group, an ethylene group which is optionally substituted and may contain a heteroatom between two carbon atoms, a group represented by —O—, a group represented by —NH—, or a group represented by —S—, and typically a single bond. Examples of the substituent include a cyano group, a halogen atom (a fluorine atom, a chlorine atom, a bromine atom, etc.), a monovalent hydrocarbon group [e.g., an alkyl group (a $C_{1-6}$ alkyl group such as a methyl group, an ethyl group, a propyl group, an isopropyl group, a butyl group, a t-butyl group, etc.), an aryl group (a $C_{6-10}$ aryl group such as a phenyl group), etc.], and the like; and examples of the heteroatom include an oxygen atom, a nitrogen atom, a sulfur atom, a silicon atom, and the like.

In the formula (a1), $R^{3a}$ and $R^{3b}$ usually include non-reactive substituents, for example, a cyano group, a halogen atom (fluorine atom, chlorine atom, bromine atom, etc.), a monovalent hydrocarbon group [e.g., an alkyl group, an aryl group (a $C_{6-10}$ aryl group such as a phenyl group), etc.] and the like, and are preferably a cyano group or an alkyl group, and particularly preferably an alkyl group. Examples of the alkyl group include $C_{1-6}$ alkyl groups (e.g., a $C_{1-4}$ alkyl group, particularly a methyl group) such as a methyl group, an ethyl group, a propyl group, an isopropyl group, a butyl group, and a t-butyl group. When n1 is an integer of 2 or more, $R^{3a}$ may be different or may be the same. When n2 is an integer of 2 or more, $R^{3b}$ may be different or may be the same. $R^{3a}$ and $R^{3b}$ may be the same or different. There is no particular limitation on the bonding position (substitution position) of $R^{3a}$ and $R^{3b}$ on the rings $Y^1$ and $Y^2$. The substitution number n1 and n2 is preferably 0 or 1, and particularly 0.

n1 and n2 may be the same or different with each other.

Of the compounds represented by the formula (a1), particularly preferred specific examples include epoxy group-containing fluorene compounds such as 9,9-bis[4-[2-(glycidyloxy)ethoxy]phenyl]-9H-fluorene, 9,9-bis[4-[2-(glycidyloxy)ethyl]phenyl]-9H-fluorene, 9,9-bis[4-(glycidyloxy)-3-methylphenyl]-9H-fluorene, 9,9-bis[4-(glycidyloxy)-3,5-dimethylphenyl]-9H-fluorene, 9,9-bis(6-glycidyloxynaphthalen-1-yl)-9H-fluorene, and 9,9-bis(5-glycidyloxynaphthalen-2-yl)-9H-fluorene; and compounds represented by the following formulas.

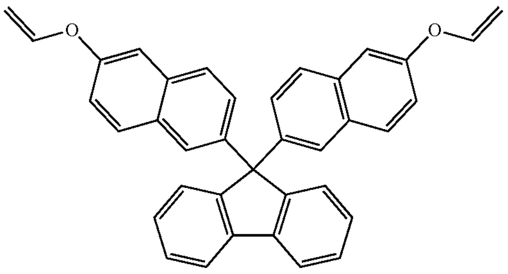

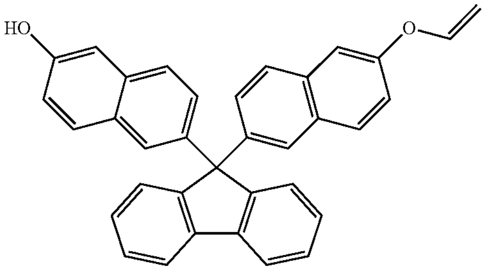

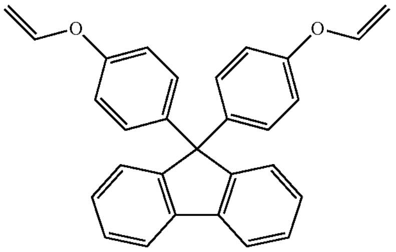

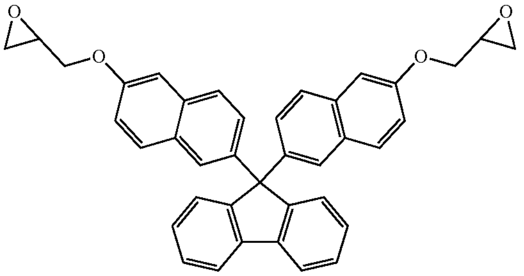

-continued
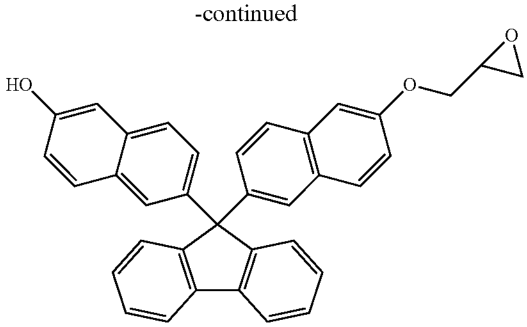
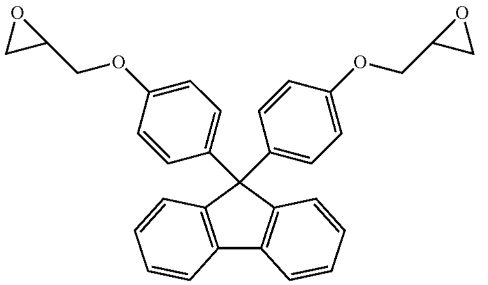
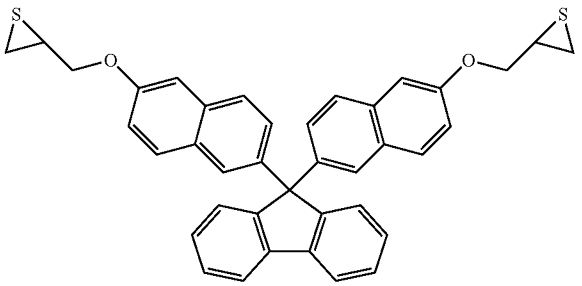
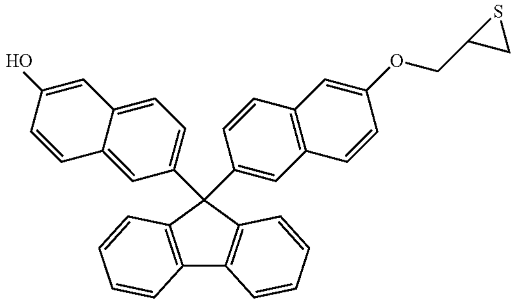
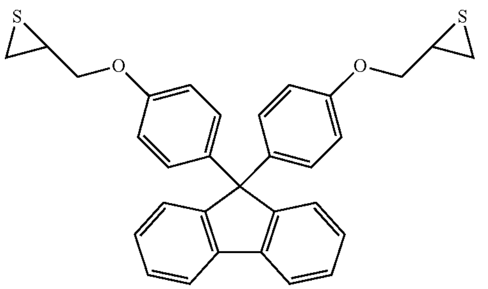 [SMILES: c1ccc2c(c1)-c1ccccc1C2(c1ccc(OCC2CS2)cc1)c1ccc(OCC2CS2)cc1]
-continued
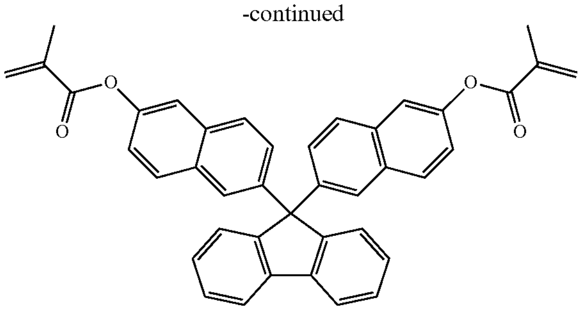
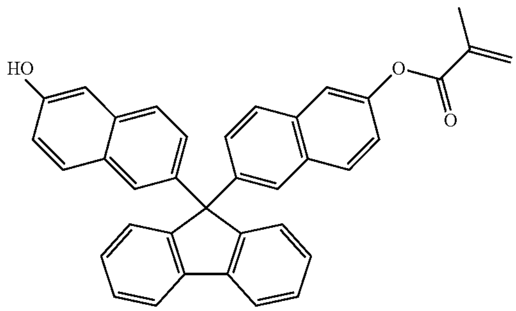
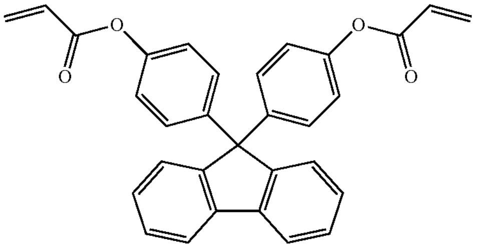
[0039]
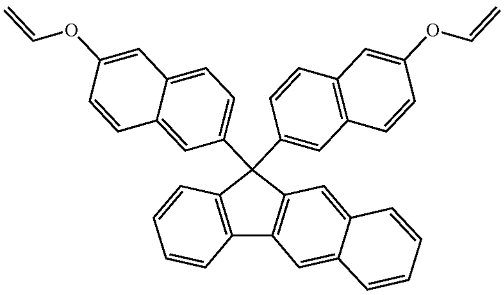
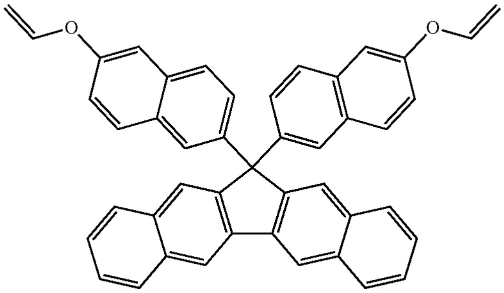

-continued
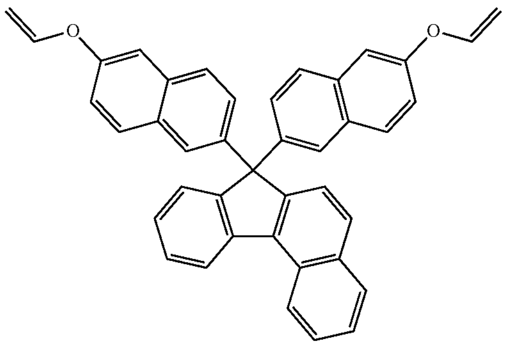
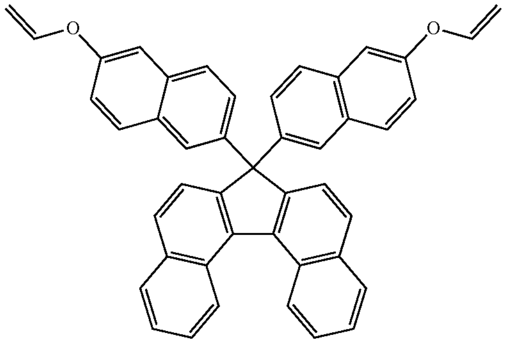
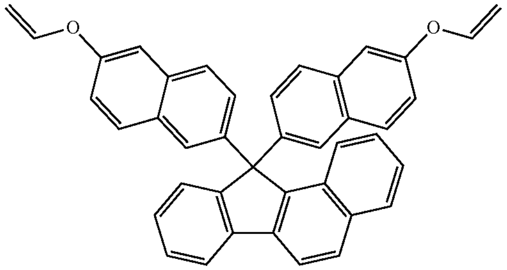
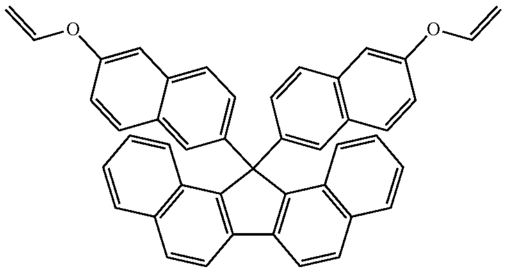
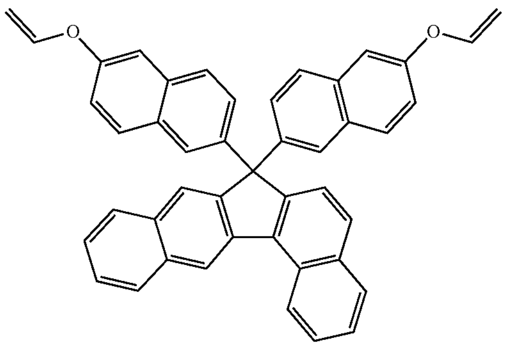
-continued
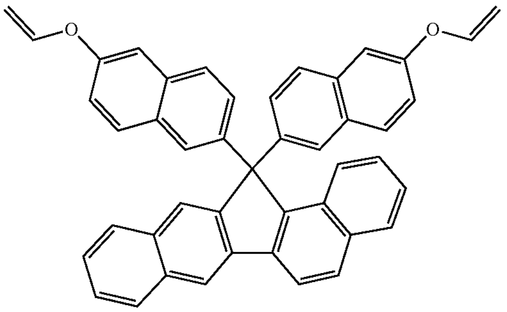
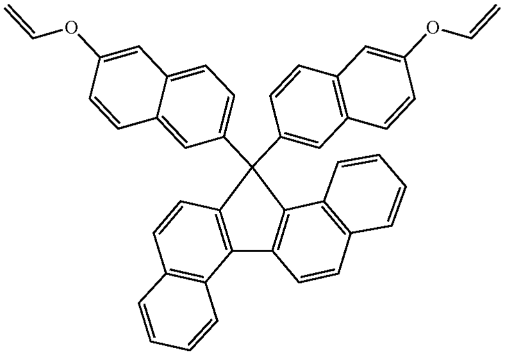
[0040]
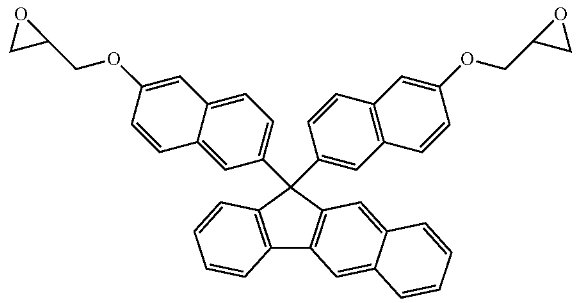
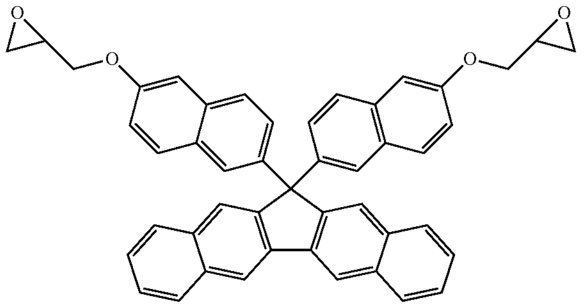
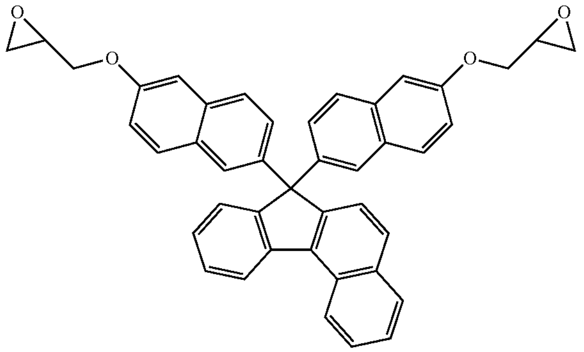

-continued
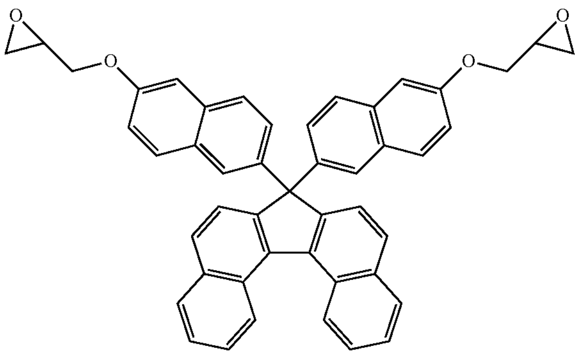
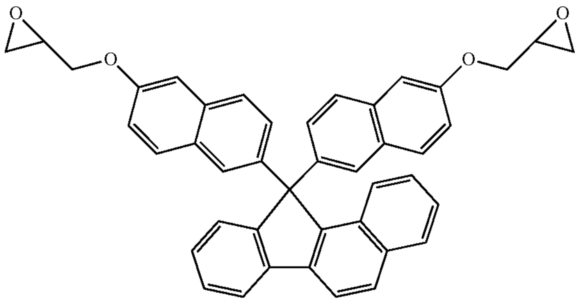
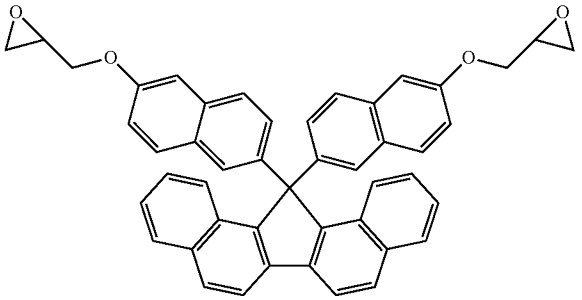
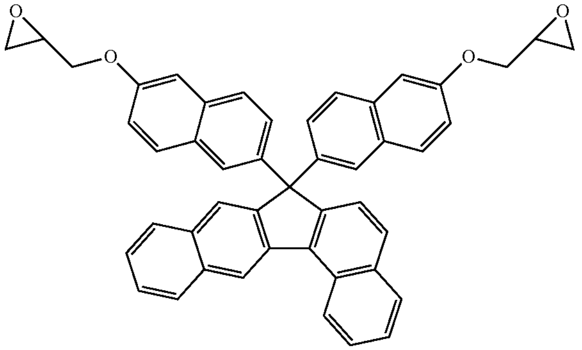
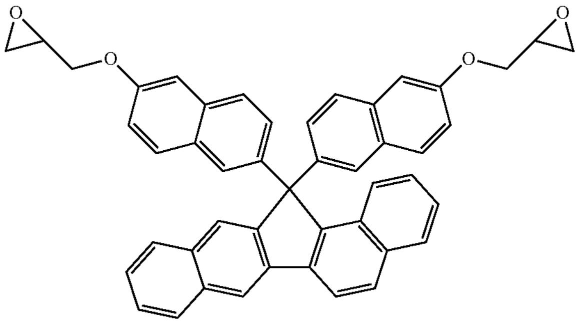
-continued
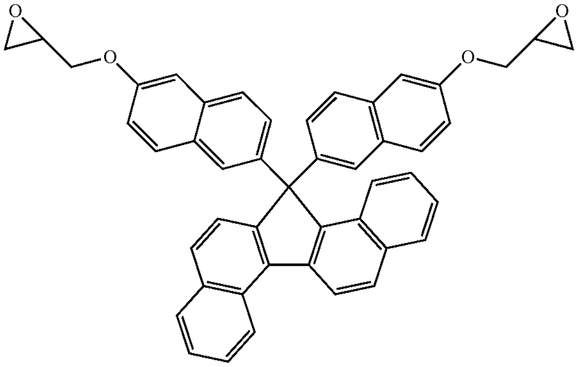
[0045]
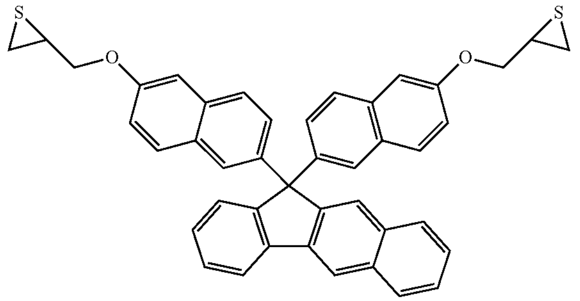
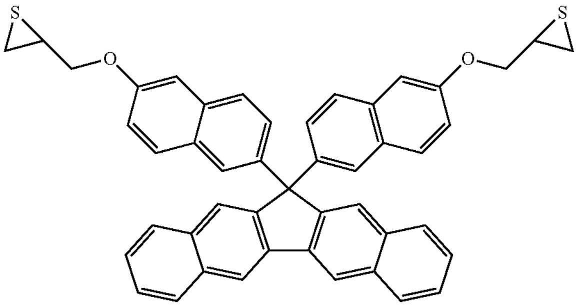
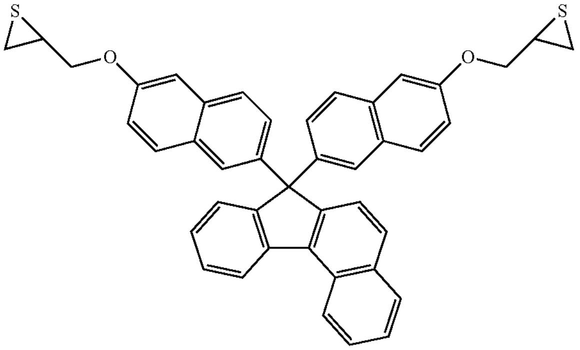
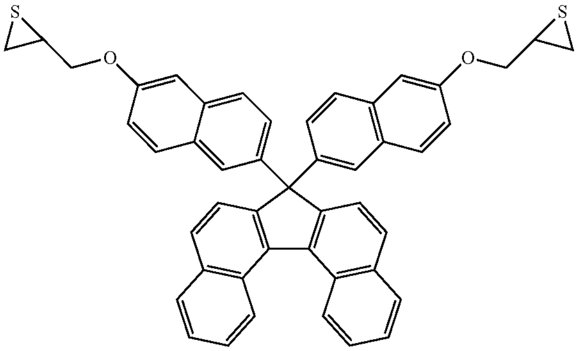

-continued
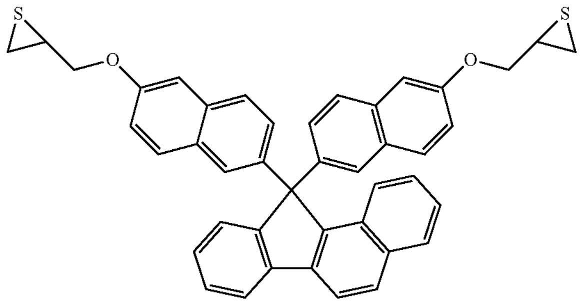
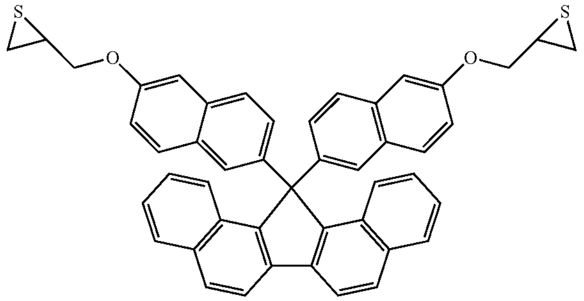
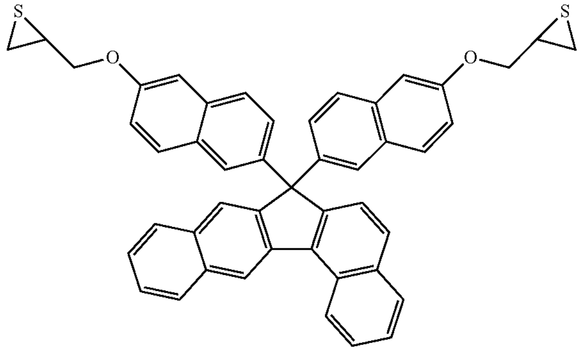
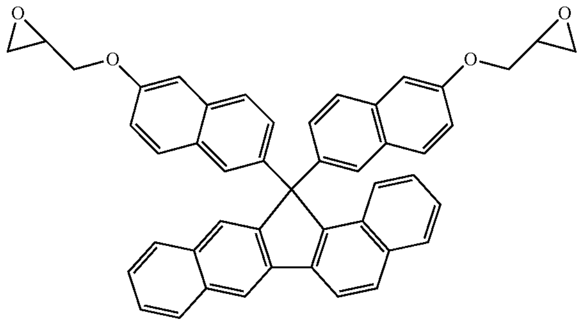
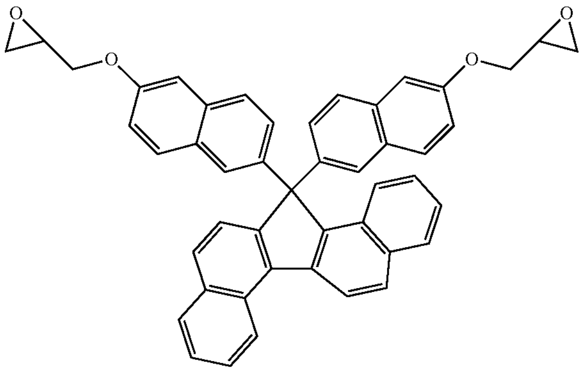
-continued
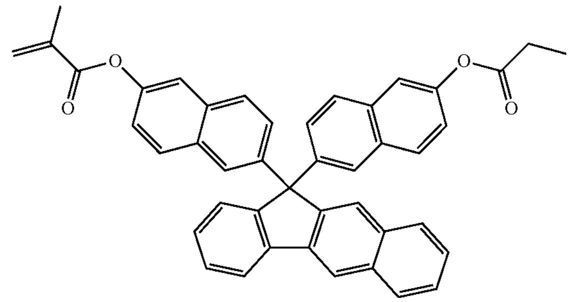
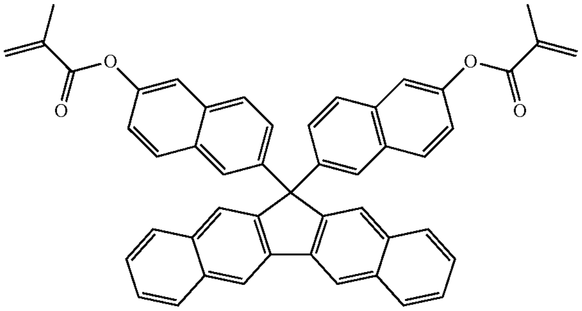
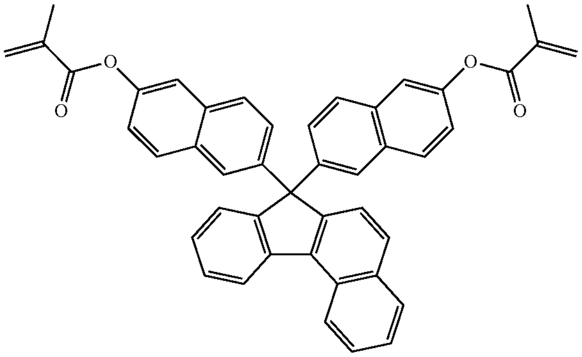
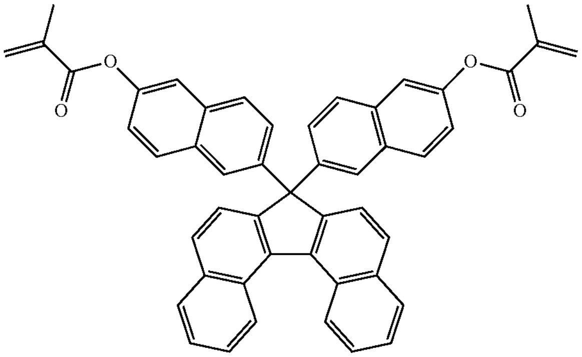
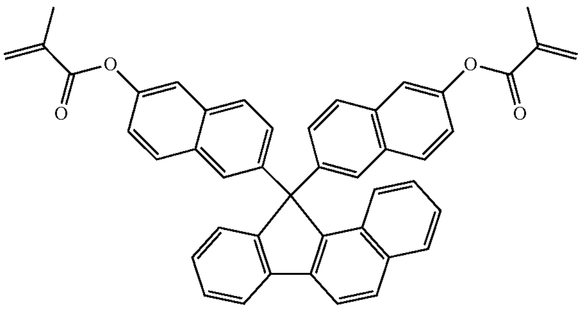

-continued
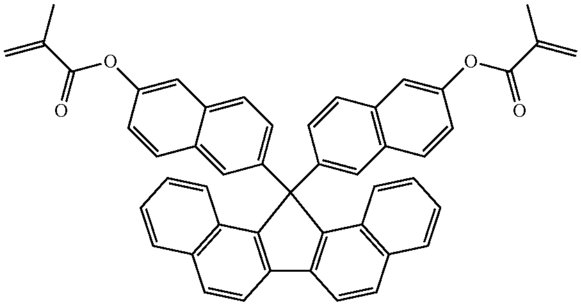
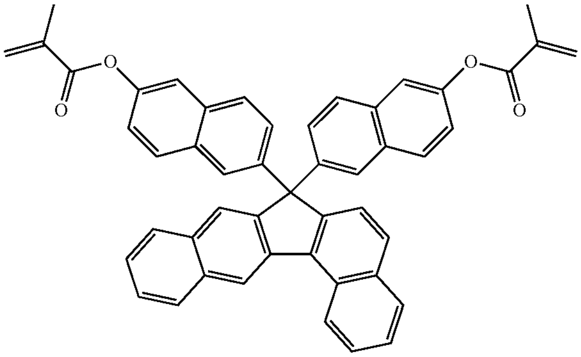
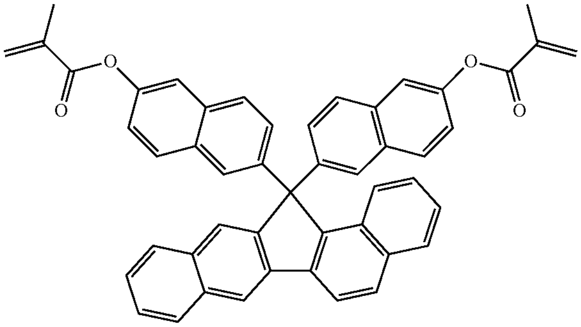
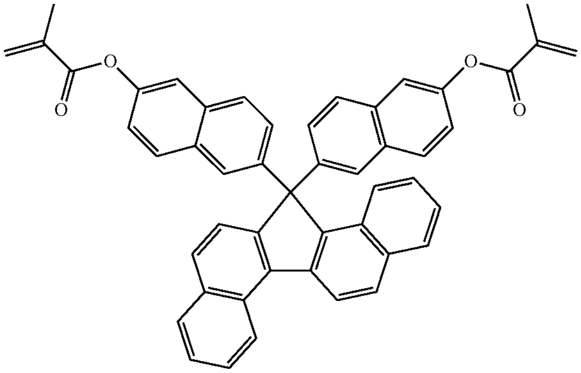
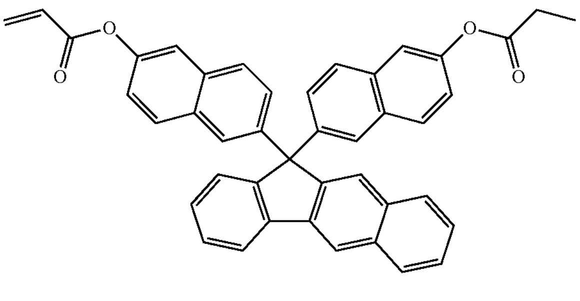
-continued
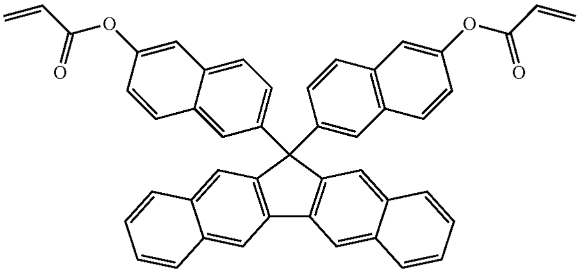
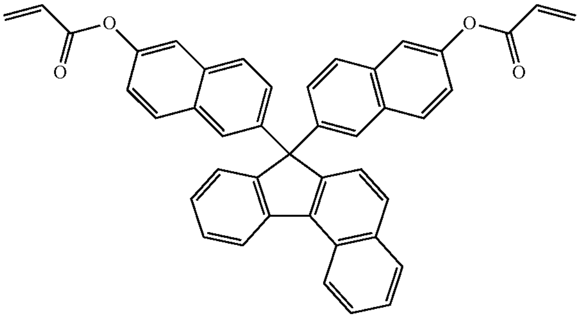
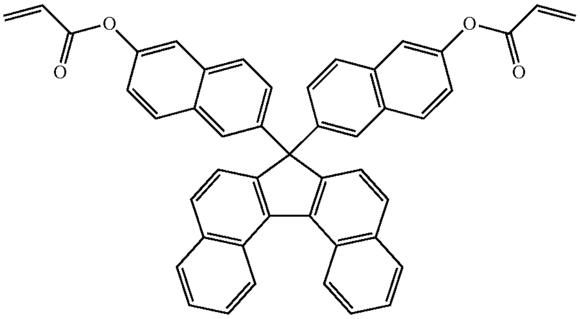
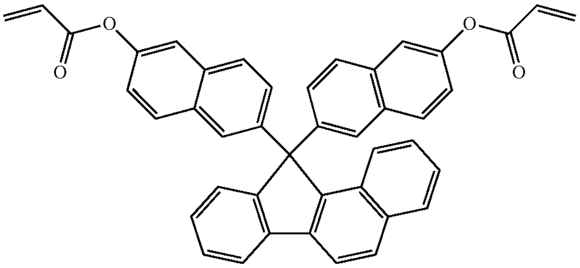
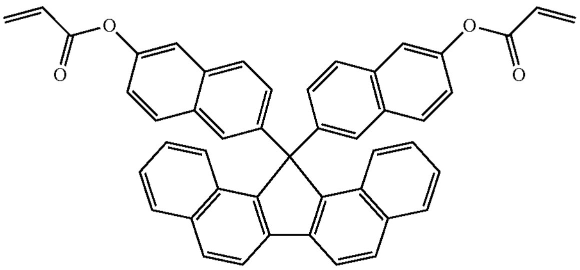

-continued
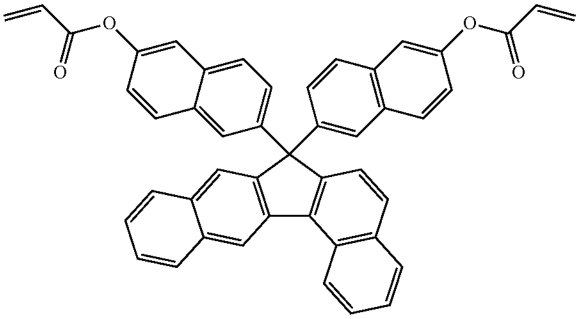
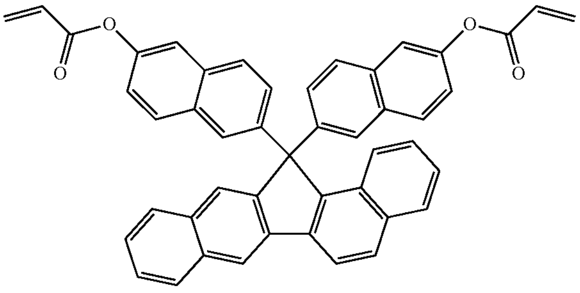
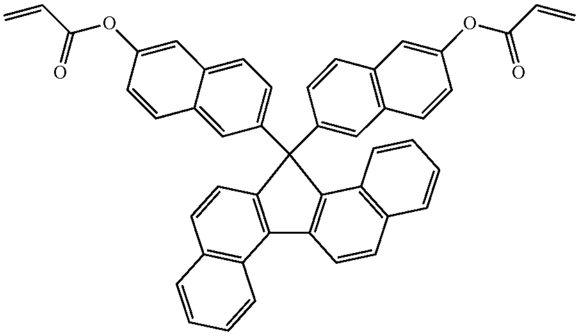
[0044]
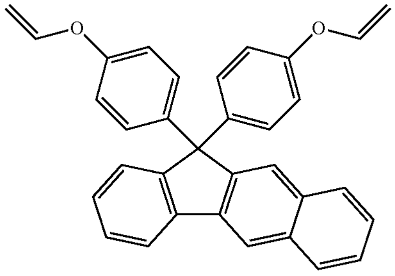
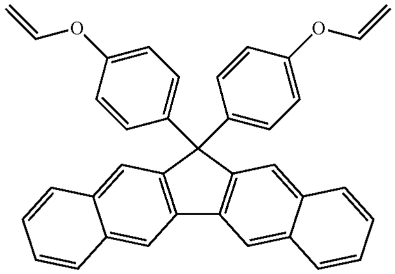
-continued
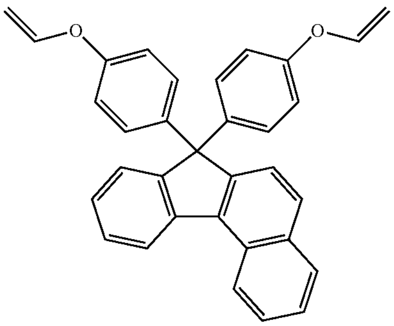
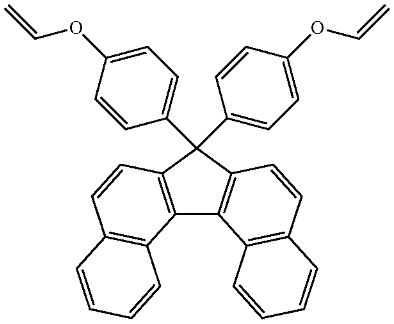
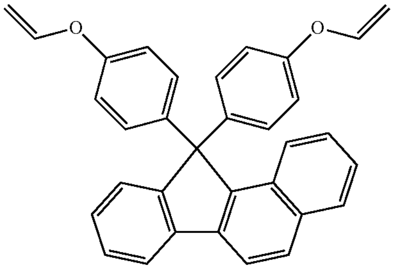
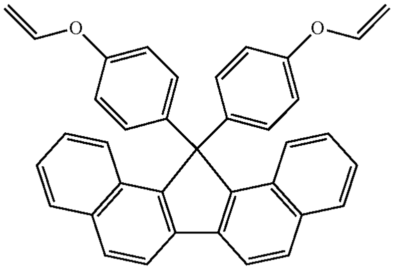
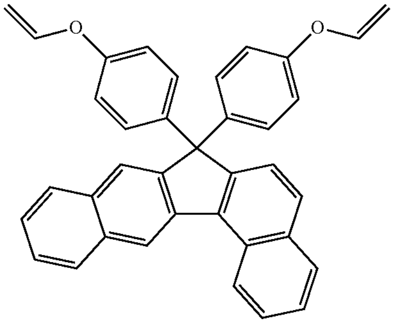

-continued
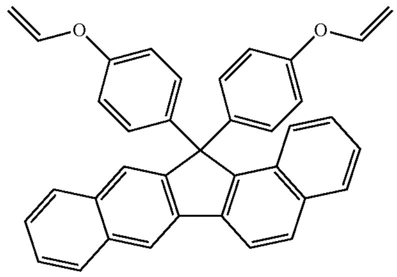
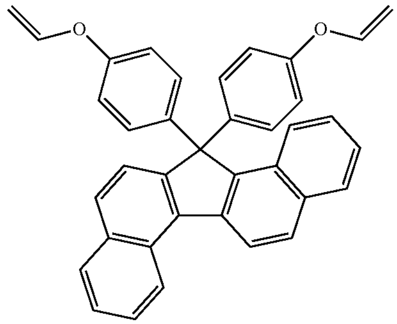
[0045]
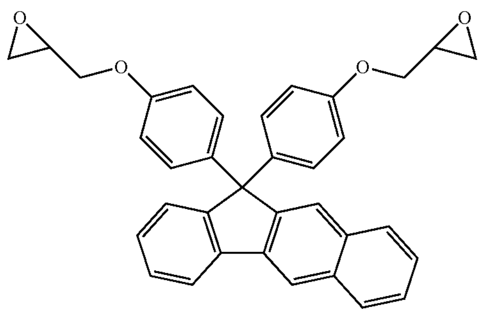
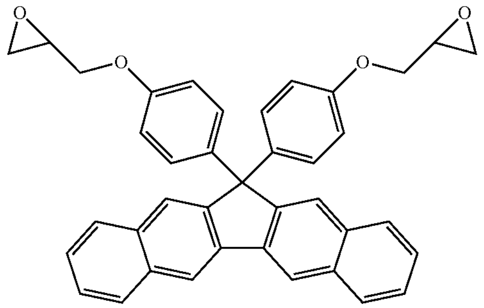
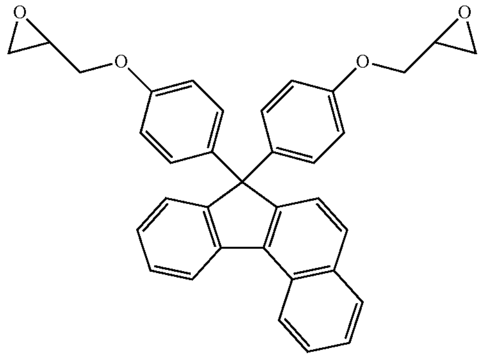
-continued
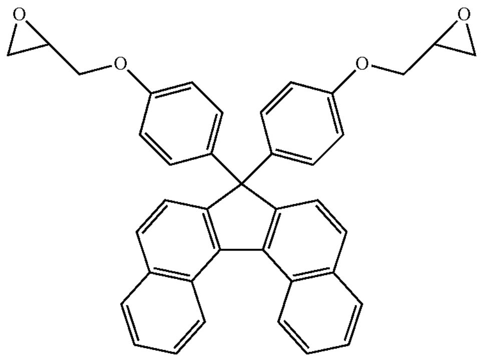
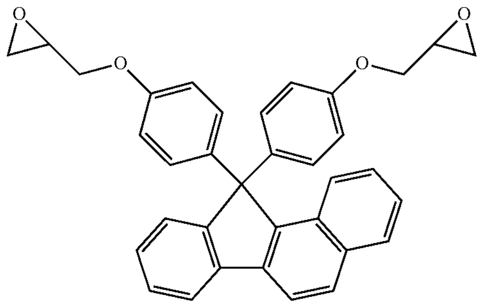
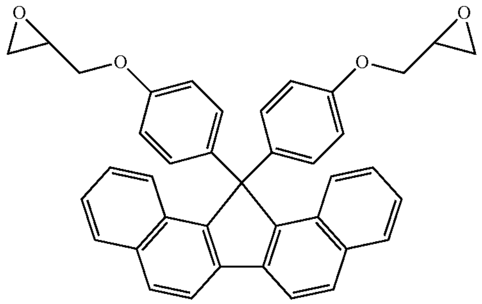
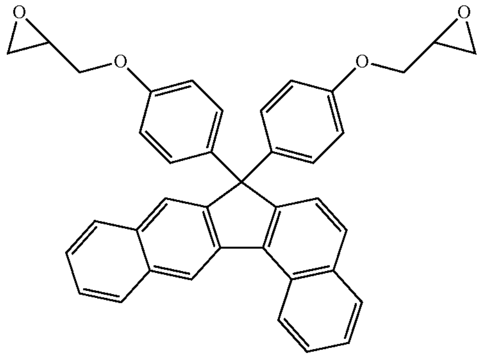
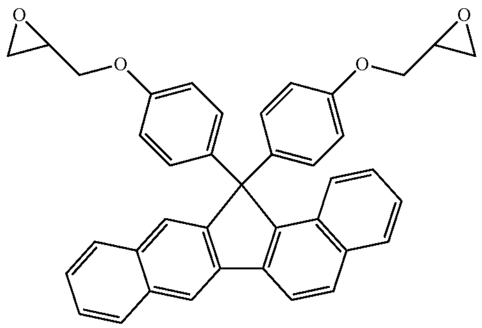

-continued
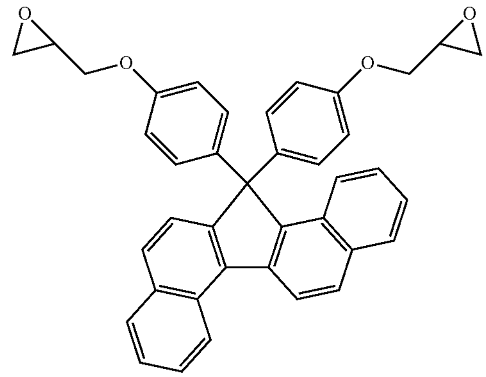
[0045]
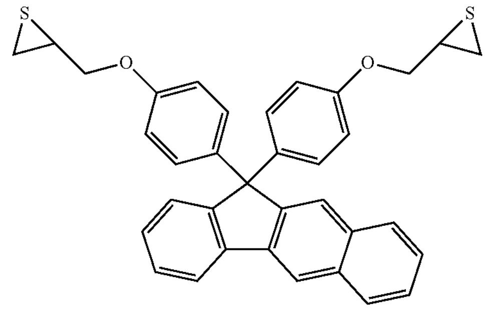
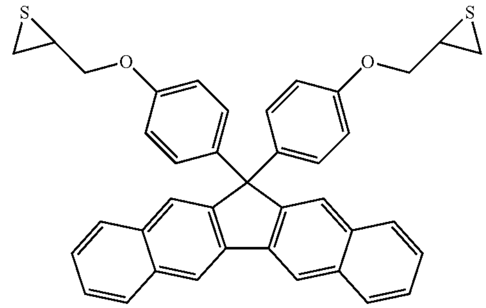
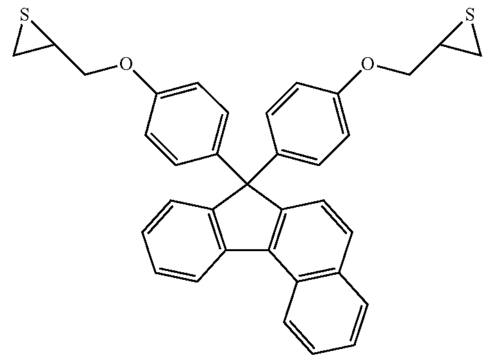
-continued
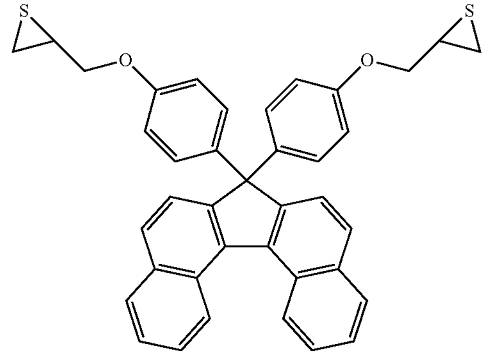
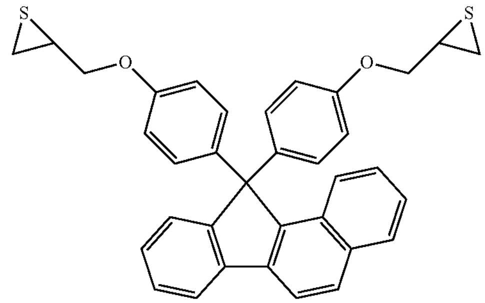
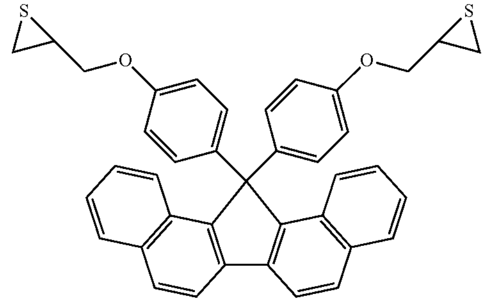
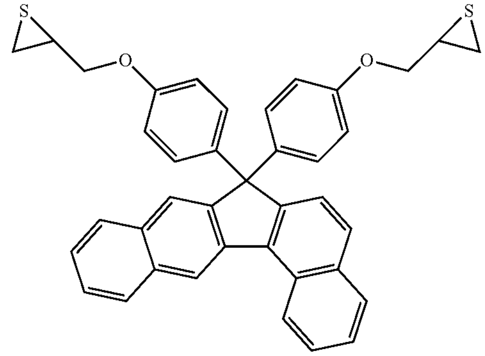
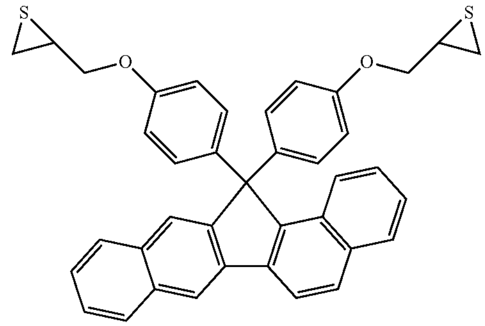

-continued
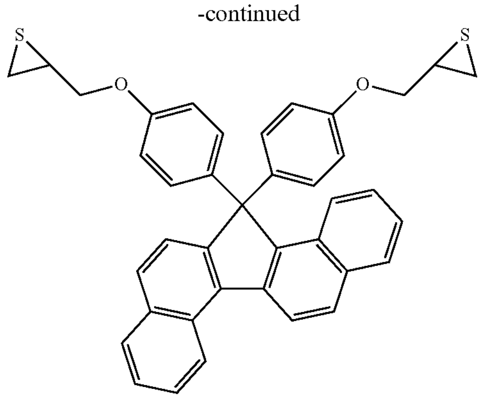
[0048]
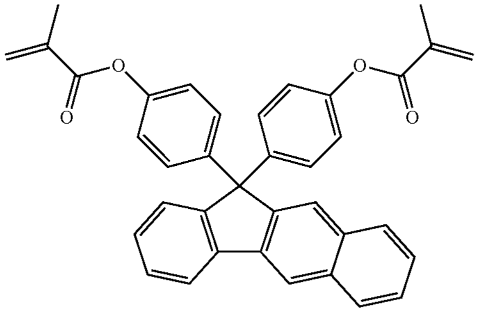
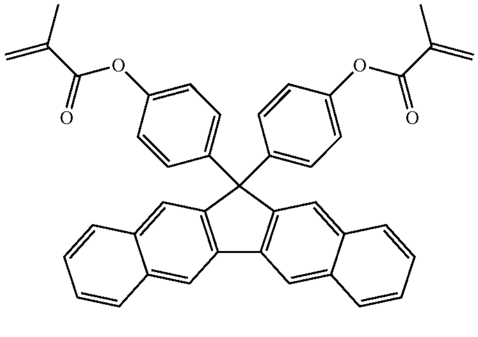
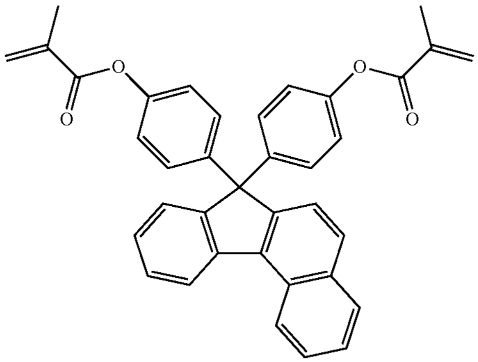
-continued
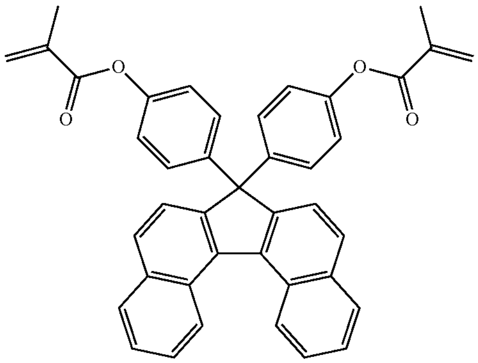
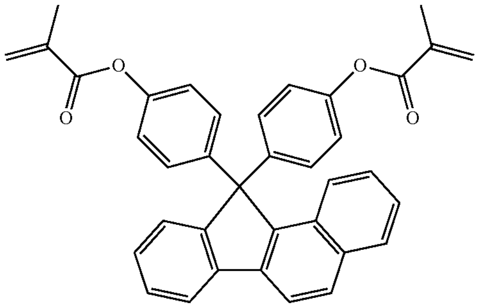
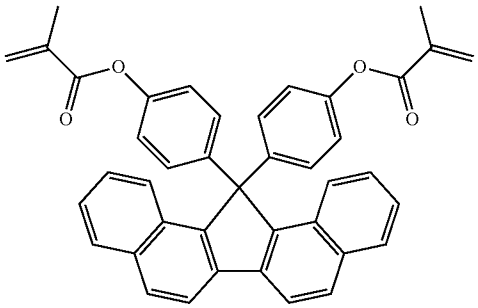
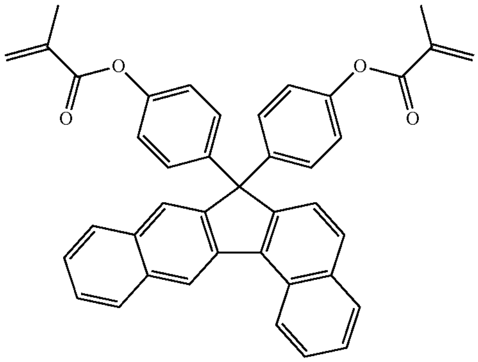
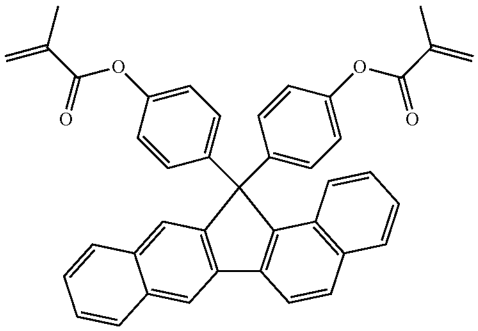

-continued
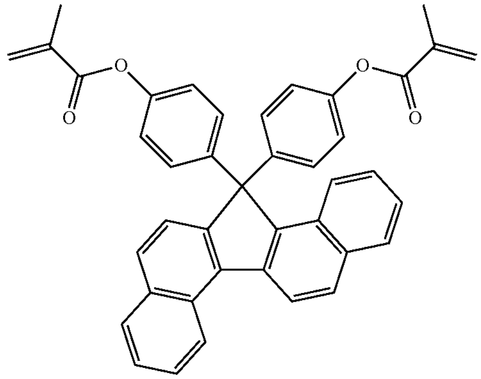
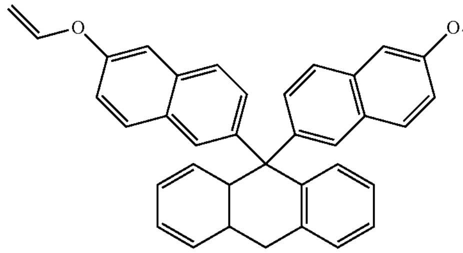
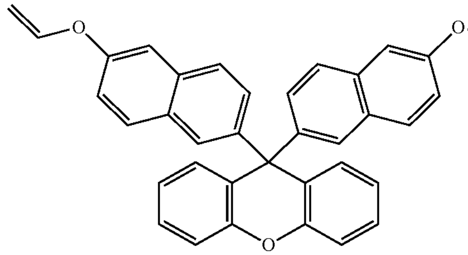
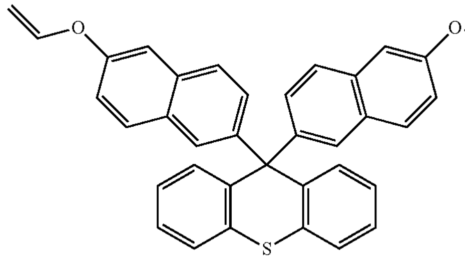
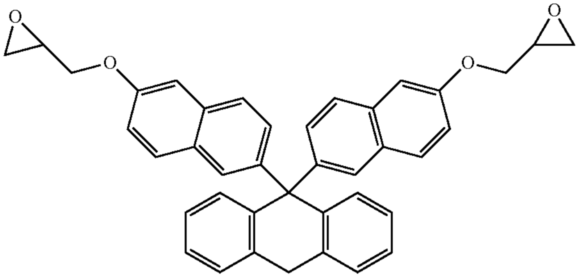
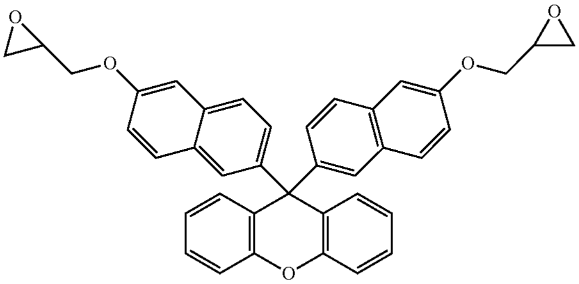
-continued
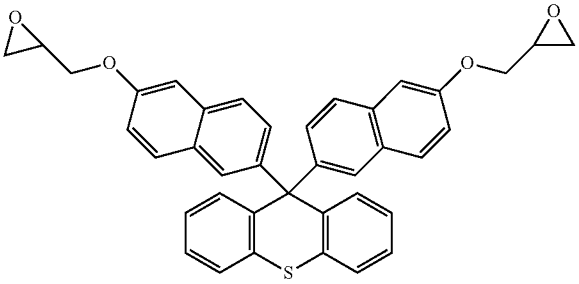
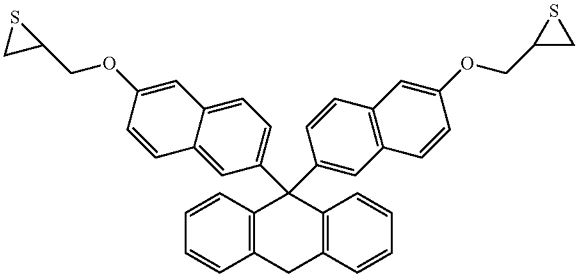
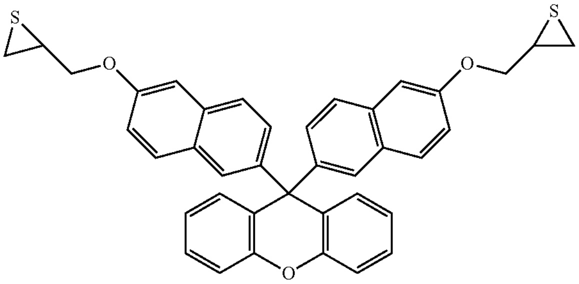
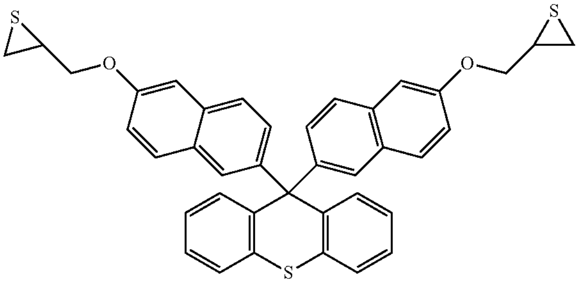
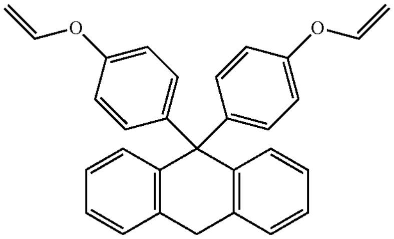
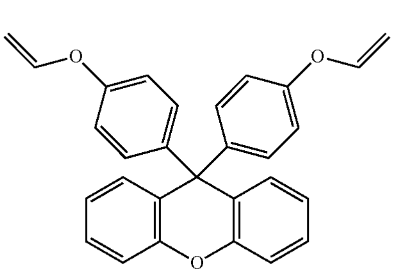

-continued
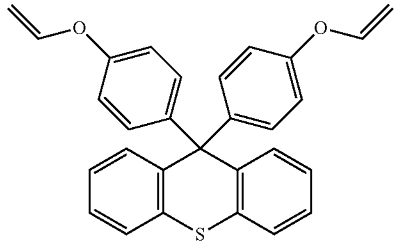
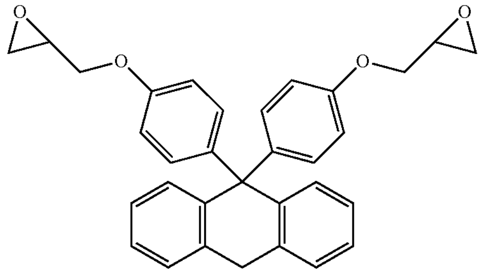
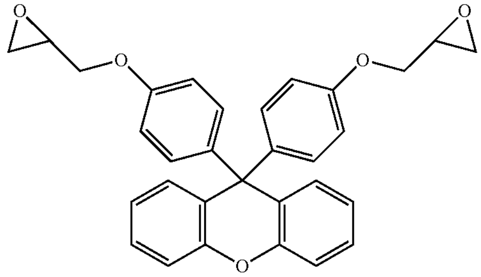
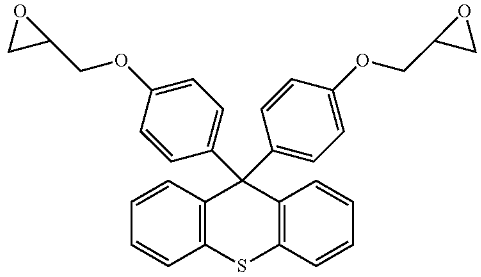
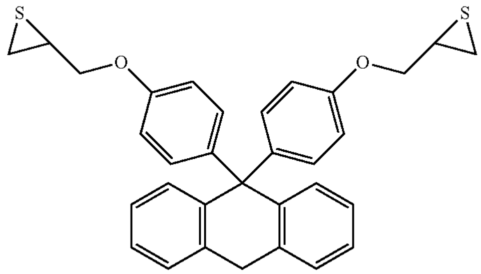
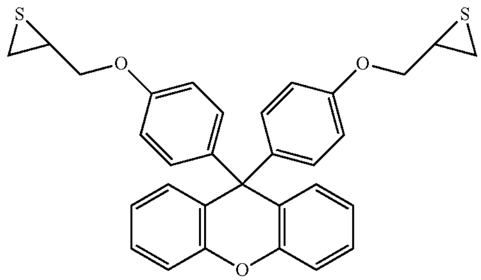
-continued
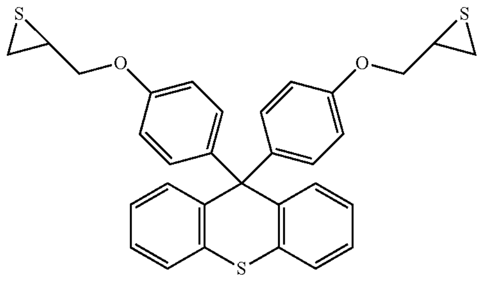
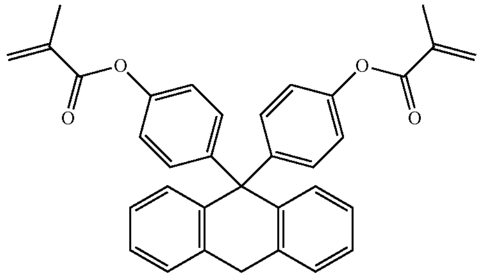
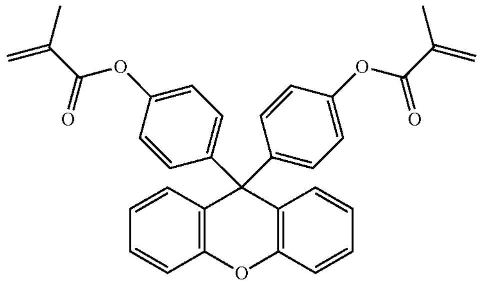
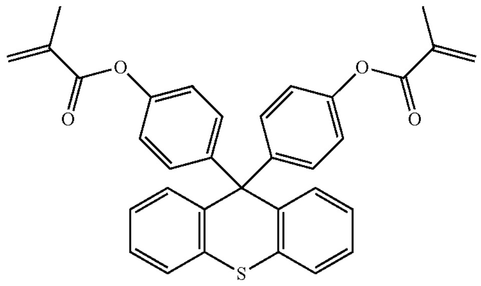
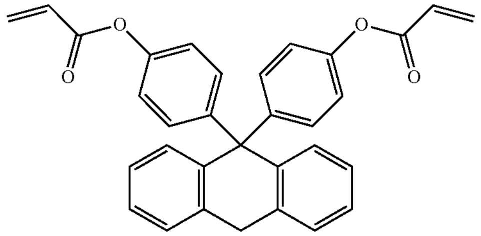
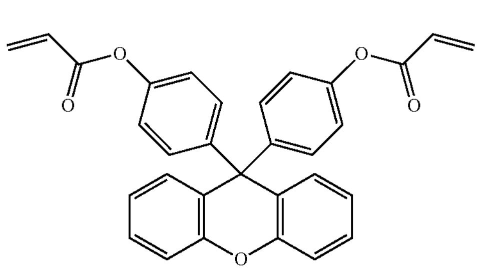

-continued

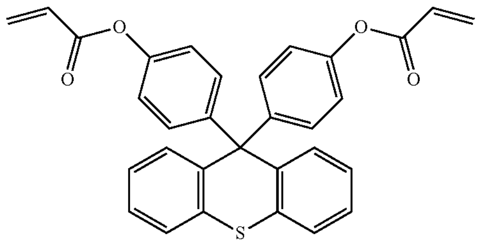

Among the compounds represented by the formula (a1) described above, the following compounds are particularly preferable.

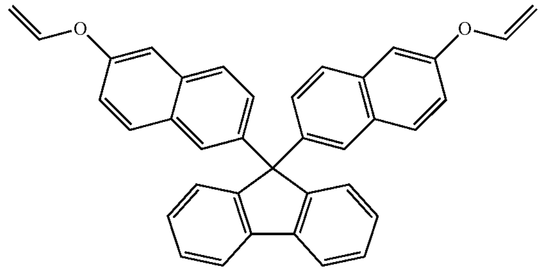

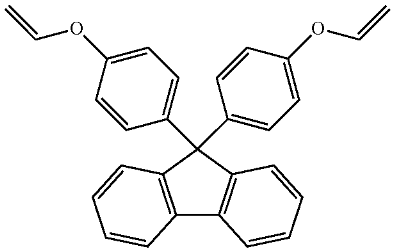

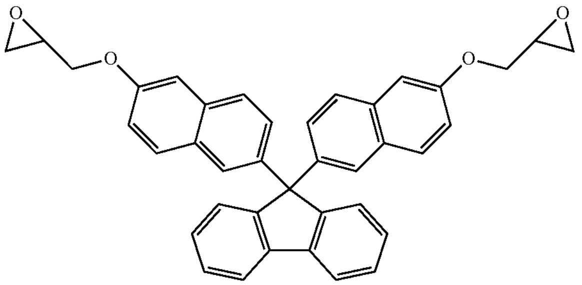

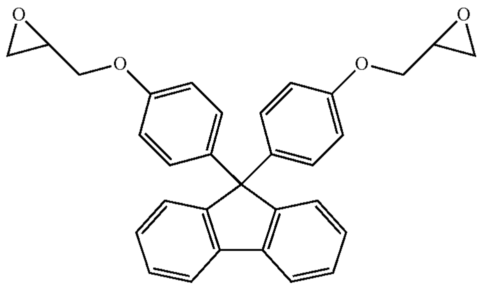

-continued

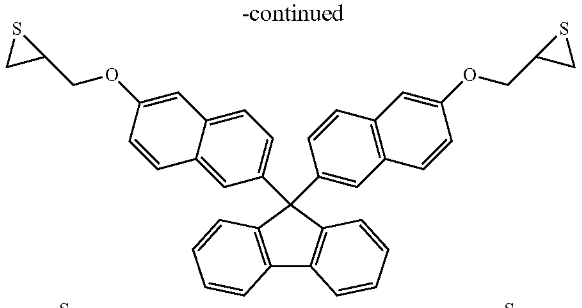

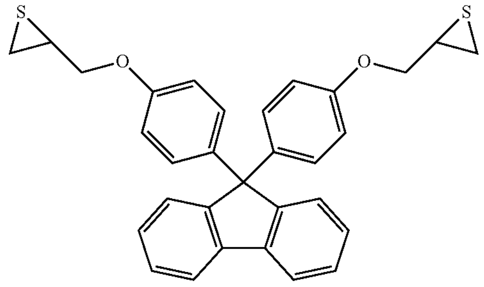

[Other Polymerizable Compound (A2)]

As described above, the polymerizable compound (A) may include other polymerizable compound (A2) not corresponding to the polymerizable fluorene compound (A1) in combination with the polymerizable fluorene compound (A1). A ratio of a mass of the polymerizable fluorene compound (A1) is preferably 50% by mass or more, more preferably 70% by mass or more, further preferably 80% by mass or more, particularly preferably 90% by mass or more, and most preferably 100% by mass relative to a mass of the polymerizable compound (A).

When the polymerizable fluorene compound (A1) has only the cationic polymerizable group-containing group, other polymerizable compound (A2) preferably has only the cationic polymerizable group-containing group. When the polymerizable fluorene compound (A1) has only the radical polymerizable group-containing group, other polymerizable compound (A2) preferably has only the radical polymerizable group-containing group.

For example, a vinyl ether compound containing a vinyloxy group, an epoxy compound containing an epoxy group, and an episulfide compound including an episulfide group are exemplified as other polymerizable compound (A2) having the cationic polymerizable group-containing group. A radical polymerizable compound having a radical polymerizable unsaturated double bond is exemplified as other polymerizable compound (A2) having the radical polymerizable group-containing group. The vinyl ether compound, the epoxy compound, the episulfide compound, and the radical polymerizable compound will be described below.

(Vinyl Ether Compound)

The vinyl ether compound is not particularly limited as long as it has a vinyloxy group and is a cationic polymerizable compound. The vinyl ether compound to be used in combination with the polymerizable fluorene compound (A1) may or may not include an aromatic group. In view of the transparency of the cured product, the vinyl ether compound to be used in combination with the polymerizable fluorene compound (A1) is preferably an aliphatic vinyl ether compound having no aromatic group. In view of satisfactory pyrolysis resistance of the cured product, the vinyl ether compound to be used in combination with the polymerizable fluorene compound (A1) is preferably a compound having a vinyloxy group to be bonded to an aromatic group.

Suitable specific examples of the vinyl ether compound include aliphatic vinyl ether compounds such as ethyl vinyl ether, isobutyl vinyl ether, hydroxybutyl vinyl ether, butanediol divinyl ether, cyclohexylvinyl ether, N-butyl vinyl ether, tert-butyl vinyl ether, triethylene glycol divinyl ether octadecyl vinyl ether, cyclohexane dimethanol divinyl ether, diethylene glycol divinyl ether, and cyclohexane dimethanol monovinyl ether vinyl phenyl ether; aromatic monovinyl ether compounds such as 4-vinyloxytoluene, 3-vinyloxytoluene, 2-vinyloxytoluene, 1-vinyloxy-4-chlorobenzene, 1-vinyloxy-3-chlorobenzene, 1-vinyloxy-2-chlorobenzene, 1-vinyloxy-2,3-dimethylbenzene, 1-vinyloxy-2,4-dimethylbenzene, 1-vinyloxy-2,5-dimethylbenzene, 1-vinyloxy-2,6-dimethylbenzene, 1-vinyloxy-3,4-dimethylbenzene, 1-vinyloxy-3,5-dimethylbenzene, 1-vinyloxynaphthalene, 2-vinyloxynaphthalene, 2-vinyloxyfluorene, 3-vinyloxyfluorene, 4-vinyloxy-1,1'-biphenyl, 3-vinyloxy-1,1'-biphenyl, 2-vinyloxy-1,1'-biphenyl, 6-vinyloxytetralin, and 5-vinyloxytetralin; and aromatic divinyl ether compounds such as 1,4-divinyloxybenzene, 1,3-divinyloxybenzene, 1,2-divinyloxybenzene, 1,4-divinyloxynaphthalene, 1,3-divinyloxynaphthalene, 1,2-divinyloxynaphthalene, 1,5-divinyloxynaphthalene, 1,6-divinyloxynaphthalene, 1,7-divinyloxynaphthalene, 1,8-divinyloxynaphthalene, 2,3-divinyloxynaphthalene, 2,6-divinyloxynaphthalene, 2,7-divinyloxynaphthalene, 1,2-divinyloxyfluorene, 3,4-divinyloxyfluorene, 2,7-divinyloxyfluorene, 4,4'-divinyloxybiphenyl, 3,3'-divinyloxybiphenyl, 2,2'-divinyloxybiphenyl, 3,4'-divinyloxybiphenyl, 2,3'-divinyloxybiphenyl, 2,4'-divinyloxybiphenyl, and bisphenol A divinyl ether. These vinyl ether compounds can be used in combination of two or more types thereof.

(Epoxy Compound)

Examples of the epoxy compound usable together with the polymerizable fluorene compound (A1) include difunctional epoxy resins such as a bisphenol A type epoxy resin, a bisphenol F type epoxy resin, a bisphenol S type epoxy resin, a bisphenol AD type epoxy resin, a naphthalene type epoxy resin, and a biphenyl type epoxy resin; novolak epoxy resins such as a phenol novolak type epoxy resin, a brominated phenol novolak type epoxy resin, an ortho-cresol novolak type epoxy resin, a bisphenol A novolak type epoxy resin, and a bisphenol AD novolak type epoxy resin; cyclic aliphatic epoxy resins such as an epoxidized product of a dicyclopentadiene type phenol resin; aromatic epoxy resins such as an epoxidized product of a naphthalene type phenol resin; glycidyl ester type epoxy resins such as a dimer acid glycidyl ester and triglycidyl ester; glycidylamine type epoxy resins such as tetraglycidylaminodiphenylmethane, triglycidyl-p-aminophenol, tetraglycidylmetaxylylenediamine, and tetraglycidyl bisaminomethylcyclohexane; heterocyclic epoxy resins such as triglycidyl isocyanurate; trifunctional epoxy resins such as phloroglucinol triglycidyl ether, trihydroxybiphenyl triglycidyl ether, trihydroxyphenylmethane triglycidyl ether, glycerin triglycidyl ether, 2-[4-(2,3-epoxypropoxy)phenyl]-2-[4-[1,1-bis[4-(2,3-epoxypropoxy)phenyl]ethyl]phenyl]propane, and 1,3-bis[4-[1-[4-(2,3-epoxypropoxy)phenyl]-1-[4-[1-[4-(2,3-epoxypropoxy) phenyl]-1-methylethyl]phenyl]ethyl]phenoxy]-2-propanol; tetrafunctional epoxy resins such as tetrahydroxyphenylethane tetraglycidyl ether, tetraglycidylbenzophenone, bisresorcinol tetraglycidyl ether, and tetraglycidoxybiphenyl; and a 1,2-epoxy-4-(2-oxyranyl)cyclohexane adduct of 2,2-bis (hydroxymethyl)-1-butanol. The 1,2-epoxy-4-(2-oxiranyl) cyclohexene adduct of 2,2-bis(hydroxymethyl)-1 butanol is commercially available as EHPE-3150 (manufactured by Daicel Corporation).

The oligomer or polymer type polyfunctional epoxy compound may also be used as other polymerizable compound (A2). Typical examples of the oligomer or polymer type polyfunctional epoxy compound include a phenol novolak type epoxy compound, a brominated phenol novolak type epoxy compound, an ortho-cresol novolak type epoxy compound, a xylenol novolak type epoxy compound, a naphthol novolak type epoxy compound, a bisphenol A novolak type epoxy compound, a bisphenol AD novolak type epoxy compound, an epoxidized product of a dicyclopentadiene type phenol resin, an epoxidized product of a naphthalene type phenol resin, and the like.

Other examples of the epoxy compound usable in combination with the polymerizable fluorene compound (A1) include a polyfunctional alicyclic epoxy compound having an alicyclic epoxy group. When the polymerizable compound (A) includes an alicyclic epoxy compound, it is easy to form a cured product having excellent transparency using a curable composition.

Specific examples of the alicyclic epoxy compound include 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexylmethyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, β-methyl-5-valerolactone-modified 3,4-epoxycyclohexylmethyl-3',4'-epoxycyclohexane carboxylate, methylenebis(3,4-epoxycyclohexane), di(3,4-epoxycyclohexylmethyl)ether of ethylene glycol, ethylenebis(3,4-epoxycyclohexane carboxylate), epoxycyclohexahydrophthalate, di-2-ethylhexyl epoxycyclohexahydrophthalate, and an epoxy resin having a tricyclodecene oxide group and compounds represented by the following formulas (a01-1) to (a01-5).

Among specific examples of these alicyclic epoxy compounds, alicyclic epoxy compounds represented by the following formulas (a01-1) to (a01-5) are preferred, since the cured product with high hardness can be formed.

(a01-1)

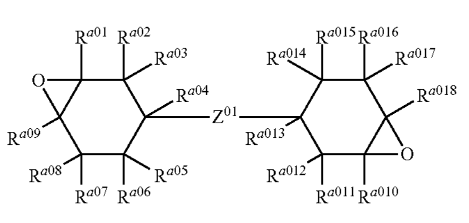

In the formula (a01-1), $Z^{01}$ represents a single bond or a linking group (divalent group having one or more atoms). $R^{a01}$ to $R^{a018}$ each independently represent a group selected from the group consisting of a hydrogen atom, a halogen atom, and an organic group.

Examples of the linking group $Z^{01}$ include a divalent hydrocarbon group, a divalent group selected from the group consisting of —O—, —O—CO—, —S—, —SO—, —$SO_2$—, —$CBr_2$—, —$C(CBr_3)_2$—, —$C(CF_3)_2$—, and —$R^{a019}$—O—CO—, and a group in which plural these groups are bonded.

Examples of the divalent hydrocarbon group as the linking group $Z^{01}$ include a linear or branched alkylene group having 1 or more and 18 or less carbon atoms, a divalent alicyclic hydrocarbon group, and the like. Examples of the linear or branched alkylene group having 1 or more and 18 or less carbon atoms include a methylene group, a methylmethylene group, a dimethylmethylene group, a dimethylene group, a trimethylene group, and the like. Examples of the divalent alicyclic hydrocarbon group include cycloalkylene groups (including a cycloalkylidene group) such as a 1,2-cyclopentylene group, a 1,3-cyclopentylene group, a cyclopentylidene group, a 1,2-cyclohexylene group, a 1,3-cyclohexylene group, a 1,4-cyclohexylene group, a cyclohexylidene group, and the like.

$R^{a019}$ is an alkylene group having 1 or more and 8 or less carbon atoms, and preferably a methylene group or an ethylene group.

(a01-2)

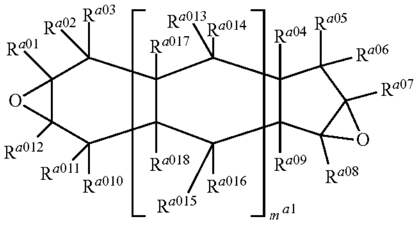

In the formula (a01-2), $R^{a01}$ to $R^{a018}$ are groups selected from the group consisting of a hydrogen atom, a halogen atom, and an organic group. $R^{a02}$ and $R^{a010}$ may be combined with each other. $R^{a013}$ and $R^{a016}$ may be combined with each other to form a ring. $m^{a1}$ is 0 or 1.

As the alicyclic epoxy compound represented by the formula (a01-2), a compound represented by the formula (a01-2-1) that corresponds to a compound in which mal in the formula (a01-2) is 0 is preferred.

(a01-2-1)

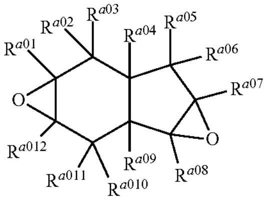

In the formula (a01-2-1), $R^{a01}$ to $R^{a012}$ are groups selected from the group consisting of a hydrogen atom, a halogen atom, and an organic group. $R^{a02}$ and $R^{a010}$ may be combined with each other.

(a01-3)

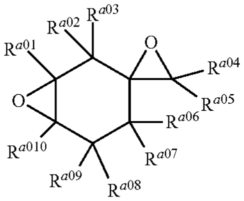

In the formula (a01-3), $R^{a01}$ to $R^{a010}$ are groups selected from the group consisting of a hydrogen atom, a halogen atom, and an organic group. $R^{a02}$ and $R^{a08}$ may be combined with each other.

(a01-4)

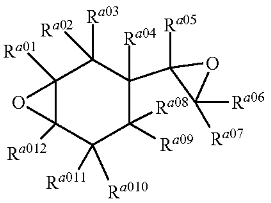

In the formula (a01-4), $R^{a01}$ to $R^{a012}$ are groups selected from the group consisting of a hydrogen atom, a halogen atom, and an organic group. $R^{a02}$ and $R^{a010}$ may be combined with each other.

(a01-5)

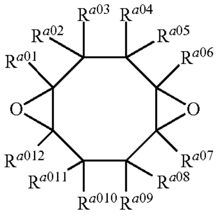

In the formula (a01-5), $R^{a01}$ to $R^{a012}$ are groups selected from the group consisting of a hydrogen atom, a halogen atom, and an organic group.

In the formulas (a01-1) to (a01-5), when $R^{a01}$ to $R^{a018}$ are organic groups, the organic group is not particularly limited as long as the object of the present invention is not impaired, and may be a hydrocarbon group, a group composed of a carbon atom and a halogen atom, or a group containing heteroatoms such as a halogen atom, an oxygen atom, a sulfur atom, a nitrogen atom, and a silicon atom, together with a carbon atom and a hydrogen atom. Examples of the halogen atom include a chlorine atom, a bromine atom, an iodine atom, and a fluorine atom.

The organic group is preferably a group composed of a hydrocarbon group and a carbon atom, a hydrogen atom, and an oxygen atom, a group composed of a halogenated hydrocarbon group and a carbon atom, an oxygen atom, and a halogen atom, and a group composed of a carbon atom, a hydrogen atom, an oxygen atom, and a halogen atom. When the organic group is a hydrocarbon group, the hydrocarbon group may be an aromatic hydrocarbon group, or an aliphatic hydrocarbon group, or a group including an aromatic skeleton and an aliphatic skeleton. The number of carbon atoms of the organic group is preferably 1 or more and 20 or less, more preferably 1 or more and 10 or less, and particularly preferably 1 or more and 5 or less.

Specific examples of the hydrocarbon group include chain alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, an n-decyl group, an n-undecyl group, an n-tridecyl group, an n-tetradecyl group, an n-pentadecyl group, an n-hexadecyl group, an n-heptadecyl group, an n-octadecyl group, an n-nonadecyl group, and an n-icosyl group; chain alkenyl groups such as a vinyl group, a 1-propenyl group, a 2-n-propenyl group (allyl group), a 1-n-butenyl group, a 2-n-butenyl group, and a 3-n-butenyl group; cycloalkyl groups such as a cyclopropyl group, a cyclobutyl group, a cyclopentyl group, a cyclohexyl group, and a cycloheptyl group; aryl groups such as a phenyl group, an o-tolyl group, a m-tolyl group, a p-tolyl group, an α-naphthyl group, a β-naphthyl group, a biphenyl-4-yl group, a biphenyl-3-yl group, a biphenyl-2-yl group, an anthryl group, and a phenanthryl group; and aralkyl groups such as a benzyl group, a phenethyl group, an α-naphthylmethyl group, a β-naphthylmethyl group, an α-naphthylethyl group, and a β-naphthylethyl group.

Specific examples of the halogenated hydrocarbon group include halogenated chain alkyl groups such as a chloromethyl group, a dichloromethyl group, a trichloromethyl group, a bromomethyl group, a dibromomethyl group, a tribromomethyl group, a fluoromethyl group, a difluoromethyl group, a trifluoromethyl group, a 2,2,2-trifluoroethyl group, a pentafluoroethyl group, a heptafluoropropyl group, a perfluorobutyl group, a perfluoropentyl group, a perfluorohexyl group, a perfluoroheptyl group, a perfluorooctyl group, a perfluorononyl group, and a perfluorodecyl group; halogenated cycloalkyl groups such as a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group, and a 4-bromocyclohexyl group; halogenated aryl groups such as a 2-chlorophenyl group, a 3-chlorophenyl group, a 4-chlorophenyl group, a 2,3-dichlorophenyl group, a 2,4-dichlorophenyl group, a 2,5-dichlorophenyl group, a 2,6-dichlorophenyl group, a 3,4-dichlorophenyl group, a 3,5-dichlorophenyl group, a 2-bromophenyl group, a 3-bromophenyl group, a 4-bromophenyl group, a 2-fluorophenyl group, a 3-fluorophenyl group, and a 4-fluorophenyl group; and halogenated aralkyl groups such as a 2-chlorophenylmethyl group, a 3-chlorophenylmethyl group, a 4-chlorophenylmethyl group, a 2-bromophenylmethyl group, a 3-bromophenylmethyl group, a 4-bromophenylmethyl group, a 2-fluorophenylmethyl group, a 3-fluorophenylmethyl group, and a 4-fluorophenylmethyl group.

Specific examples of the group composed of a carbon atom, a hydrogen atom, and an oxygen atom include hydroxy chain alkyl groups such as a hydroxymethyl group, a 2-hydroxyethyl group, a 3-hydroxy-n-propyl group, and a 4-hydroxy-n-butyl group; halogenated cycloalkyl groups such as a 2-hydroxycyclohexyl group, a 3-hydroxycyclohexyl group, and a 4-hydroxycyclohexyl group; hydroxyaryl groups such as a 2-hydroxyphenyl group, a 3-hydroxyphenyl group, a 4-hydroxyphenyl group, a 2,3-dihydroxyphenyl group, a 2,4-dihydroxyphenyl group, a 2,5-dihydroxyphenyl group, a 2,6-dihydroxyphenyl group, a 3,4-dihydroxyphenyl group, and a 3,5-dihydroxyphenyl group; hydroxyaralkyl groups such as a 2-hydroxyphenylmethyl group, a 3-hydroxyphenylmethyl group, and a 4-hydroxyphenylmethyl group; chain alkoxy groups such as a methoxy group, an ethoxy group, an n-propoxy group, an isopropoxy group, an n-butyloxy group, an isobutyloxy group, a sec-butyloxy group, a tert-butyloxy group, an n-pentyloxy group, an n-hexyloxy group, an n-heptyloxy group, an n-octyloxy group, a 2-ethylhexyloxy group, an n-nonyloxy group, an n-decyloxy group, an n-undecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group, and an n-icosyloxy group; chain alkenyloxy groups such as a vinyloxy group, a 1-propenyloxy group, a 2-n-propenyloxy group (allyloxy group), a 1-n-butenyloxy group, a 2-n-butenyloxy group, and a 3-n-butenyloxy group; aryloxy groups such as a phenoxy group, an o-tolyloxy group, a m-tolyloxy group, a p-tolyloxy group, an α-naphthyloxy group, a β-naphthyloxy group, a biphenyl-4-yloxy group, a biphenyl-3-yloxy group, a biphenyl-2-yloxy group, an anthryloxy group, and a phenanthryloxy group; aralkyloxy groups such as a benzyloxy group, a phenethyloxy group, an α-naphthylmethyloxy group, a β-naphthylmethyloxy group, an α-naphthylethyloxy group, and a β-naphthylethyloxy group; alkoxyalkyl groups such as a methoxymethyl group, an ethoxymethyl group, an n-propoxymethyl group, a 2-methoxyethyl group, a 2-ethoxyethyl group, a 2-n-propoxyethyl group, a 3-methoxy-n-propyl group, a 3-ethoxy-n-propyl group, a 3-n-propoxy-n-propyl group, a 4-methoxy-n-butyl group, a 4-ethoxy-n-butyl group, and a 4-n-propoxy-n-butyl group; alkoxyalkoxy groups such as a methoxymethoxy group, an ethoxymethoxy group, an n-propoxymethoxy group, a 2-methoxyethoxy group, a 2-ethoxyethoxy group, a 2-n-propoxyethoxy group, a 3-methoxy-n-propoxy group, a 3-ethoxy-n-propoxy group, a 3-n-propoxy-n-propoxy group, a 4-methoxy-n-butyloxy group, a 4-ethoxy-n-butyloxy group, and a 4-n-propoxy-n-butyloxy group; alkoxyaryl groups such as a 2-methoxyphenyl group, a 3-methoxyphenyl group, and a 4-methoxyphenyl group; alkoxyaryloxy groups such as a 2-methoxyphenoxy group, a 3-methoxyphenoxy group, and a 4-methoxyphenoxy group; aliphatic acyl groups such as a formyl group, an acetyl group, a propionyl group, a butanoyl group, a pentanoyl group, a hexanoyl group, a heptanoyl group, an octanoyl group, a nonanoyl group, and a decanoyl group; aromatic acyl groups such as a benzoyl group, an α-naphthoyl group, and a β-naphthoyl group; chain alkyloxycarbonyl groups such as a methoxycarbonyl group, an ethoxycarbonyl group, an n-propoxycarbonyl group, an n-butyloxycarbonyl group, an n-pentyloxycarbonyl group, an n-hexylcarbonyl group, an n-heptyloxycarbonyl group, an n-octyloxycarbonyl group, an n-nonyloxycarbonyl group, and an n-decyloxycarbonyl group; aryloxycarbonyl groups such as a phenoxycarbonyl group, an α-naphthoxycarbonyl group, and a β-naphthoxycarbonyl group; aliphatic acyloxy groups such as a formyloxy group, an acetyloxy group, a propionyloxy group, a butanoyloxy group, a pentanoyloxy group, a hexanoyloxy group, a heptanoyloxy group, an octanoyloxy group, a nonanoyloxy group, and a decanoyloxy group; and aromatic acyloxy groups such as a benzoyloxy group, an α-naphthoyl oxy group, and a β-naphthoyl oxy group.

$R^{a01}$ to $R^{a018}$ each independently is preferably a group selected from the group consisting of a hydrogen atom, a halogen atom, an alkyl group having 1 or more and 5 or less carbon atoms, and an alkoxy group having 1 or more and 5 or less carbon atoms. All $R^{a01}$ to $R^{a018}$ are more preferably hydrogen atoms since it is easy to form a cured film having particularly excellent mechanical properties.

In the formulas (a01-2) to (a01-5), $R^{a01}$ to $R^{a018}$ are the same as $R^{a01}$ to $R^{a018}$ in the formula (a01-1). When $R^{a02}$ and $R^{a010}$ are combined with each other in the formulas (a01-2) and formula (a01-4), when $R^{a013}$ and $R^{a016}$ are combined with each other in the formula (a01-2), and when $R^{a02}$ and $R^{a08}$ are combined with each other in the formula (a01-3), for example, $—CH_2—$ and $—C(CH_3)_2—$ are exemplified as the divalent group to be formed.

Among the alicyclic epoxy compounds represented by the formula (a01-1), specific examples of suitable compound include alicyclic epoxy compounds represented by the following formula (a01-1a), formula (a01-1b), and formula (a01-1c), 2,2-bis(3,4-epoxycyclohexan-1-yl)propane[=2,2-bis(3,4-epoxycyclohexyl)propane], and the like.

(a01-1a)

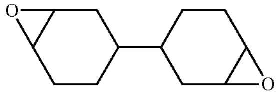

(a01-1b)

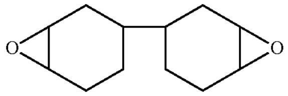

(a01-1c)

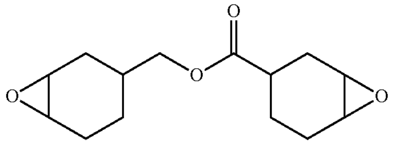

Among the alicyclic epoxy compounds represented by the formula (a01-2), specific examples of suitable compound include alicyclic epoxy compounds represented by the following formulas (a01-2a) and (a01-2b).

(a01-2a)

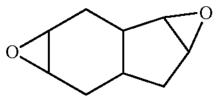

(a01-2b)

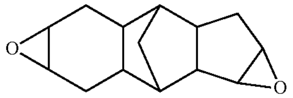

Among the alicyclic epoxy compounds represented by the formula (a01-3), specific examples of suitable compound include S spiro[3-oxatricyclo[3.2.1.0$^{2,4}$]octane-6,2'-oxirane], and the like.

Among the alicyclic epoxy compounds represented by the formula (a01-4), specific examples of suitable compound include 4-vinylcyclohexene dioxide, dipentene dioxide, limonene dioxide, 1-methyl-4-(3-methyloxiran-2-yl)-7-oxabicyclo[4.1.0]heptane, and the like.

Among the alicyclic epoxy compounds represented by the formula (a01-5), specific examples of suitable compound include 1,2,5,6-diepoxycyclooctane, and the like.

It is also possible to suitably use, as the epoxy compound, a compound represented by the following formula (a1-I).

(a1-I)

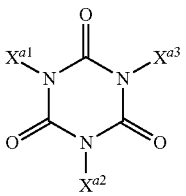

In the formula (a1-I), $X^{a1}$, $X^{a2}$, and $X^{a3}$ each independently represent a hydrogen atom, or an organic group optionally having an epoxy group, and the total number of epoxy groups possessed by $X^{a1}$, $X^{a2}$, and $X^{a3}$ is 2 or more.

The compound represented by the formula (a1-I) is preferably a compound represented by the following formula (a1-II).

(a1-II)

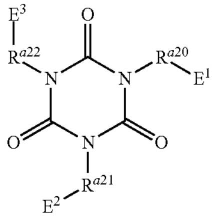

In the formula (a1-II), $R^{a20}$ to $R^{a22}$ represent a linear, branched, or cyclic alkylene group, an arylene group, —O—, —C(═O)—, —NH—, and a combination thereof, and each may be the same or different. $E^1$ to $E^3$ represent at least one substituent or hydrogen atom selected from the group consisting of an epoxy group, an oxetanyl group, an ethylenically unsaturated group, an alkoxysilyl group, an isocyanate group, a blocked isocyanate group, a thiol group, a carboxy group, a hydroxy group, and a succinic anhydride group. Provided that, a total number of epoxy groups possessed by $E^1$, $E^2$, and $E^3$ is 2 or more.

In the formula (a1-II), each of at least two of a group represented by $R^{a20}$ and $E^1$, $R^{a21}$ and $E^2$, and $R^{a22}$ and $E^3$ is preferably groups represented by the following formula (b1-IIa), and all the groups are more preferably groups represented by the following formula (a1-IIa). A group represented by plural formulas (a1-IIa) bonded to one compound is preferably the same group.

$$\text{-L-C}^a \quad \text{(a1-IIa)}$$

In the formula (a1-IIa), L is a linear, branched, or cyclic alkylene group, an arylene group, —O—, —C(═O)—, —NH—, and a combination thereof, and $C^a$ is an oxyranyl group (epoxy group). In the formula (a1-IIa), L and $C^a$ may be combined to form a cyclic structure.

In the formula (a1-IIa), the linear, branched, or cyclic alkylene group as L is preferably an alkylene group having 1 or more and 10 or less carbon atoms, and the arylene group as L is preferably an arylene group having 5 or more and 10 or less carbon atoms. In the formula (a1-IIa), L is preferably a linear alkylene group having 1 or more and 3 or less carbon atoms, a phenylene group, —O—, —C(═O)—, —NH—, and a combination thereof, and preferably at least one of a linear alkylene group having 1 or more and 3 or less carbon atoms such as a methylene group, and a phenylene group, or a group composed of a combination of these groups and at least one of —O—, —C(═O)— and NH—.

In the formula (a1-IIa), when L and $C^a$ are combined with each other to form a cyclic structure, for example, when a branched alkylene group and an epoxy group are combined with each other to form a cyclic structure (structure having an alicyclic structure epoxy group), an organic group represented by the following formula (a1-IIb) to (a1-IId) is exemplified.

(a1-IIb)

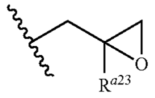

-continued
(a1-IIc)
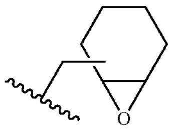
(a1-IId)
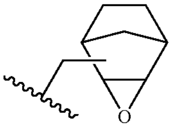
In the formula (a1-IIb), $R^{a23}$ is a hydrogen atom or a methyl group.
Examples of the compound represented by the formula (a1-II) include, but are not limited to, examples of an epoxy compound having an oxyranyl group or an alicyclic epoxy group.
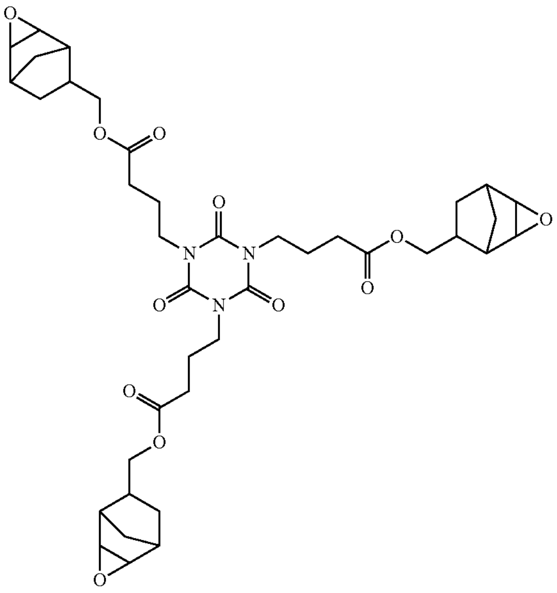
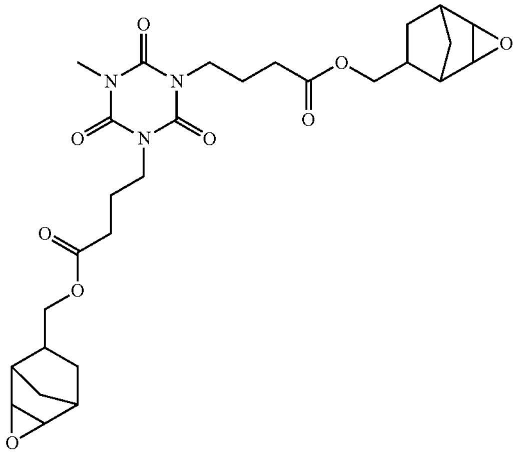
-continued
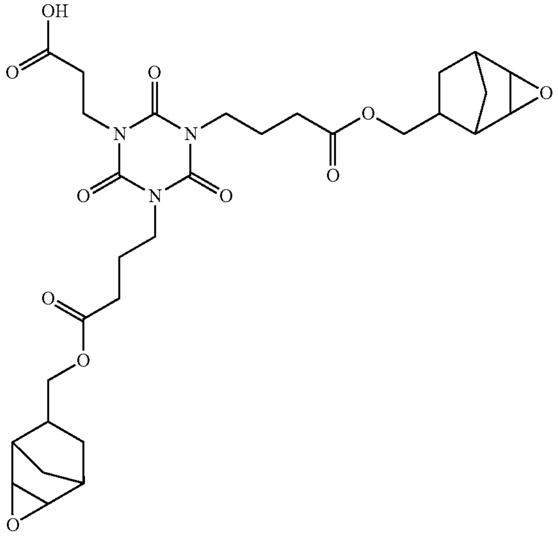
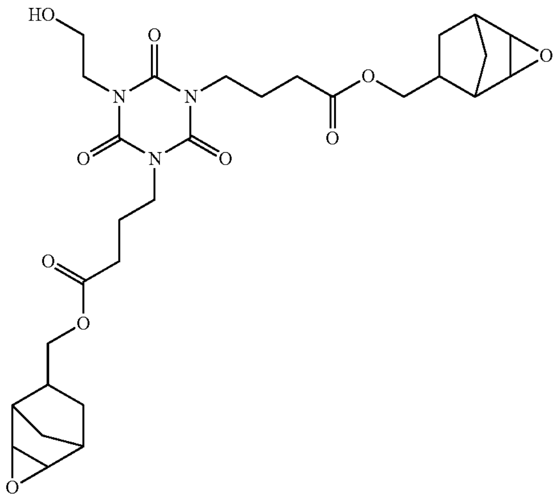
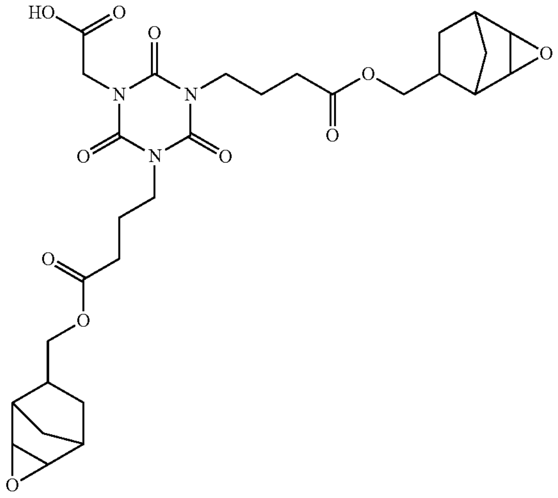

-continued
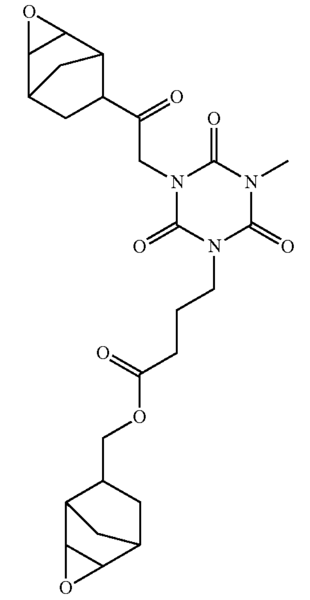
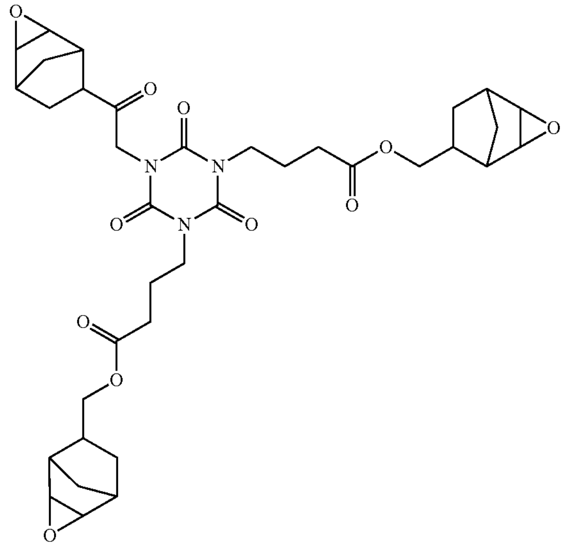
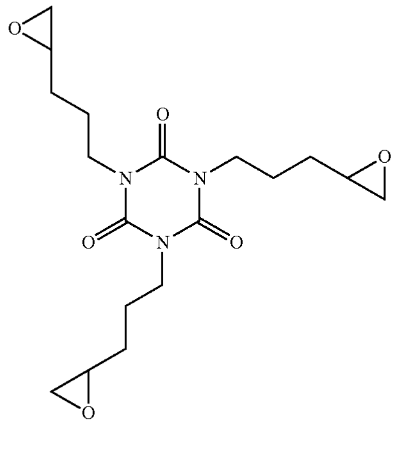
-continued
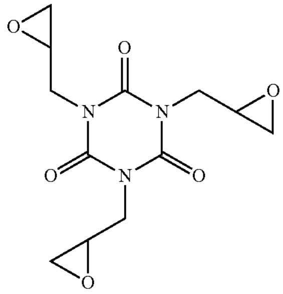
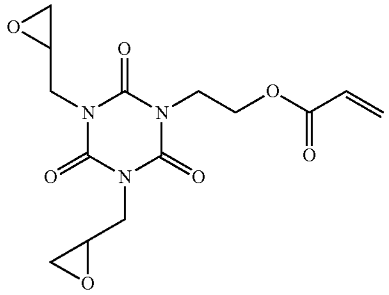
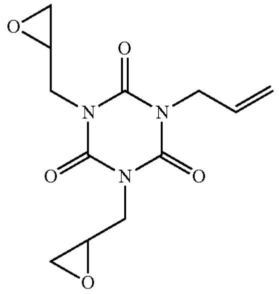
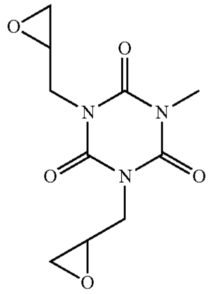
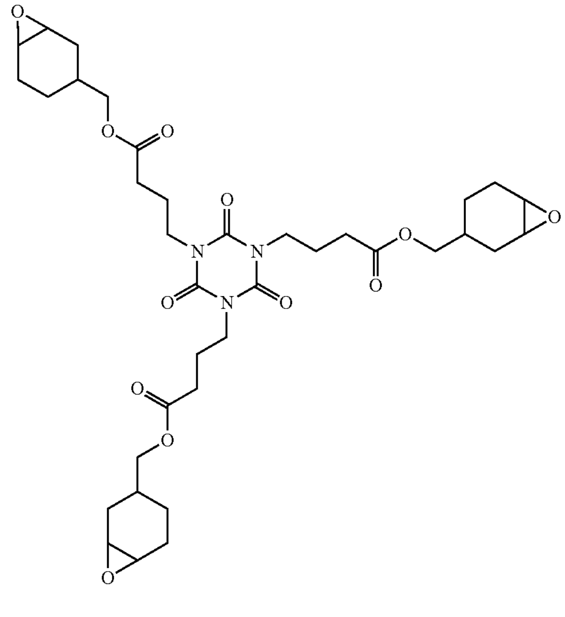

-continued
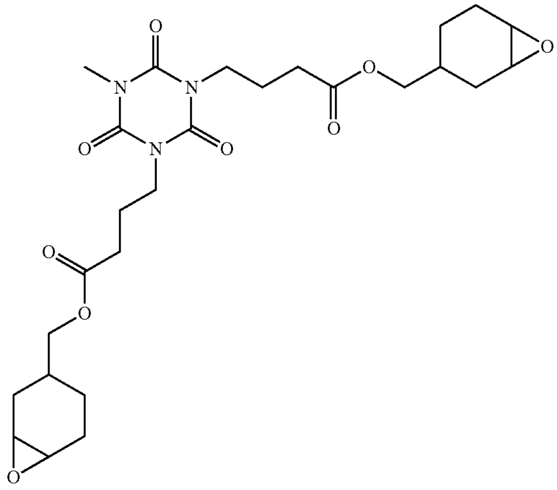
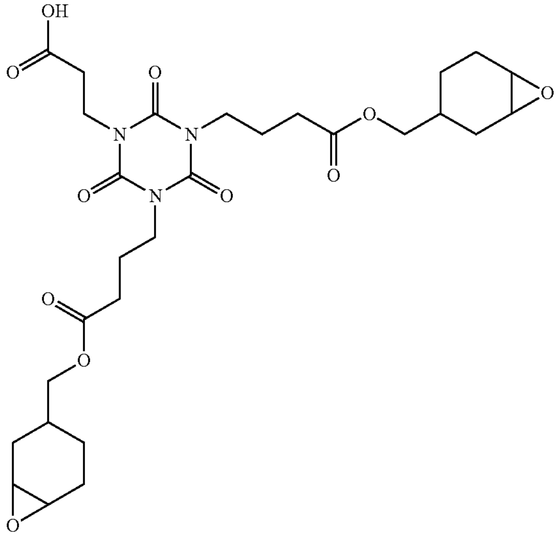
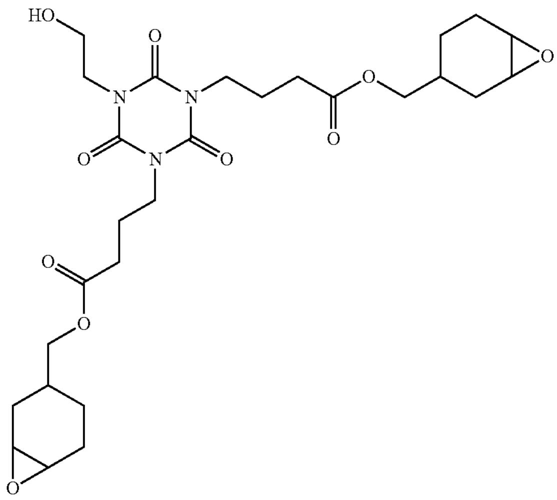
-continued
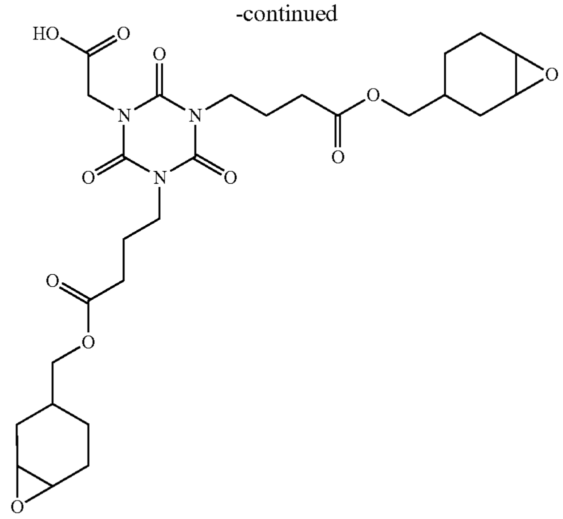
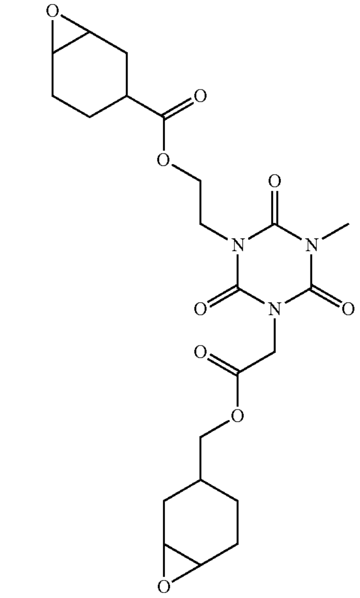
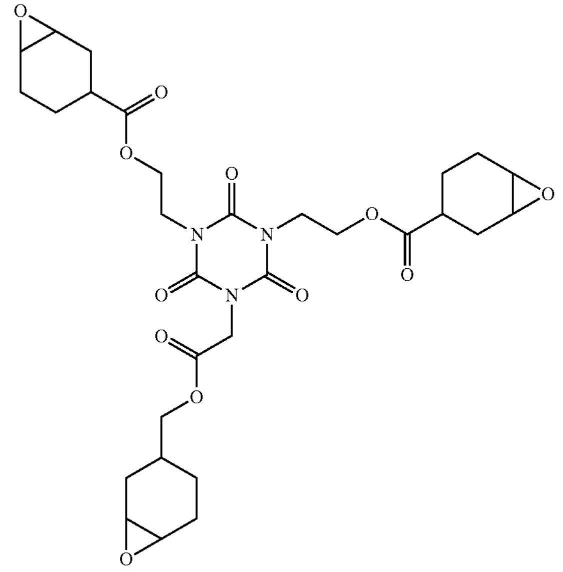 [SMILES: O=C(Cn1c(=O)n(CCOC(=O)C2CCC3OC3C2)c(=O)n(CCOC(=O)C2CCC3OC3C2)c1=O)OCC1CCC2OC2C1]
In addition, a siloxane compound having two or more groups selected from a glycidyl group and an alicyclic epoxy group in the molecule (hereinafter simply referred to as "siloxane compound") can be suitably used as the epoxy compound.

The siloxane compound is a compound including a siloxane skeleton composed of a siloxane bond (Si—O—Si) and two or more groups selected from the glycidyl group and the alicyclic epoxy group in the molecule.

Examples of the siloxane skeleton in the siloxane compound include a cyclic siloxane skeleton, and a cage or ladder type polysilsesquioxane skeleton.

The siloxane compound is preferably a compound including a cyclic siloxane skeleton represented by the following formula (a1-III) (hereinafter sometimes referred to as "cyclic siloxane").

(a1-III)

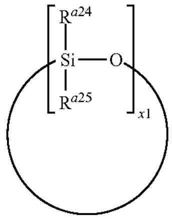

In the formula (a1-III), $R^{a24}$ and $R^{a25}$ represent a monovalent group having an epoxy group, or an alkyl group. Provided that, at least two of x1 $R^{a24}$ and x1 $R^{a25}$ in the compound represented by the formula (a1-III) is a monovalent group having a glycidyl group. x1 in the formula (a1-III) represents an integer of 3 or more. $R^{a24}$ and $R^{a25}$ in the compound represented by the formula (a1-III) may be the same or different. Plural $R^{a24}$(s) may be the same or different. Plural $R^{a25}$(s) may also be the same or different. Examples of the alkyl group include linear or branched alkyl groups having 1 or more and 18 or less carbon atoms (preferably 1 or more and 6 or less carbon atoms, and particularly preferably 1 or more and 3 or less carbon atoms) such as a methyl group, an ethyl group, a propyl group, and an isopropyl group.

x1 in the formula (a1-III) represents an integer of 3 or more, and preferably an integer of 3 or more and 6 or less in view of excellent crosslinking reactivity in the case of forming a cured film. The number of epoxy groups in the molecule possessed by the siloxane compound is 2 or more, preferably 2 or more and 6 or less in view of excellent crosslinking reactivity in the case of forming a cured film, and particularly preferably 2 or more and 4 or less.

An alicyclic epoxy group, and a glycidyl ether group represents by $-D^{A}-O-R^{a26}$ [in which, $D^{A}$ represents an alkylene group, and $R^{a26}$ represents a glycidyl group] are preferable, an alicyclic epoxy group is more preferable, and an alicyclic epoxy group represented by the following formula (a1-IIIa) or the following formula (a1-IIIb) is further preferable as the monovalent group including the epoxy group. Examples of the $D^{A}$ (the alkylene group) include a linear or branched alkylene group having 1 or more and 18 or less carbon atoms such as a methylene group, a methylmethylene group, a dimethylmethylene group, a dimethylene group, and a trimethylene group.

(a1-IIIa)

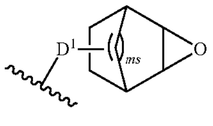

-continued (a1-IIIb)

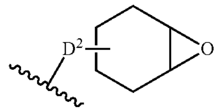

In the formula (a1-IIIa) and the formula (a1-IIIb), $D^1$ and $D^2$ each independently represent an alkylene group, and ms represents an integer of 0 or more and 2 or less.

The curable composition may include, in addition to the siloxane compound represented by the formula (a1-III), compounds including a siloxane skeleton, such as an alicyclic epoxy group-containing cyclic siloxane, an alicyclic epoxy group-containing silicone resin mentioned in Japanese Unexamined Patent Application, Publication No. 2008-248169, and an organopolysilsesquioxane resin having at least two epoxy functional groups in a molecule mentioned in Japanese Unexamined Patent Application, Publication No. 2008-19422 as the epoxy compound.

More specific examples of the siloxane compound include cyclic siloxane having two or more glycidyl groups in the molecule represented by the following formula. It is possible to use, as the siloxane compound, commercially available products, for example, trade name "X-40-2670", "X-40-2701", "X-40-2728", "X-40-2738", and "X-40-2740" (which are manufactured by Shin-Etsu Chemical Co., Ltd.).

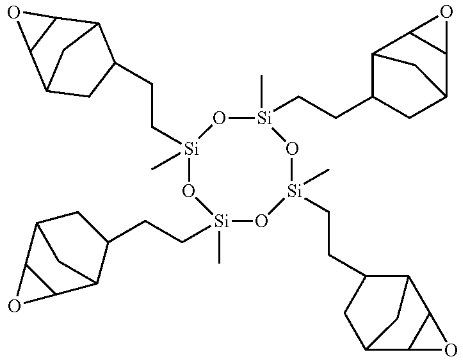

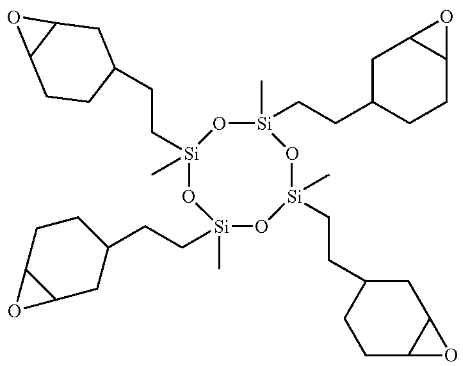

-continued
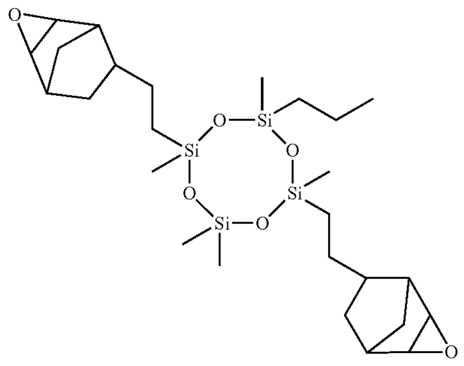
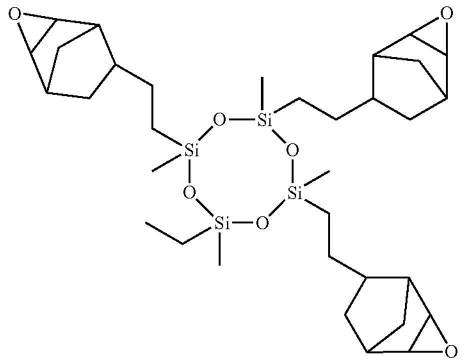
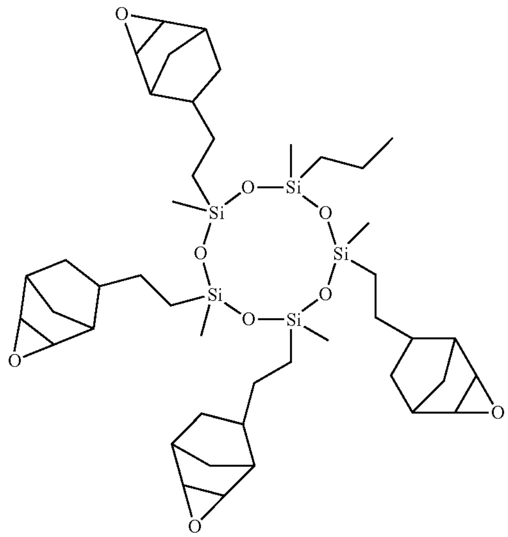
-continued
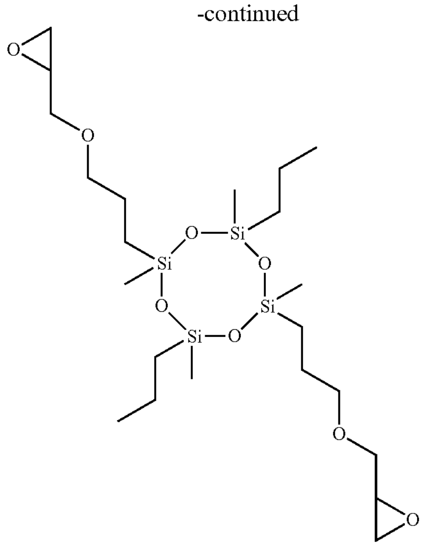
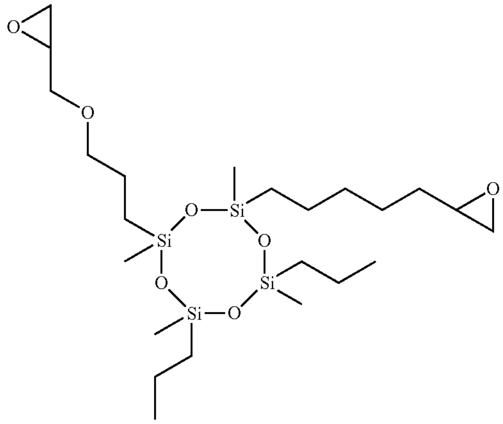
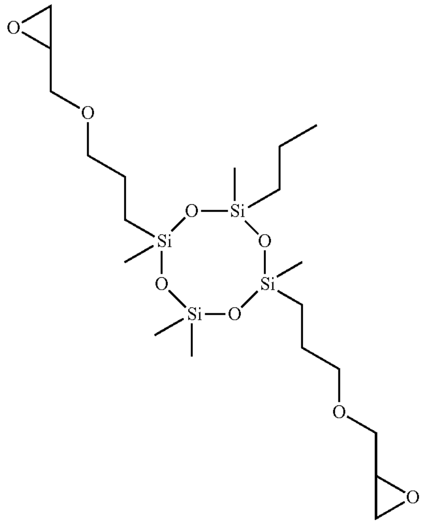

-continued

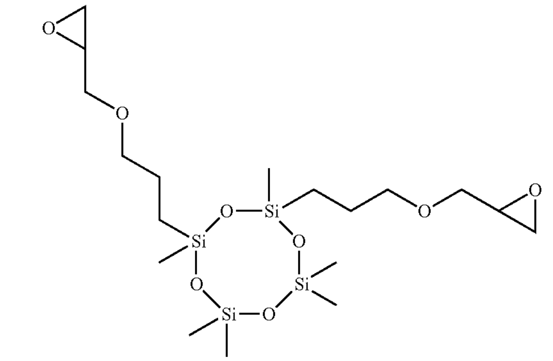

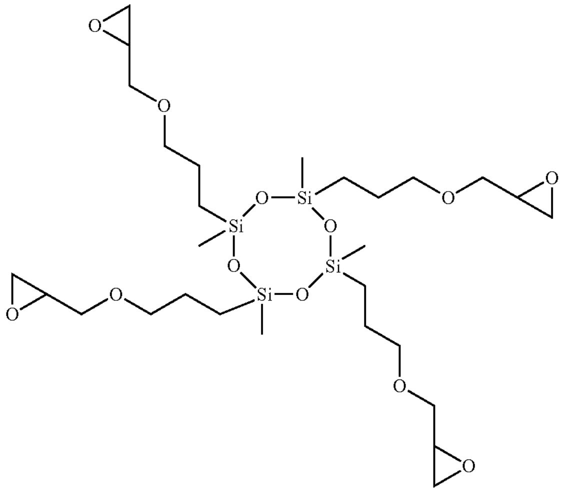

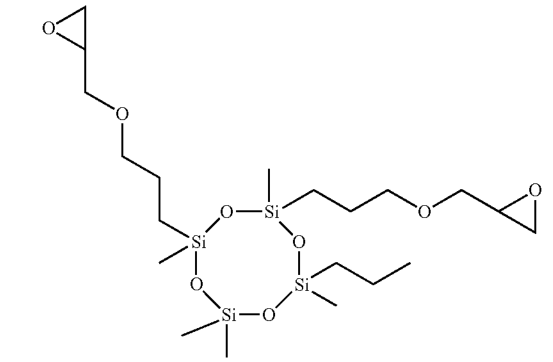

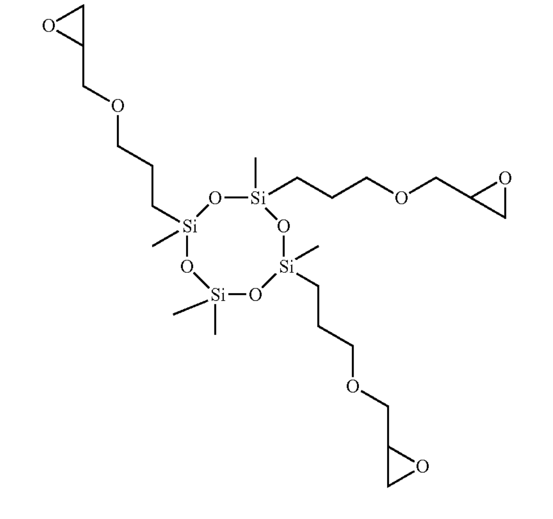

-continued

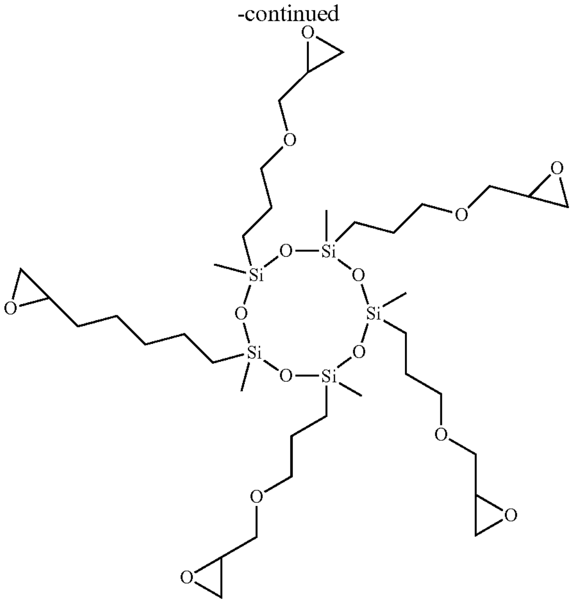

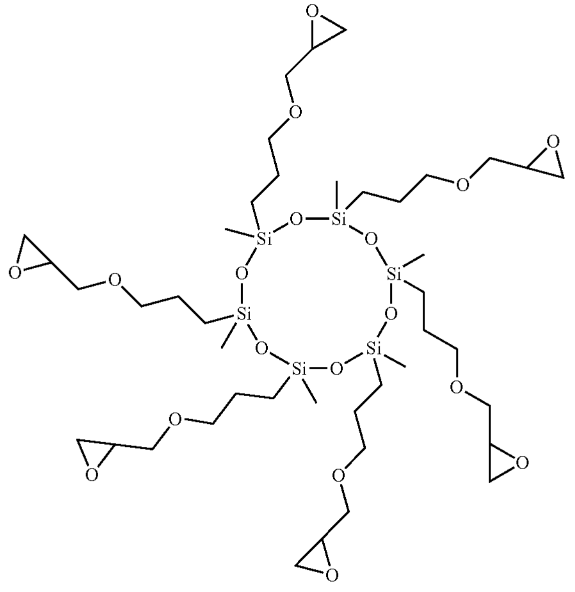

(Episulfide Compound)

There is no specific limitation on the type of the episulfide compound as long as it does not interfere with the object of the present invention. Examples of preferred episulfide compound include compounds in which the oxygen atom in the epoxy group of the epoxy compound is substituted with a sulfur atom.

(Radical Polymerizable Compound)

It is possible to use, as a radical polymerizable compound, a compound having an ethylenically unsaturated group. Examples of the compound having an ethylenically unsaturated group include a monofunctional compound and a polyfunctional compound.

Examples of the monofunctional compound include (meth)acrylamide, methylol (meth)acrylamide, methoxymethyl (meth)acrylamide, ethoxymethyl (meth)acrylamide, propoxymethyl (meth)acrylamide, butoxymethoxymethyl (meth)acrylamide, N-methylol (meth)acrylamide, N-hydroxymethyl (meth)acrylamide, (meth)acrylic acid, fumaric acid, maleic acid, maleic anhydride, itaconic acid, itaconic anhydride, citraconic acid, citraconic anhydride, crotonic acid, 2-acrylamide-2-methylpropanesulfonic acid, tert-butylacrylamidesulfonic acid, methyl (meth)acrylate, ethyl (meth)acrylate, butyl (meth)acrylate, 2-ethylhexyl (meth) acrylate, cyclohexyl (meth)acrylate, 2-hydroxyethyl (meth) acrylate, 2-hydroxypropyl (meth)acrylate, 2-hydroxybutyl (meth)acrylate, 2-phenoxy hydroxypropyl (meth)acrylate, 2-(meth)acryloyloxy hydroxypropyl phthalate, glycerin mono(meth)acrylate, tetrahydrofurfuryl (meth)acrylate, dimethylaminoethyl (meth)acrylate, glycidyl (meth)acrylate, 2,2,2-trifluoroethyl (meth)acrylate, 2,2,3,3-tetrafluoropropyl (meth)acrylate, a half (meth)acrylate of phthalic acid derivatives, and the like. These monofunctional compounds may be used alone, or in combination of two or more types thereof.

Meanwhile, examples of the polyfunctional compound include ethylene glycol di(meth)acrylate, diethylene glycol di(meth)acrylate, tetraethylene glycol di(meth)acrylate, propylene glycol di(meth)acrylate, polypropylene glycol di(meth)acrylate, butylene glycol di(meth)acrylate, neopentyl glycol di(meth)acrylate, 1,6-hexane glycol di(meth)acrylate, trimethylolpropane tri(meth)acrylate, glycerin di(meth)acrylate, pentaerythritol triacrylate, pentaerythritol tetraacrylate, dipentaerythritol pentaacrylate, dipentaerythritol hexaacrylate, pentaerythritol di(meth)acrylate, pentaerythritol tri (meth)acrylate, pentaerythritol tetra(meth)acrylate, dipentaerythritol penta(meth)acrylate, dipentaerythritol hexa (meth)acrylate, 2,2-bis(4-(meth)acryloxydiethoxyphenyl) propane, 2,2-bis(4-(meth)acryloxypolyethoxyphenyl) propane, 2-hydroxy-3-(meth)acryloyloxypropyl (meth) acrylate, ethylene glycol diglycidyl ether di(meth)acrylate, diethylene glycol diglycidyl ether di(meth)acrylate, phthalic acid diglycidyl ester di(meth)acrylate, glycerin triacrylate, glycerin polyglycidyl ether poly(meth)acrylate, urethane (meth)acrylate (i.e., tolylene diisocyanate, trimethylhexamethylene diisocyanate, or a reaction product of hexamethylene diisocyanate and 2-hydroxyethyl (meth)acrylate), methylenebis(meth)acrylamide, (meth)acrylamide methylene ether, a polyfunctional compound such as a fused product of polyhydric alcohol and N-methylol(meth)acrylamide, triacryl formal, and the like. These polyfunctional compounds may be used alone, or in combination of two or more types thereof.

Among these compounds having an ethylenically unsaturated group, trifunctional or higher polyfunctional compound is preferable, a tetrafunctional or higher polyfunctional compound is more preferable, and a pentafunctional or higher polyfunctional compound is still more preferable, in view of the fact that they tend to increase the adhesion of the cured product to the base material, and the strength of the curable composition after curing.

An amount of the polymerizable compound (A) is not particularly limited as long as the desired effect is not impaired. For example, the amount of the polymerizable compound (A) is 3% by mass or more and 95% by mass or less, preferably 5% by mass or more and 30% by mass or less in view of curability, more preferably 5% by mass or more and 29% by mass or less in view of easily achieving both curability and optical property, further preferably 7% by mass or more and 20% by mass or less, particularly preferably 7% by mass or more and 15% by mass or less, relative to a mass of the all components other than the solvent (S).

<Metal Oxide Microparticles (B)>

The curable composition includes metal oxide microparticles (B). The metal oxide microparticles (B) contribute to a high refractive index of the cured product of the curable composition. The metal oxide microparticles (B) includes titanium oxide microparticles (B1). By including the titanium oxide microparticles (B1) as the metal oxide microparticles (B) in the curable composition, the metal oxide microparticles are easily highly loaded in the curable composition. As a result, the cured product with high refractive index can be easily formed.

The metal oxide microparticles (B) may include other metal oxide microparticles (B2) other than the titanium oxide microparticles (B1) together with the titanium oxide microparticles (B1). Suitable examples of other metal oxide microparticles (B2) include zirconium oxide microparticles, barium titanate microparticles, and cerium oxide microparticles. The metal oxide microparticles (B) may include two or more other metal oxide microparticles (B2) in combination. A mass ratio of the titanium oxide microparticles is preferably 70% by mass or more, more preferably 80% by mass or more, further preferably 90% by mass or more, and particularly preferably 100% by mass relative to a mass of the metal oxide microparticles (B).

In view of transparency of the cured product, an average particle diameter of the metal oxide microparticles is preferably 500 nm or smaller, and more preferably 2 nm or larger and 100 nm or smaller.

When the curable composition includes the polymerizable fluorene compound (A) having the radical polymerizable group-containing group, surfaces of the metal oxide microparticles (B) may be modified with an ethylenically double bond containing-group. When the surfaces of the metal oxide microparticles (B) are modified with the ethylenically double bond containing-group, during the formation of the cured product, the metal oxide microparticles (B) are fixed in a matrix consisting of a polymer of the polymerizable fluorene compound (A1) by polymerizing the polymerizable fluorene compound (A1) with the metal oxide microparticles. Therefore, when a surface of the metal oxide microparticles is modified with the ethylenically unsaturated double bond-containing group, localization of metal oxide microparticles (B) in the cured product is easily suppressed.

For example, by acting a capping agent having the ethylenically double bond to the surfaces of the metal oxide microparticles (B), the metal oxide microparticles modified with the ethylenically double bond-containing group.

A method for bonding the capping agent to the surfaces of the metal oxide microparticles (B) via a chemical bond such as a covalent bond is not particularly limited. Usually, hydroxy groups exist on the surfaces of the metal oxide microparticles (B). By reacting such hydroxy groups and the capping agents, the capping agents covalently binds to the surfaces of the metal oxide microparticles (B). Preferred examples of the reactive group possessed by the capping agent include a trialkoxysilyl group such as a trimethoxysilyl group or a triethoxysilyl group; a dialkoxysilyl group such as a dimethoxysilyl group or a diethoxysilyl group; a monoalkoxysilyl group such as a monomethoxysilyl group or a monoethoxysilyl group; a trihalosilyl group such as a trichlorosilyl group; a dihalosilyl group such as a dichlorosilyl group; a monohalosilyl group such as a monochlorosilyl group; a carboxy group; a halocarbonyl group such as a chlorocarbonyl group; a hydroxy group; a phosphono group ($-P(=O)(OH)_2$); and a phosphate group ($-O-P(=O)(OH)_2$).

A trialkoxysilyl group, a dialkoxysilyl group, a monoalkoxysilyl group, a trihalosilyl group, a dihalosilyl group, and a monohalosilyl group form a siloxane bond together with a surface of a metal oxide microparticles (B). A carboxy group and a halocarbonyl group forms a bond represented by (metal oxide-O—CO—) together with a surface of a metal oxide microparticles (B). A hydroxy group forms a bond represented by (metal oxide —O—) together with a surface of the metal oxide microparticles (B). A phosphono group and a phosphate group forms a bond represented by metal oxide-O—P(=O)<) together with a surface of a metal oxide microparticles (B).

In the capping agent, a hydrogen atom and various organic groups are exemplified as a group to be bonded to the above-described reactive group. The organic group may include a hetero atom such as O, N, S, P, B, Si and halogen atom. Examples of the group to be bonded to the reactive group include an alkyl group which may be linear or branched and may be interrupted with an oxygen atom (—O—), an alkenyl group which may be linear or branched and may be interrupted with an oxygen atom (—O—), an alkynyl group which may be linear or branched and may be interrupted with an oxygen atom (—O—), a cycloalkyl group, an aromatic hydrocarbon group, a heterocyclic group, and the like. These groups may be substituted with a substituent such as a halogen atom, an epoxy group-containing group such as a glycidyl group, a hydroxy group, a mercapto group, an amino group, a (meth)acryloyl group, an isocyanate group, and the like. There is no particular limitation on the number of substituents.

The group to be bonded to the reactive group is also preferably a group represented by $—(SiR^{b1}R^{b2}—O—)_r—(SiR^{b3}R^{b4}—O—)_s—R^{b5}$. $R^{b1}$, $R^{b2}$, $R^{b3}$, and $R^{b4}$ each are an organic group which may be the same or different. Suitable examples of the organic group include an alkyl group such as a methyl group or an ethyl group; an alkenyl group such as a vinyl group or an allyl group; an aromatic hydrocarbon group such as a phenyl group, a naphthyl group, or a tolyl group; an epoxy group-containing group such as a 3-glycidoxypropyl group; a (meth)acryloyloxy group, and the like. Examples of $R^{b5}$ in the above formula include terminal groups such as $—Si(CH_3)_3$, $—Si(CH_3)_2H$, $—Si(CH_3)_2(CH=CH_2)$, and $—Si(CH_3)_2(CH_2CH_2CH_2CH_3)$. r and s in the above formula each independently is an integer of 0 to 60. Both r and s in the above formula are not 0.

Suitable specific examples of the capping agent include unsaturated group-containing alkoxysilanes such as a vinyltrimethoxysilane, a vinyltriethoxysilane, an allyltrimethoxysilane, and allyltriethoxysilane, a 1-hexenyltrimethoxysilane, a 1-hexenyltriethoxysilane, a 1-octenyltrimethoxysilane, a 1-octenyltriethoxysilane, a 3-acryloyoxypropyltrimethoxyxilane, 3-acryloyloxypropyltriethoxysilane, 3-methacryloyoxypropyltrimethoxysilane, and 3-methacryloyloxypropytriethoxysilane; unsaturated group-containing alcohols such as a 2-hydroxyethyl (meth) acrylate, a 3-hydroxypropyl (meth)acrylate, an allylalcohol, an ethyleneglycol monoallylether, a propyleneglycol monoallylether, and 3-allyloxypropanol; a (meth)acrylic acid; (meth)acrylic halides such as a (meth)acrylic chloride.

An amount of the capping agent used to bind the capping agent to the surfaces of the metal oxide microparticles (B) via a chemical bond such as a covalent bond is not particularly limited. Preferably, it is used to the capping agent in the amount enough to react with almost all of hydroxy groups of the surface of the metal oxide microparticles (B).

There is no particular limitation on the content of the metal oxide microparticles (B) in the curable composition as long as the object of the present invention is not impaired. An amount of the metal oxide microparticles (B) in the curable composition is preferably 50% by mass or more and 98% by mass or less, more preferably 70% by mass or more and 97% by mass or less, and further preferably 90% by mass or more and 95% by mass or less relative to the mass of curable composition excluding the mass of the solvent (S). In particular, in view of high refractive index of the cured product, an amount of the titanium oxide microparticles (B1) in the curable composition is preferably 90% by mass or more relative to the mass of curable composition excluding the mass of the solvent (S).

<Initiator (C)>

The curable composition includes an initiator (C) for curing the above-mentioned polymerizable compound (A). The initiator (C) includes a thermal initiator (C1). By including the aforementioned polymerizable fluorene compound (A1) and the thermal initiator (C1) in combination in the curable composition, the cured product having a high transparency, a resistance to loss of transparency when heated, and an excellent organic solvent resistance can be formed.

The initiator (C) may include other initiator other than the thermal initiator (C1) as long as the desired effect is not impaired. Typically, other initiator is a photo initiator (C2). The photo initiator (C2) cures the aforementioned polymerizable compound (A) by exposure. Since the above-described desired effect is easily obtained, the lower the content of photo initiator (C2) in the curable composition, the more desirable it is. A content of the photo initiator (C2) is preferably 1 part by mass or less, more preferably 0.5 parts by mass or less, further preferably 0.1 parts by mass or less, and particularly preferably 0.01 parts by mass or less. The curable composition most preferably includes no photo initiator (C2).

Some initiators (C) are both thermosensitive and photosensitive. In the description and the claims, an initiator having both of thermosensitivity and photosensitivity is the thermal initiator (C1).

[Thermal Initiator (C1)]

When the polymerizable fluorene compound (A1) has the cationic polymerizable group-containing group, the curable composition usually includes a thermal cationic polymerization initiator (C1a) as a thermal initiator (C1). When the polymerizable fluorene compound (A1) has the radical polymerizable group-containing group, the curable composition includes a thermal radical polymerization initiator (C1b) as a thermal initiator (C1).

(Thermal Cationic Polymerization Initiator (C1a))

It is possible to use, as the thermal cationic polymerization initiator (C1a), a thermal cationic polymerization initiator, which has hitherto been mixed in various cationic polymerizable curable composition, without particular limitation. For example, suitable examples of the thermal cationic polymerization initiator (C1a) include diphenyliodonium hexafluoroarsenate, diphenyliodonium hexafluorophosphate, diphenyliodonium trifluoromethanesulfonate, triphenylsulfonium tetrafluoroborate, tri-p-tolylsulfonium hexafluorophosphate, tri-p-tolylsulfonium trifluoromethanesulfonate, bis(cyclohexylsulfonyl)diazomethane, bis(tert-butylsulfonyl)diazomethane, bis(p-toluenesulfonyl)diazomethane, triphenylsulfonium trifluoromethanesulfonate, diphenyl-4-methylphenylsulfonium trifluoromethanesulfonate, diphenyl-2,4,6-trimethylphenylsulfonium-p-toluenesulfonate, diphenyl-p-phenylthiophenylsulfoniumhexafluorophosphate, and the like. These thermal cationic polymerization initiators may be used in combination of two or more types thereof.

Examples of the thermal cationic polymerization initiator (C1a) include diazonium salt type initiators such as AMERICURE Series (manufactured by American Can Co.) and ULTRASET Series (manufactured by ADEKA CORPORA- TION), WPAG Series (manufactured by Wako Pure Chemical Industries, Ltd.); iodonium salt type initiators such as UVE Series (manufactured by General Electric Company), FC Series (manufactured by 3M Company), UV9310C (manufactured by GE Toshiba Silicones Co., Ltd.), and WPI Series (manufactured by Wako Pure Chemical Industries, Ltd.); and sulfonium salt type initiators such as CYRACURE Series (manufactured by Union Carbide Corporation), UVI Series (manufactured by General Electric Company), FC Series (manufactured by 3M Company), CD Series (manufactured by qSartomer Co.), Optomer SP Series (manufactured by ADEKA CORPORATION), Optomer CP Series (manufactured by ADEKA CORPORATION), SAN-AID SI Series (manufactured by Sanshin Chemical Industry Co., Ltd.), CI Series (manufactured by Nippon Soda Co., Ltd.), WPAG Series (manufactured by Wako Pure Chemical Industries, Ltd.), and CPI Series (manufactured by San-Apro Ltd.).

In view of thermal curability of the curable composition and transparency of the cured product, an onium salt having a cation moiety represented by the following formula (c1) is preferable as the thermal cationic polymerization initiator (C1a).

$$R^{c02}\text{-}D^{+}\text{-}(R^{c01})_u \qquad \text{(c1)}$$

In the formula (c1), $R^{c01}$ is a monovalent organic group, D is a Group 15 to 17 (IUPAC notation) element having an atomic value u, $R^{c02}$ is an optionally substituted alkyl group or an optionally substituted aralkyl group. However, when $R^{c02}$ is an optionally substituted alkyl group, at least one of $R^{c01}$(s) is an optionally substituted alkyl group. u is an integer of 1 or more and 3 or less, a plurality of $R^{c01}$ may be the same as or different from each other, or bonded to form a ring together with D.

D in the formula (c1) is a Group 15 to 17 (IUPAC notation) element having an atomic value u. Among the Group 15 to 17 (IUPAC notation) elements, preferable elements as D are S (sulfur), Se (serenium), N (nitrogen), I (iodine), and P (phosphorus). Corresponding onium ions are a sulfonium ion, an ammonium ion, an iodonium ion, and a phosphonium ion. These are preferable because they are stable and easy to handle. A sulfonium ion and an iodonium ion are more preferable because they are excellent in cation polimerizability.

In the formula (c1), $R^{c01}$ represents an organic group bonded to D. When a plurality of $R^{c01}$ is present, the plurality of $R^{c01}$ may be the same as or different from each other. Examples of $R^{c01}$ include an aromatic hydrocarbon group having 6 or more and 14 or less carbon atoms, an alkyl group having 1 or more and 18 or less carbon atoms, an alkenyl group having 2 or more and 18 or less carbon atoms, and an alkynyl group having 2 or more and 18 or less carbon atoms.

Examples of a substituent, which the aromatic hydrocarbon group, the aralkyl group, the alkyl group, the alkenyl group, and the alkynyl group as $R^{c01}$ may have, include an alkyl group having 1 or more and 18 or less carbon atoms, an alkenyl group having 2 or more and 18 or less carbon atoms, an alkynyl group having 2 or more and 18 or less carbon atoms, an aryl group having 6 or more and 14 or less carbon atoms, a nitro group, a hydroxy group, a cyano group, an alkoxy group having 1 or more and 18 or less carbon atoms, an aryloxy group having 6 or more and 14 or less carbon atoms, an aliphatic acyl group having 2 or more and 19 or less carbon atoms, an aromatic acyl group having 7 or more and 15 or less carbon atoms, an aliphatic acyloxy group having 2 or more and 19 or less carbon atoms, an aromatic acyloxy group having 7 or more and 15 or less carbon atoms, an alkylthio group having 1 or more and 18 or less carbon atoms, an arylthiol group having 6 or more and 14 or less carbon atoms, an amino group in which 1 or 2 hydrogen atoms may be substituted with a hydrocarbon group having 1 or more and 18 or less carbon atoms, and a halogen atom.

When the above-described substituent is a halogenated alkyl group, suitable examples of the halogenated alkyl group include linear halogenated alkyl groups such as a trifluoromethyl group, a trichloromethyl group, a pentafluoroethyl group, a 2,2,2-trichloroethyl group, a 2,2,2-trifluoroethyl group, a 1,1-difluoroethyl group, a heptafluoro-n-propyl group, a 1,1-difluoro-n-propyl group, a 3,3,3-trifluoro-n-propyl group, a nonafluoro-n-butyl group, a 3,3,4,4,4-pentafluoro-n-butyl group, a perfluoro-n-pentyl group, and a perfluoro-n-octyl group; and branched halogenated alkyl groups such as a hexafluoroisopropyl group, a hexachloroisopropyl group, a hexafluoroisobutyl group, and a nonafluoro-tert-butyl group.

When the above-described substituent is a halogenated aliphatic cyclic group, suitable examples of the halogenated aliphatic cyclic group include a pentafluorocyclopropyl group, a nonafluorocyclobutyl group, a perfluorocyclopentyl group, a perfluorocyclohexyl group, perfluoroadamantyl group, and the like.

When the above-described substituent is an alkoxy group, suitable examples of the alkoxy group include a linear alkoxy group such as a methoxy group, an ethoxy group, an n-propyloxy group, an n-butyloxy group, an n-pentyloxy group, an n-hexyloxy group, an n-octyloxy group, an n-nonyloxy group, an n-decyloxy group, an n-undecyloxy group, an n-dodecyloxy group, an n-tetradecyloxy group, an n-pentadecyloxy group, an n-hexadecyloxy group, an n-heptadecyloxy group, and an n-octadecyloxy group; a branched alkoxy group such as an isopropyloxy group, an isobutyloxy group, a sec-butyloxy group, a tert-butyloxy group, an isopentyloxy group, a neopentyloxy group, a tert-pentyloxy group, an isohexyloxy group, a 2-ethylhexyloxy group, 1,1,3,3-tetramethylbutyloxy group, and the like.

When the above-described substituent is an aryloxy group, suitable examples of the aryloxy group include a phenoxy group, an α-naphthyloxy group, a β-naphthyloxy group, a biphenyl-4-yloxy group, a biphenyl-3-yloxy group, a biphenyl-2-yloxy group, an anthryloxy group, and a phenanthryloxy group, and the like.

When the above-described substituent is an aliphatic acyl group, suitable examples of the aliphatic acyl group include an acetyl group, a propanoyl group, a butanoyl group, a pentanoyl group, a hexanoyl group, a heptanoyl group, an octanoyl group, and the like.

When the above-described substituent is an aliphatic acyl group, suitable examples of the aliphatic acyl group include an acetyl group, a propanoyl group, a butanoyl group, a pentanoyl group, a hexanoyl group, a heptanoyl group, an octanoyl group, and the like.

When the above-described substituent is an aromatic acyl group, suitable examples of the aromatic acyl group include a benzoyl group, an α-naphthoyl group, a β-naphthoyl group, a biphenyl-4-ylcarbonyl group, a biphenyl-3-ylcarbonyl group, a biphenyl-2-ylcarbonyl group, an anthrylcarbonyl group, and a phenanthrylcarbonyl group, and the like.

When the above-described substituent is an aliphatic acyloxy group, suitable examples of the aliphatic acyloxy group include an acetyl group, a propanoyloxy group, a butanoyloxy group, a pentanoyloxy group, a hexanoyloxy group, a heptanoyloxy group, an octanoyloxy group, and the like.

When the above-described substituent is an aromatic acyloxy group, suitable examples of the aromatic acyloxy group include a benzoyloxy group, an α-naphthoyloxy group, a β-naphthoyloxy group, a biphenyl-4-ylcarbonyloxy group, a biphenyl-3-ylcarbonyloxy group, a biphenyl-2-ylcarbonyloxy group, an anthrylcarbonyloxy group, and a phenanthrylcarbonyloxy group, and the like.

When the above-described substituent is an alkylthio group or an arylthio group, suitable examples of the alkylthio group or the arylthio group include a group in which an oxygen atom is substituted with a sulfur atom in the above-described alkoxy group or the above-described aryloxy group.

When the above-described substituent is the amino group optionally substituted with a hydrocarbon group, suitable examples of the amino group optionally substituted with a hydrocarbon group include an amino group, a methylamino group, an ethylamino group, an n-propylamino group, a dimethylamino group, a diethylamino group, a methylethylamino group, a di-n-propylamino group, a piperizino group, and the like.

When the above-described substituent is the halogen atom, suitable example of the halogen atom includes a fluorine atom, a chlorine atom, a bromine atom, and an iodine atom.

Among the above-described substituents, in view of high activity of the thermal cationic polymerization initiator (C1a), the halogenated alkyl group having 1 or more and 8 or less carbon atoms, the halogen atom, the nitro group, and the cyano group are preferred, and the fluorinated alkyl group having 1 or more and 8 or less carbon atoms are more preferred.

In the formula (c1), a plurality of $R^{c01}$ is present, the plurality of $R^{c01}$ may form a ring together with D. The ring formed by the plurality of $R^{c01}$ and D may include at least one bond selected from the group consisting of —O—, —S—, —SO—, —$SO_2$—, —NH—, —CO—, —COO—, and —CONH—.

In the formula (c1), specific examples of the alkyl group as $R^{c02}$ include a linear alkyl group having 1 or more and 18 or less carbon atoms, such as a methyl group, an ethyl group, an n-propyl group, an n-butyl group, an n-pentyl group, an n-octyl group, an n-decyl group, an n-dodecyl group, an n-tetradecyl group, an n-hexadecyl group, an n-octadecyl group; branched alkyl group having 3 or more and 18 or less carbon atoms, such as an isopropyl group, an isobutyl group, a sec-butyl group, a tert-butyl group, an isopentyl group, a neopentyl group, a tert-pentyl group, an isohexyl group, and an isooctadecyl group; a cycloalkyl group having 3 or more and 18 or less carbon atoms, such as a cyclopropyl group, a cyclobutyl group, a cyclopentyl group, a cyclohexyl group, and a 4-decyl cyclohexyl group, and the like.

In the formula (c1), when $R^{c2}$ is an optionally substituted alkyl group, at least one of the $R^{c01}$(s) is an optionally substituted alkyl group.

In the formula (c1), specific examples of the aralkyl group as $R^{c02}$ include a lower alkyl group substituted with an aryl group having 6 or more and 10 or less carbon atoms, such as a benzyl group, a 1-naphthyl methyl group, a 2-naphthyl methyl group, and the like.

In the formula (c1), specific examples of the substituted aralkyl group as $R^{c02}$ include a lower alkyl group substituted with an optionally substituted aryl group having 6 or more and 10 or less carbon atoms, such as a 2-methyl benzyl group.

In the formula (c1), $R^{c02}$ is preferably an optionally substituted aralkyl group, and more preferably a cation moiety represented by the following formula (c1-1).

(c1-1)

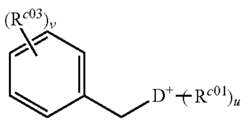

In the formula (c1-1), $R^{c01}$, D, and u are the same as those in the formula (c1). $R^{c03}$ is a monovalent organic group, v is an integer of 0 or more and 5 or less. A plurality of $R^{c03}$ may be the same as or different from each other.

In the formula (c1-1), a monovalent organic group as $R^{c03}$ is preferably an alkyl group, and examples thereof include the same as the alkyl group of $R^{c02}$ in the formula (c1). v is preferably 0 or 1.

Specific examples of the cation moiety represented by the formula (c1) or (c1-1) will be described below. D' in the following specific examples is a S atom or a Se atom, and preferably a S atom.

(c1-c1)

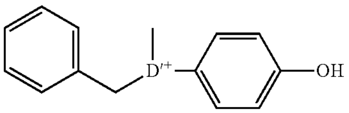

(c1-c2)

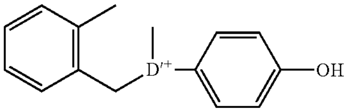

(c1-c3)

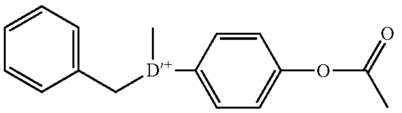

(c1-c4)

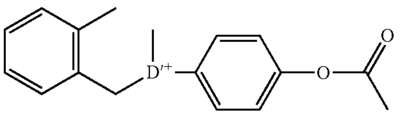

(c1-c5)

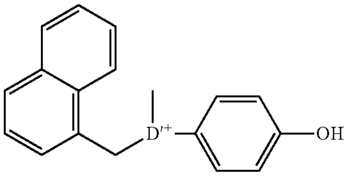

(c1-c6)

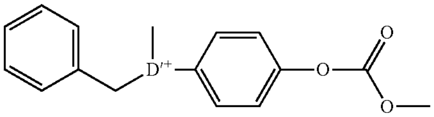

(c1-c6)

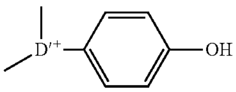

-continued (c1-c7)

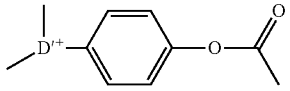

An anion moiety forming the onium salt with the cation moiety represented by the formula (c1) is not particularly limited as long as an onium salt having the cation moiety represented by the formula (c1) acts as the thermal cationic polymerization initiator ($C_1a$). In view of curability of the curable composition and transparency of the cured product, the onium salt having the cation moiety represented by the formula ($C_1$) preferably has an anion moiety consisting of a gallium-containing anion.

As a counter anion to the cation moiety represented by the formula (C1), an anion moiety represented by the formula (ci) described below and an anion moiety represented by the formula (cii) described below.

(ci)

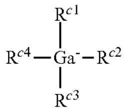

In the formula (c1), $R^{c1}$, $R^{c2}$, $R^{c3}$, and $R^{c4}$ are each independently an optionally substituted hydrocarbon group or an optionally substituted heterocyclic group, and at least one of $R^{c1}$, $R^{c2}$, $R^{c3}$, and $R^{c4}$ is an optionally substituted aromatic hydrocarbon group.

(cii)

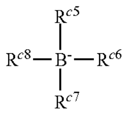

In the formula (cii), $R^{c5}$, $R^{c6}$, $R^{c7}$, and $R^{c8}$ are each independently an optionally substituted hydrocarbon group or an optionally substituted heterocyclic group, and at least one of $R^{c5}$, $R^{c6}$, $R^{c7}$, and $R^{c8}$ is an optionally substituted aromatic hydrocarbon group.

A number of carbon atoms of the hydrocarbon group or the heterocyclic group as $R^{c1}$ to $R^{c4}$ in the formula (ci) is not particularly limited, preferably 1 or more and 50 or less, more preferably 1 or more and 30 or less, and particularly preferably 1 or more and 20 or less.

Specific examples of the hydrocarbon group as $R^{c1}$ to $R^{c4}$ includes a linear or branched alkyl group, a linear or branched alkenyl group, a linear or branched alkynyl group, an aromatic hydrocarbon group, an alicyclic hydrocarbon group, an aralkyl group, and the like. As described above, at least one of $R^{c1}$, $R^{c2}$, $R^{c3}$, and $R^{c4}$ is the optionally substituted aromatic hydrocarbon group, it is preferable that at least three of $R^{c1}$, $R^{c2}$, $R^{c3}$, and $R^{c4}$ are the optionally substituted aromatic hydrocarbon groups, and it is particularly preferable that all of $R^{c1}$, $R^{c2}$, $R^{c3}$, and $R^{c4}$ are the optionally substituted aromatic hydrocarbon groups.

The substituent that the hydrocarbon group or the heterocyclic group as $R^{c1}$ to $R^{c4}$ may have is the same as the substituent that the aromatic hydrocarbon group, the aralkyl groups, the alkyl groups, the alkenyl groups, and the alkynyl groups as $R^{c01}$ in the formula (c1).

When the hydrocarbon group as $R^{c1}$ to $R^{c4}$ is the aromatic hydrocarbon group, the aromatic hydrocarbon group is substituted with one or more substituents selected from the group consisting or an alkyl group having 1 or more and 18 or less carbon atoms, an alkenyl group having 2 or more and 18 or less carbon atoms, and an alkynyl group having 2 or more and 18 or less carbon atoms.

When the hydrocarbon group as $R^{c1}$ to $R^{c4}$ has a substituent, a number of the substituent is not particularly limited, and may be 1 or 2 or more. When the number of substituents is plural, said plurality of substituents may be the same or different from each other.

When $R^{c1}$ to $R^{c4}$ are an alkyl group, suitable specific examples thereof include straight chain alkyl groups such as a methyl group, an ethyl group, an n-propyl group, an n-butyl group, an n-pentyl group, an n-hexyl group, an n-octyl group, an n-nonyl group, an n-decyl group, an n-undecyl group, an n-dodecyl group, n-tridecyl group, an n-tetradecyl group, an n-pentadecyl group, an n-hexadecyl group, an n-heptadecyl group, an n-octadecyl group, an n-nonadecyl group, and an n-icosyl group; and branched chain alkyl groups such as an isopropyl group, an isobutyl group, a sec-butyl group, a tert-butyl group, an isopentyl group, a neopentyl group, a tert-pentyl group, an isohexyl group, a 2-ethylhexyl group, and 1,1,3,3-tetramethylbutyl group.

When $R^{c1}$ to $R^{c4}$ are an alkenyl group or an alkynyl group, suitable specific examples thereof include alkenyl groups and alkynyl groups that correspond to the above-described suitable groups as the alkyl group.

When $R^{c1}$ to $R^{c4}$ are an aromatic hydrocarbon group, suitable specific examples thereof include a phenyl group, an α-naphthyl group, a β-naphthyl group, a biphenyl-4-yl group, a biphenyl-3-yl group, a biphenyl-2-yl group, an anthryl group, and a phenanthryl group, and the like.

When $R^{c1}$ to $R^{c4}$ are an alicyclic hydrocarbon group, suitable examples thereof include cycloalkyl groups such as a cyclopropyl group, a cyclobutyl group, a cyclopentyl group, a cyclohexyl group, a cyclopentyl group, a cyclooctyl group, a cyclononyl group, and a cyclodecyl group; and cross-linking aliphatic cyclic hydrocarbon groups such as a norbornyl group, an adamantyl group, a tricyclodecyl group, and a pinanyl group.

When $R^{c1}$ to $R^{c4}$ are an aralkyl group, suitable examples thereof include a benzyl group, a phenethyl group, an α-naphtylmethyl group, a β-naphtylmethyl group, an α-naphtylethyl group, and a β-naphtylethyl group, and the like.

When $R^{c1}$ to $R^{c4}$ are a heterocyclic group, suitable examples thereof include a thienyl group, a furanyl group, a selenophenyl group, a pyranyl group, a pyrrolyl group, an oxazolyl group, a thiazolyl group, a pyridyl group, a pyrimidyl group, a pyrazinyl group, an indolyl group, a benzofuranyl group, a benzothienyl group, a quinolyl group, an isoquinolyl group, a quinoxalinyl group, a quinazolinyl group, a carbazolyl group, an acridinyl group, a phenothiazinyl group, a phenazinyl group, a xanthenyl group, a thianthrenyl group, a phenoxazinyl group, a phenoxathiinyl group, a chromanyl group, an isochromanyl group, a dibenzothienyl group, a xanthonyl group, a thioxanthonyl group, and a dibenzofuranyl group, and the like.

Among the substituents which may be possessed by the hydrocarbon group or the heterocyclic group as $R^{c1}$ to $R^{c4}$, in view of high activity of the thermal cationic polymerization initiator (C1a), a halogenated alkyl group having 1 or more and 8 or less carbon atoms, a halogen atom, a nitro group, and a cyano group are preferred, and a fluorinated alkyl group having 1 or more and 8 or less carbon atoms is more preferred.

As $R^{c5}$ to $R^{c8}$ in the formula (cii), the same groups as the groups described above for $R^{c1}$ to $R^{c4}$ in the formula (ci) are exemplified.

Suitable specific examples of the anion represented by the formula (ci) described above include tetrakis(4-nonafluorobiphenyl)gallium anion, tetrakis(1-heptafluoronaphthyl)gallium anion, tetrakis(pentafluorophenyl)gallium anion, tetrakis(3,4,5-trifluorophenyl)gallium anion, tetrakis(2-nonaphenylbiphenyl)gallium anion, tetrakis(2-heptafluoronaphthyl)gallium anion, tetrakis(7-nonafluoroanthryl)gallium anion, tetrakis(4'-(methoxy)octafluorobiphenyl)gallium anion, tetrakis(2,4,6-tris(trifluoromethyl)phenyl)gallium anion, tetrakis(3,5-bis(trifluoromethyl)phenyl)gallium anion, tetrakis(2,3-bis(pentafluoroethyl)naphthyl)gallium anion, tetrakis(2-isopropoxy-hexafluoronaphthyl)gallium anion, tetrakis(9,10-bis(heptafluoropropyl)heptafluoroanthryl)gallium anion, tetrakis(9-nonafluorophenanthryl)gallium anion, tetrakis(4-[tri(isopropyl)silyl]-tetrafluorophenyl)gallium anion, tetrakis(9,10-bis(p-tolyl)-heptafluorophenanthryl)gallium anion, tetrakis(4-[dimethyl(t-butyl)silyl]-tetrafluorophenyl)gallium anion, monophenyltris(pentafluorophenyl)gallium anion, and monoperfluorobutyltris(pentafluorophenyl)gallium anion, and the like, and more preferably the following anions.

(ci-a1)

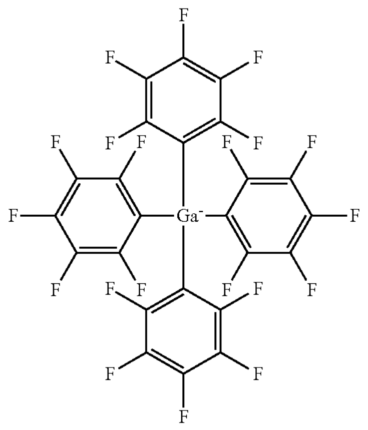

(ci-a2)

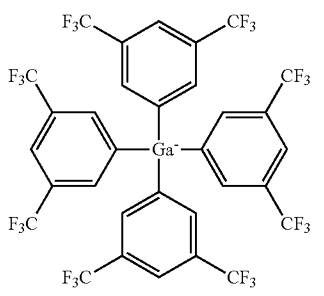

-continued (ci-a3)

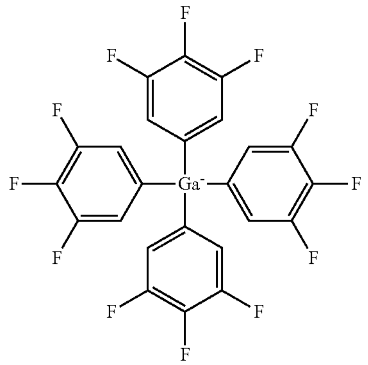

(ci-a4)

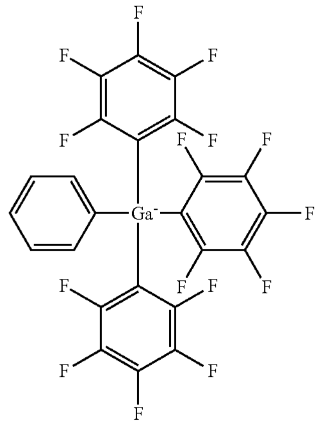

(ci-a5)

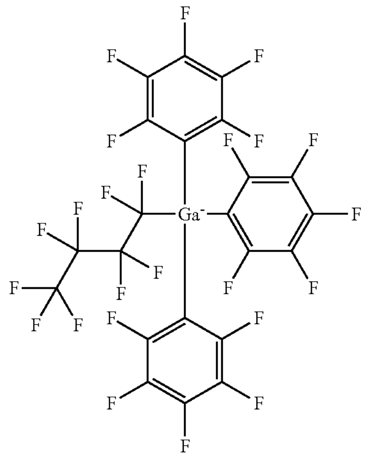

Furthermore, specific examples of the anion moiety represented by the formula (cii) described above include tetrakis(4-nonafluorobiphenyl)boron anion, tetrakis(1-heptafluoronaphthyl)boron anion, tetrakis(pentafluorophenyl)boron anion, tetrakis(3,4,5-trifluorophenyl)boron anion, tetrakis(2-nonaphenylbiphenyl)boron anion, tetrakis(2-heptafluoronaphthyl)boron anion, tetrakis(7-nonafluoroanthryl)boron anion, tetrakis(4'-(methoxy)octafluorobiphenyl)boron anion, tetrakis(2,4,6-tris(trifluoromethyl)phenyl)boron anion, tetrakis(3,5-bis(trifluoromethyl)phenyl)boron anion, tetrakis(2,3-bis(pentafluoroethyl)naphthyl)boron anion, tetrakis(2-isopropoxy-hexafluoronaphthyl)boron anion, tetrakis(9,10-bis(heptafluoropropyl)heptafluoroanthryl)boron anion, tetrakis(9-nonafluorophenanthryl)boron anion, tetrakis(4-[tri(isopropyl)silyl]-tetrafluorophenyl)boron anion, tetrakis(9,10-bis(p-tolyl)-heptafluorophenanthryl)boron anion, tetrakis(4-[dimethyl(t-butyl)silyl]-tetrafluorophenyl) boron anion, monophenyltris(pentafluorophenyl)boron anion, and monoperfluorobutyltris(pentafluorophenyl)boron anion, and the like, and more preferably the following anions.

(cii-a1)

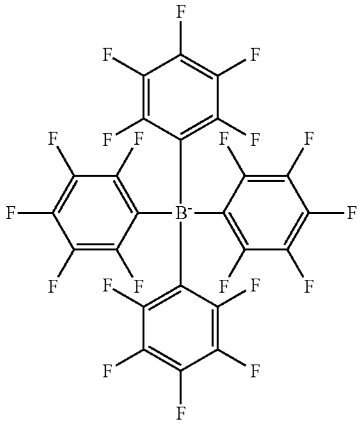

(cii-a2)

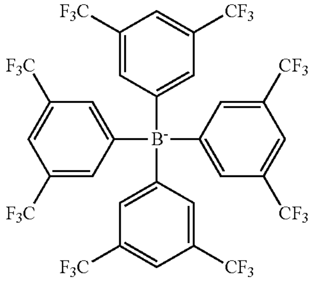

(cii-a3)

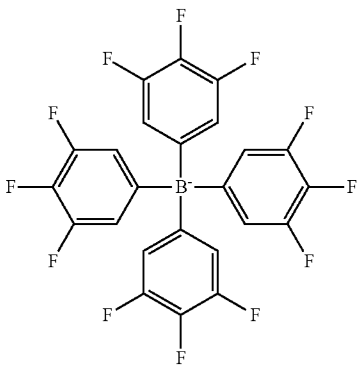

-continued (cii-a4)

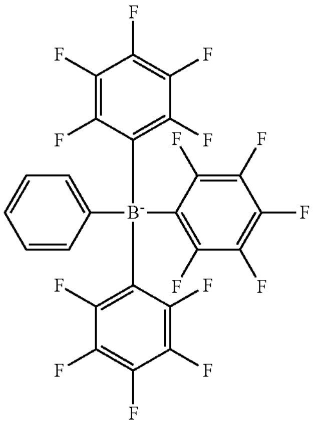

(cii-a5)

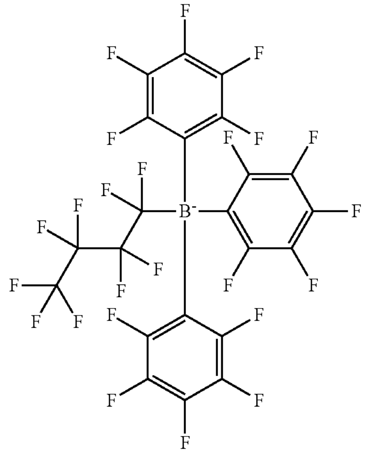

Other monovalent polyatomic anion is also suitably exemplified as a counter anion to the cation moiety represented by the formula (c1), and anions represented by $MY_a^-$, $(Rf)_bPF_{6-b}^-$, $R^{x1}{}_cBY_{4-c}^-$, $R^{x1}{}_cGaY_{4-c}^-$, $R^{x2}SO_3^-$, $(R^{x2}SO_2)_3C^-$, or $(R^{x2}SO_2)_2N^-$ are preferred. In addition, a counter anion to the cation moiety represented by the formula (c1) may be a halogen anion, and for example, fluoride ion, chloride ion, bromide ion, iodide ion, and the like are exemplified.

M represents a phosphorus atom, a boron atom, or an antimony atom. Y represents a halogen atom (preferably a fluorine atom).

Rf represents an alkyl group in which 80 mol % or more of hydrogen atoms are substituted with a fluorine atom (preferably an alkyl group having 1 or more and 8 or less carbon atoms). Examples of the alkyl group, which forms Rf by fluorine substitution, include a linear alkyl group (methyl, ethyl, propyl, butyl, pentyl, and octyl), a branched alkyl group (isopropyl, isobutyl, sec-butyl, and tert-butyl) and cycloalkyl group (cyclopropyl, cyclobutyl, cyclopentyl, and cyclohexyl), and the like. The proportion of the hydrogen atom of the alkyl group substituted with the fluorine atom in Rf is preferably 80 mol % or more, more preferably 90 mol % or more, and particularly preferably 100 mol %, based on the number of mols of the hydrogen atom originally possessed by the alkyl group. When the proportion of substitution with the fluorine atom is preferably within the above range, the photosensitivity of the sulfonium salt (Q) becomes more satisfactory. Particularly preferred Rf includes $CF_3$—, $CF_3CF_2^-$, $(CF_3)_2CF^-$, $CF_3CF_2CF_2^-$, $CF_3CF_2CF_2CF_2^-$, $(CF_3)_2CFCF_2^-$, $CF_3CF_2(CF_3)CF^-$, and $(CF_3)_3C^-$. b Rf(s) are mutually independent and may be the same or different with each other.

P represents a phosphorus atom and F represents a fluorine atom.

$R^{x1}$ represents a phenyl group in which hydrogen atoms are partially substituted with at least one element or electron withdrawing group. A halogen atom is included in examples of one element, and examples thereof include a fluorine atom, a chlorine atom, and a bromine atom. Examples of the electron withdrawing group include a trifluoromethyl group, a nitro group, and a cyano group. Among these groups, a phenyl group in which at least one hydrogen atom is substituted with a fluorine atom or a trifluoromethyl group is preferred. c $R^{x1}$(s) are mutually independent and may be the same or different with each other.

B represents a boron atom and Ga represents a gallium atom.

$R^{x2}$ represents an alkyl group having 1 or more and 20 or less carbon atoms, a fluoroalkyl group having 1 or more and 20 or less carbon atoms, or an aryl group having 6 or more and 20 or less carbon atoms, the alkyl group and the fluoroalkyl group may be linear, branched, or cyclic, and the alkyl group, the fluoroalkyl group, or the aryl group may or may not have a substituent. Examples of the substituent include a hydroxy group, an optionally substituted amino group, a nitro group, and the like. A carbon chain in the alkyl group, fluoroalkyl group, or aryl group represented by $R^{x2}$ may have a heteroatom such as an oxygen atom, a nitrogen atom, or a sulfur atom. Particularly, the carbon chain in the alkyl group or fluoroalkyl group represented by $R^{x2}$ may have a divalent functional group (e.g., an ether bond, a carbonyl bond, an ester bond, an amino bond, an amide bond, an imide bond, a sulfonyl bond, a sulfonylamide bond, a sulfonylimide bond, a urethane bond, etc.). When the alkyl group, fluoroalkyl group or aryl group represented by $R^{x2}$ has the substituent, heteroatom, or functional group, the number of the substituent, heteroatom, or functional group may be 1, or 2 or more.

S represents a sulfur atom, 0 represents an oxygen atom, C represents a carbon atom, and N represents a nitrogen atom. a represents an integer of 4 or more and 6 or less. b is preferably an integer of 1 or more and 5 or less, more preferably an integer of 2 or more and 4 or less, and particularly preferably 2 or 3. c is preferably an integer of 1 or more and 4 or less, and more preferably 4.

Examples of the anion represented by $MY_a^-$ include an anion represented by $SbF_6^-$, $PF_6^-$, or $BF_4^-$.

Examples of the anion represented by $(Rf)_bPF_{6-b}^-$ include an anion represented by $(CF_3CF_2)_2PF_4^-$, $(CF_3CF_2)_3PF_3^-$, $((CF_3)_2CF)_2PF_4^-$, $((CF_3)_2CF)_3PF_3^-$, $(CF_3CF_2CF_2)_2PF_4^-$, $(CF_3CF_2CF_2)_3PF_3^-$, $((CF_3)_2CFCF_2)_2PF_4^-$, $((CF_3)_2CFCF_2)_3PF_3^-$, $(CF_3CF_2CF_2CF_2)_2PF_4^-$, or $(CF_3CF_2CF_2CF_2)_3PF_3^-$. Among these, an anion represented by $(CF_3CF_2)_3PF_3^-$, $(CF_3CF_2CF_2)_3PF_3^-$, $((CF_3)_2CF)_3PF_3^-$, $((CF_3)_2CF)_2PF_4^-$, $((CF_3)_2CFCF_2)_3PF_3^-$, or $((CF_3)_2CFCF_2)_2PF_4^-$ is preferable.

The anion represented by $R^{x1}{}_cBY_{4-c}^-$ is preferably an anion represented by:

$$R^{x1}{}_cBY_{4-1}^-$$

wherein $R^{x1}$ represents a phenyl group in which at least a part of hydrogen atoms is/are substituted with a halogen atom or an electron withdrawing group, Y represents a halogen atom, and c represents an integer of 1 or more and 4 or less. Examples thereof include an anion represented by $(C_6F_5)_4B^-$, $((CF_3)_2C_6H_3)_4B^-$, $(CF_3C_6H_4)_4B^-$, $(C_6F_5)_2BF_2^-$, $C_6F_5BF_3^-$, or $(C_6H_3F_2)_4B^-$. Among these, an anion represented by $(C_6F_5)_4B^-$ or $((CF_3)_2C_6H_3)_4B^-$ is preferable.

Examples of an anion represented by $R^{x1}{}_cGaY_{4-c}^-$ include an anion represented by $(C_6F_5)_4Ga^-$, $((CF_3)_2C_6H_3)_4Ga^-$, $(CF_3C_6H_4)_4Ga^-$, $(C_6F_5)_2GaF_2^-$, $C_6F_5GaF_3^-$, or $(C_6H_3F_2)_4Ga^-$. Among these, an anion represented by $(C_6F_5)_4Ga^-$ or $((CF_3)_2C_6H_3)_4Ga^-$ is preferable.

Examples of the anion represented by $R^{x2}SO_3^-$ include a trifluoromethanesulfonic acid anion, a pentafluoroethanesulfonic acid anion, a heptafluoropropanesulfonic acid anion, a nonafluorobutanesulfonic acid anion, a pentafluorophenylsulfonic acid anion, a p-toluenesulfonic acid anion, a benzenesulfonic acid anion, a camphorsulfonic acid anion, a methanesulfonic acid anion, a ethanesulfonic acid anion, a propanesulfonic acid anion, and a butanesulfonic acid anion. Among these, a trifluoromethanesulfonic acid anion, a nonafluorobutanesulfonic acid anion, a methanesulfonic acid anion, a butanesulfonic acid anion, a camphorsulfonic acid anion, a benzenesulfonic acid anion, or a p-toluenesulfonic acid anion is preferable.

Examples of the anion represented by $(R^{x2}SO_2)_3C^-$ include an anion represented by $(CF_3SO_2)_3C^-$, $(C_2F_5SO_2)_3C^-$, $(C_3F_7SO_2)_3C^-$, or $C_4F_9SO_2)_3C^-$.

Examples of the anion represented by $(R^{x2}SO_2)_2N^-$ include an anion represented by $(CF_3SO_2)_2N^-$, $(C_2F_5SO_2)_2N^-$, $(C_3F_7SO_2)_2N^-$, or $C_4F_9SO_2)_2N^-$.

It is possible to use, as the monovalent polyatomic anion, in addition to an anion represented by $MY_a^-$, $(Rf)_bPF_{6-b}^-$, $R^{x1}{}_cBY_{4-c}^-$, $R^{x1}{}_cGaY_{4-c}^-$, $R^{x2}SO_3^-$ $(R^{x2}SO_2)_3C^-$, or $(R^{x2}SO_2)_2N^-$, a perhalogen acid ion ($ClO_4^-$, $BrO_4^-$, etc.), a halogenated sulfonic acid ion ($FSO_3^-$, $ClSO_3^-$, etc.), a sulfuric acid ion ($CH_3SO_4^-$, $CF_3SO_4^-$, $HSO_4^-$, etc.), a carbonic acid ion ($HCO_3^-$, $CH_3CO_3^-$, etc.), an aluminic acid ion ($AlCl_4^-$, $AlF_4^-$, etc.), a hexafluorobismuthic acid ion ($BiF_6^-$, a carboxylic acid ion ($CH_3COO^-$, $CF_3COO^-$, $C_6H_5COO$, $CH_3C_6H_4COO$, $C_6F_5COO$, $CF_3C_6H_4COO$, etc.), an arylboric acid ion ($B(C_6H_5)_4^-$, $CH_3CH_2CH_2CH_2B(C_6H_5)_3$—, etc.), a thiocyanic acid ion ($SCN^-$), and a nitric acid ion ($NO_3^-$).

Among these anions, in view of cationic polymerization property, anions represented by $MY_a^-$, $(Rf)_bPF_{6-b}^-$, $R^{x1}{}_cBY_{4-c}^-$, $R^{x1}{}_cGaY_{4-c}^-$, and $(R^{x2}SO_2)_3C^-$ are preferred, $SbF_6^-$, $PF_6^-$, $(CF_3CF_2)_3PF_3^-$, $(C_6F_5)_4B^-$, $((CF_3)_2C_6H_3)_4B^-$, $(C_6F_5)_4Ga^-$, $((CF_3)_2C_6H_3)_4Ga^-$, and $(CF_3SO_2)_3C^-$ are more preferred, and $R^{x1}{}_cBY_{4-c}^-$ is further preferred.

There is no particular limitation on a content of the thermal cationic polymerization initiator (c1a) in the curable composition, as long as curing of the curable composition satisfactory proceeds. Since the curable composition can be cured well, typically, the content of the thermal cationic polymerization initiator (c1a) is preferably 0.001 parts by mass or more and 30 parts by mass or less, more preferably 0.01 parts by mass and 15 parts by mass or less, and particularly preferably 0.1 parts by mass or more and 13 parts by mass or less relative to 100 parts by mass of the polymerizable compound (A). Alternatively, for example, the content of the thermal cationic polymerization initiator (C1a) is 0.001% by mass or more and 5% by mass or less, preferably 0.01% by mass or more and 3% by mass or less, and more preferably 0.1% by mass or more and 1% by mass or less relative to a mass of the all components other than the solvent (S).

(Thermal Radical Polymerization Initiator (C1b))

The thermal radical polymerization initiator (C1b) is not particularly limited as long as it is a compound that can generate a radical by heating to promote polymerization reactions between the radical polymerizable group-containing groups. For example, at least one selected from the group consisting of an organic peroxide, an azo compound, a benzoin compound, a benzoin ether compound, an acetophenone compound, and a benzopinacol preferably used as the thermal radical polymerization initiator (C1b).

Suitable examples of the thermal radical polymerization initiator (C1b) includes organic peroxides such as ketone peroxides (such as methylethylketone peroxide and cyclohexanone peroxide), peroxyketals (such as 2,2-bis(tert-butylperoxy)butane and 1,1-bis(tert-butylperoxy)cyclohexane), hydroperoxides (such as tert-butyl hydroperoxide and cumene hydroperoxide), dialkyl peroxides (Perbutyl (registered trademark) D (manufactured by NOF CORPORATION) and Perhexyl (registered trademark) D (manufactured by NOF CORPORATION), diacyl peroxide (such as isobutyryl peroxide, lauroyl peroxide, and benzoyl peroxide), peroxydicarbonates (such as diisopropyl peroxy dicarbonate), peroxyesters (such as tert-butylperoxy isobutylate, and 2,5-dimethyl-2,5-di(benzoyl peroxy)hexane); and azo compounds such as 1,1'-azobis(cyclohexane-1-carbonitrile), 2,2'-azobis isobutyronitrile, 2,2'-azobis(2,4-dimethyl-4-methoxyvaleronitrile), 2,2'-azobis(2-methylpropionamidine)dihydrochloride, 2,2'-azobis[2-methyl-N-(2-propenyl) propionamide]dihydrochloride, 2,2'-azobis(2-methylpropionamidine), 2,2'-azobis[2-methyl-N-(2-hydroxyethyl)propionamide], 2,2'-azobis(2-methyl propane), 2,2'-azobis(2,4,4-trimethyl pentane), and dimethyl 2,2'-azobis(2-methyl propionate).

A content of the thermal radical polymerization initiator (C1b) is preferably 0.01 parts by mass or more and 50% by mass or less, more preferably 0.1 parts by mass or more and 30 parts by mass or less, further preferably 0.3 parts by mass or more and 15 parts by mass or less, and particularly preferably 0.1 parts by mass or more and 13 parts by mass or less. Alternatively, for example, the content of the thermal radical polymerization initiator (C1b) is 0.001% by mass or more and 5% by mass or less, preferably 0.01% by mass or more and 3% by mass or less, and more preferably 0.1% by mass or more and 1% by mass or less relative to a mass of the all components other than the solvent (S). When the content of the thermal radical polymerization initiator (C1b) is in the above range, the curable composition can be cure well.

<Curing Accelerator (D)>

The curable composition may include a curing accelerator (D). When the curable composition includes the curing accelerator (D), curability of the curable composition and properties after curing are satisfactory.

Examples of the curing accelerator (D) include a urea compound, a tertiary amine and salts thereof, imidazoles and salts thereof, phosphine-based compounds and derivatives thereof, carboxylic acid metal salts, Lewis acids, Bronsted acids and salts thereof, tetraphenylboronate, and the like.

Preferred specific examples of the curing accelerator (D) include tertiary amines such as 1,8-diazabicyclo(5,4,0)undecene-7, triethylenediamine, benzyldimethylamine, triethanolamine, dimethylaminoethanol, and tris(dimethylaminomethyl)phenol; imidazoles such as 2-methylimidazole, 2-phenylimidazole, 2-phenyl-4-methylimidazole, and 2-heptadecylimidazole; phosphine-based compounds such as tributylphosphine, methyldiphenylphosphine, triphenylphosphine, diphenylphosphine, and phenylphosphine; tetraphenylphosphonium tetraphenylborate, triphenylphosphinetetraphenylborate, 2-ethyl-4-methylimidazoletetraphenylborate, and a tetraphenylboron salt of N-methylmorpholine tetraphenylborate.

Of the above-described curing accelerators (D), phosphine-based compounds and derivatives thereof, and tetraphenylboron salts are preferable. Of the above specific examples, triphenylphosphine and triphenylphosphine triphenylborane are preferable.

An amount of the curing accelerator (D) used is not particularly limited as long as the desired effect is not impaired. The amount of the curing accelerator (D) used is preferably 0.5 part by mass or more and 8 parts by mass or less, more preferably 1.5 parts by mass or more and 6 parts by mass or less, and particularly preferably 3 parts by mass or more and 4.5 parts by mass or less, based on 1 part by mass of the mass of the initiator (C).

<Other Components>

The curable composition can optionally contain additives such as surfactants, thermal polymerization inhibitors, defoamers, silane coupling agents, resins (thermoplastic resins, alkali-soluble resins, etc.), inorganic fillers other than the metal oxide microparticles (B), organic fillers, and the like. It is possible to use, as any additives, conventionally known additives. Examples of the surfactant include anionic, cationic, and nonionic compounds, examples of the thermal polymerization inhibitor include hydroquinone, hydroquinone monoethyl ether, and the like, and examples of the defoamer include silicone-based compounds, fluorine-based compounds, and the like.

<Solvent (S)>

The polymerizable composition includes a solvent (S) in order to adjust applicabity or viscosity. As the solvent (S), an organic solvent is typically used. There is no particular limitation on types of the organic solvent as long as it can uniformly dissolve or disperse components included in the curable composition.

Suitable examples of the organic solvent usable as the solvent (S) include (poly)alkylene glycol monoalkyl ethers such as ethylene glycol monomethyl ether, ethylene glycol monoethyl ether, ethylene glycol n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate; other ethers such as diethylene glycol dimethyl ether, diethylene glycol methyl ethyl ether, diethylene glycol diethyl ether, and tetrahydrofuran; ketones such as methyl ethyl ketone, cyclohexanone, 2-heptanone, and 3-heptanone; lactic acid alkyl esters such as methyl 2-hydroxypropionate and ethyl 2-hydroxypropionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxyacetate, ethyl hydroxyacetate, methyl 2-hydroxy-3-methylacetate, 3-methyl-3-methoxybutyl acetate, 3-methyl-3-methoxybutyl propionate, ethyl acetate, n-propyl acetate, isopropyl acetate, n-butyl acetate, isobutyl acetate, n-pentyl formate, isopentyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, and ethyl 2-oxobutanoate; aromatic hydrocarbons such as toluene and xylene; and amides such as N-methylpyrrolidone, N,N-dimethylformamide, and N,N-dimethylacetamide. These organic solvents can be used alone or in combination of two or more types thereof.

In the curable composition, an amount of the solvent (S) used is not particularly limited. In view of the coatability of the curable composition, for example, the amount of the solvent (S) used is preferably 30% by mass or more and 99.9% by mass or less, and more preferably 50% by mass or more and 98% by mass or less relative to the entire curable composition.

When using the curable composition including essential or optional components described above, it is possible to form a cured product having high refractive index. Therefore, the curable composition can be used for formation of a high refractive index material and a high refractive index film, which have hitherto been used in various applications. For example, when using the curable composition, it is possible to form a cured product having a refractive index of 1.70 or more, preferably 1.75 or more, more preferably 1.80 or more, still more preferably 1.85 or more, and most preferably 1.90 or more.

<<Method for Producing Curable Composition>>

A curable composition can be produced by uniformly mixing each component described above in a predetermined ratio. Examples of the mixer usable in the production of the curable composition include a two-roll mill, a three-roll mill, and the like. When the curable composition has sufficiently low viscosity, if necessary, the curable composition may be filtered using a filter having a desired hole size so as to remove insoluble foreign substances.

<<Method for Producing Cured Product>>

There is no particular limitation on a method for producing a cured product as long as it is a method capable of curing a curable composition formed into a desired shape. Specific examples of the method for producing a cured product include the steps of:

- forming the curable composition into a predetermined shape, and
- subjecting the thus formed curable composition to heating.

The shape of the molded body is not particularly limited and is preferably film since it is easy to uniformly apply heat to the molded body.

Typical examples of the method for producing a cured product as a cured film will be described below. First, in order to form the cured film, the above-described curable composition is applied onto a substrate, and then the coating film is heated to cure the coating film. The cured film is formed by above method.

The substrate is not particularly limited, and a transparent substrate such as a glass substrate or a translucent resin substrate is preferred in order to take advantage of excellent optical characteristics of the cure film to be formed such as high refractive index and high light transmittance.

Examples of the coating method include methods using a contact transfer-type coating apparatus such as a roll coater, a reverse coater, or a bar coater, or a non-contacting-type coater such as a spinner (rotary coating apparatus), a slit coater or a curtain flow coater. After adjusting the viscosity of the curable composition in an appropriate range, the curable composition may be applied by an inkjet method, or a printing method such as a screen-printing method to form a coating film with a desired pattern shape.

Then, if necessary, a volatile component such as a solvent (S) is removed to dry the coating film. Examples of the drying method include, but are not particularly limited to, a method of drying under reduced pressure at room temperature using a vacuum drying device (VCD) is exemplified. The coating film obtained as described above is heated to obtain a cured film.

Curing temperature is not particularly limited as long as curing of the curable composition proceeds well. Typically, curing temperature is preferably 100° C. or higher and 250° C. or lower. In particular, in view of superior optical reliability of the cured product obtained, curing temperature is more preferably 120° C. or higher and 175° C. or lower. In a case that a flatness of the cured film as described in Unexamined Patent Application Publication No. 2020-037190 is considered, a curing temperature is preferably 120° C. or higher and 175° C. or lower. A heating time is not particularly limited. Typically, heating time is preferably 1 minute or longer and 10 minutes or shorter, and more preferably 2 minutes or longer and 5 minutes or shorter.

The thus formed cured product, particularly cured film, is suitably used as an optical component in optical applications such as display panel applications.

EXAMPLES

The present invention will be more specifically described below by way of Examples, but the scope of the present invention is not limited to these Examples.

Examples 1 to 9 and Comparative Examples 1 to 12

In Examples and Comparative Examples, the following compounds A1 to A4 were used as the polymerizable compound (A).

A1

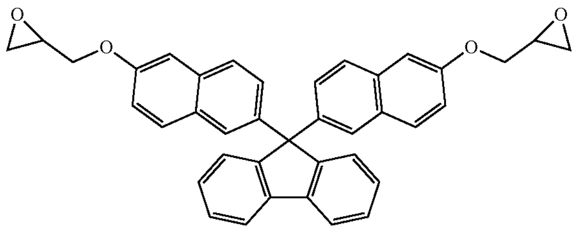

A2

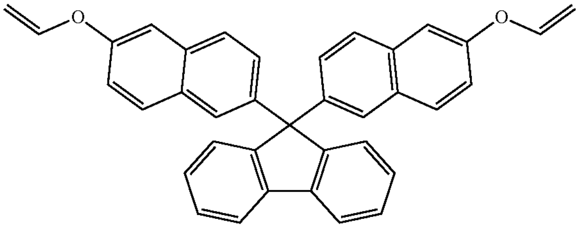

-continued

A3

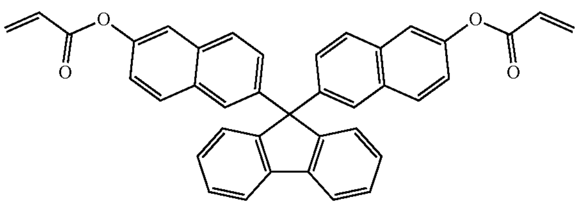

A4

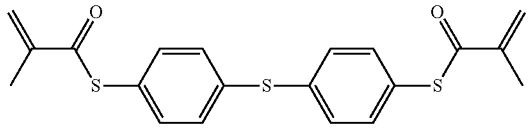

In Examples and Comparative Examples, as metal oxide microparticles (B), titanium oxide microparticles (particle diameter measured with TEM: about 7 nm) synthesized by a known hydrothermal method and capping treated by using methoxy(triethyleneoxy)propyltrimethoxysilane as a capping agent were used.

In Examples and Comparative Examples, the following initiator C1 that acts as the thermal cationic polymerization initiator (C1a), the following initiator C2 that acts as the thermal radical polymerization initiator (C1b), and the following initiator C3 that is a sulfonium salt represented by the following formula and acts as the photo initiator (C2) were used.

C1: Onium salt consisting of the cation moiety represented by the formula (c1-c1) described above and the anion moiety represented by the formula (ci-a1) described above D' is a sulfur atom.

C2: PERMEK N (manufactured by NOF CORPORATION, methylethylketone peroxide)

C3

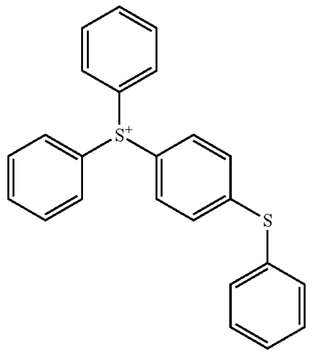

-continued

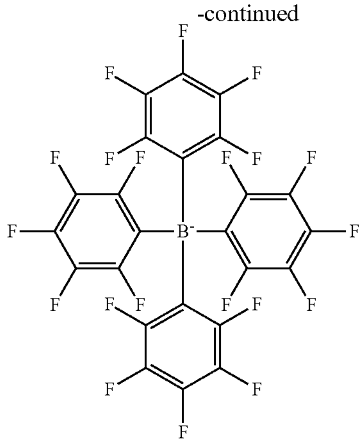

9 to 29 parts by mass of the polymerizable compound (A) of the type shown in Table 1, 70 to 90 parts by mass of the titanium oxide microparticles (B1) as the metal oxide microparticles (B), and 1 part by mass of the initiator (C) of the type shown in Table 1 were uniformly dissolve or dispersed in the solvent (S) so that the solid content was 10% by mass to obtain the cured product of each of Examples and Comparative Examples. An amount of the polymerizable compound (A) and an amount of the titanium oxide microparticles (B) were respectively parts by mass shown in Table 1. A 1:1 (mass ratio) solvent mixture of a tripropylene glycol monomethyl ether and a dipropylene glygol monomethyl ether was used as the solvent (S).

According to the following methods, measurement of the refractive index of the cured film, evaluation of the light transmittance of the cured film, evaluation of the optical reliability (heat resistance) of the cured film, and evaluation of the organic solvent resistance of the cured film were carried out using the curable compositions of the respective Examples and Comparative Examples. These measurement results and evaluation results are shown in Table 1.

<Measurement of Refractive Index>

With respect to each of Examples 1 to 9 and Comparative Examples 4 to 12, the curable composition was applied on a silicon wafer using a spin coater to form a coating film consisting of the curable composition. The coating film obtained was heated at 120° C. for two minutes to obtain a cured film with 0.2 μm film thickness. With respect to each of Comparative Examples 1 to 3, the cured film was obtained in the same manner as in Examples 1 to 9 and Comparative Example 4 to 12 except for subjecting the coating film to light exposure using a high pressure mercury lamp such that the cumulative exposure amount reached 5 $J/cm^2$ instead of heating. The refractive index of the obtained cured film was measured with rotating compensator ellipsometer manufactured by J. A. Woollam Japan Corporation, the refractive index of the cured film at wavelength of 520 nm was determined.

<Evaluation of Light Transmittance>

Light transmittance of the cured film formed in the same manner as in the same manner as in the measurement of refractive index was measured with Vista Spectrophotometer manufactured by Hunter Associates Laboratory, Inc. Based on the measured value of light transmittance, light transmittance was evaluated in accordance with the following criteria.

Very Good: 95% or higher

Good: 90% of higher and lower than 95%

Poor: Less than 90%

<Evaluation of Optical Reliability (Heat Resistance)>

The cured film formed in the same manner as in the same manner as in the measurement of refractive index was further heated at 175° C. for two minutes, and thereafter light transmittance was measured with Vista Spectrophotometer manufactured by Hunter Associates Laboratory, Inc. The optical reliability (heat resistance) was evaluated based on the measured value of light transmittance of the heated cured film in accordance with the following criteria.

Very Good: 95% or higher

Good: 90% of higher and lower than 95%

Poor: Less than 90% measured values of W1 and W2. In the following expression, W0 is a mass of the silicon wafer.

$$\text{Ratio of residual film (\% by mass)}=(W2-W0)/(W1-W0)\times 100$$

The organic solvent resistance was evaluated based on the calculated value of the ratio of residual film in accordance with the following criteria.

Very Good: 95% or higher

Good: 90% or higher and lower than 95%

Poor: Lower than 90%

TABLE 1

| | Polymerizable compound (A) | $TiO_2$ microparticles (B1) | | Initiator (C) | | | | | | Organic |
|---|---|---|---|---|---|---|---|---|---|---|
| | Type/ Parts by mass | % by mass *1 | Parts by mass | Type/Parts by mass | Property | Exposure | Reflactive index | Light transmittance | Optical reliability | solvent resistance |
| Ex. 1 | A1/9 | 90 | 90 | C1/1 | Thermo-sensitive | Not exposed | 2.05 | Very Good | Very Good | Very Good |
| Ex. 2 | A1/19 | 80 | 80 | C1/1 | Thermo-sensitive | Not exposed | 1.95 | Good | Good | Very Good |
| Ex. 3 | A1/29 | 70 | 70 | C1/1 | Thermo-sensitive | Not exposed | 1.85 | Good | Good | Very Good |
| Ex. 4 | A2/9 | 90 | 90 | C1/1 | Thermo-sensitive | Not exposed | 2.05 | Very Good | Very Good | Very Good |
| Ex. 5 | A2/19 | 80 | 80 | C1/1 | Thermo-sensitive | Not exposed | 1.95 | Good | Good | Very Good |
| Ex. 6 | A2/29 | 70 | 70 | C1/1 | Thermo-sensitive | Not exposed | 1.85 | Good | Good | Very Good |
| Ex. 7 | A3/9 | 90 | 90 | C2/1 | Thermo-sensitive | Not exposed | 2.05 | Very Good | Very Good | Very Good |
| Ex. 8 | A3/19 | 80 | 80 | C2/1 | Thermo-sensitive | Not exposed | 1.95 | Good | Good | Very Good |
| Ex. 9 | A3/29 | 70 | 70 | C2/1 | Thermo-sensitive | Not exposed | 1.85 | Good | Good | Very Good |
| Comp. Ex. 1 | A2/9 | 90 | 90 | C3/1 | Photo-sensitive | Exposed | 2.05 | Very Good | Poor | Very Good |
| Comp. Ex. 2 | A2/19 | 80 | 80 | C3/1 | Photo-sensitive | Exposed | 1.95 | Good | Poor | Very Good |
| Comp. Ex. 3 | A2/29 | 70 | 70 | C3/1 | Photo-sensitive | Exposed | 1.85 | Good | Poor | Very Good |
| Comp. Ex. 4 | A2/9 | 90 | 90 | C3/1 | Photo-sensitive | Not exposed | 2.05 | Very Good | Very Good | Poor |
| Comp. Ex. 5 | A2/19 | 80 | 80 | C3/1 | Photo-sensitive | Not exposed | 1.95 | Good | Good | Poor |
| Comp. Ex. 6 | A2/29 | 70 | 70 | C3/1 | Photo-sensitive | Not exposed | 1.85 | Good | Good | Poor |
| Comp. Ex. 7 | A4/9 | 90 | 90 | C2/1 | Thermo-sensitive | Not exposed | 2.05 | Poor | Poor | Poor |
| Comp. Ex. 8 | A4/19 | 80 | 80 | C2/1 | Thermo-sensitive | Not exposed | 1.95 | Poor | Poor | Poor |
| Comp. Ex. 9 | A4/29 | 70 | 70 | C2/1 | Thermo-sensitive | Not exposed | 1.85 | Poor | Poor | Poor |
| Comp. Ex. 10 | A4/9 | 90 | 90 | C1/1 | Thermo-sensitive | Not exposed | 2.05 | Good | Good | Poor |
| Comp. Ex. 11 | A4/19 | 80 | 80 | C1/1 | Thermo-sensitive | Not exposed | 1.95 | Poor | Poor | Poor |
| Comp. Ex. 12 | A4/29 | 70 | 70 | C1/1 | Thermo-sensitive | Not exposed | 1.85 | Poor | Poor | Poor |

*1: Ratio of the mass of the $TiO_2$ microparticles (B1) to the mass of the solid content of the curable composition.

<Evaluation of Organic Solvent Resistance>

Cured film was formed on a silicon wafer in the same manner as in the measurement of refractive index. Mass W1 of the silicon substrate with the cured film was measured. The silicon substrate with the cured film was soaked in propyleneglycol monomethyl ether acetate (PGMEA) for two minutes at room temperature. Soaked wafer was dried, and thereafter mass W2 of the silicon substrate with the cured film was measured. According to the following expression, the ratio of residual film was calculated by using According to Examples 1 to 9, when the curable composition including the aforementioned polymerizable fluorene compound (A1) as the polymerizable compound (A), the titanium oxide microparticles as the metal oxide microparticles (B), the thermal initiator (C1) as the initiator (C), and the solvent (S) is used, it can be seen that the cured product having a high transparency, a resistance to loss of transparency when heated, and an excellent organic solvent resistance can be formed. On the other hand, when the curable composition of Comparative Examples 1 to 12 not including the aforementioned polymerizable fluorene compound (A1)

as the polymerizable compound (A) or not including the thermal initiator (C1) as the initiator (C) is used, the cured product having a high transparency, a resistance to loss of transparency when heated, and an excellent organic solvent resistance can not be formed.

What is claimed is:

1. A curable composition comprising a polymerizable compound (A), metal oxide microparticles (B), an initiator (C) and a solvent(S), wherein the polymerizable compound (A) comprises a polymerizable fluorene compound (A1) comprising a fluorene skeleton and a radical polymerizable group-containing group or a cationic polymerizable group-containing group, wherein the metal oxide microparticles (B) comprise titanium oxide microparticles (B1), wherein when the polymerizable fluorene compound (A1) has the cationic polymerizable group-containing group, the initiator (C) comprises a thermal cation initiator (C1a), which comprises an onium salt, which has a cation represented by formula (c1) and a gallium-containing anion represented by formula (ci)

$$R^{c02}\text{-}D\text{+-}(R^{c01})_u \quad (c1),$$

wherein in the formula (c1), $R^{c01}$ is a monovalent organic group, D is S, Se, N, I, or P, $R^{c02}$ is an optionally substituted alkyl group or an optionally substituted aralkyl group, provided that when $R^{c02}$ is an optionally substituted alkyl group, at least one of $R^{c01}$(s) is an optionally substituted alkyl group, u is an integer of 1 or more and 3 or less, a plurality of $R^{c01}$ may be the same as or different from each other, or may be bonded to form a ring together with D, (ci)

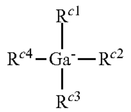

wherein in the formula (ci), $R^{c1}$, $R^{c2}$, $R^{c3}$, and $R^{c4}$ are each independently an optionally substituted hydrocarbon group or an optionally substituted heterocyclic group, and at least one of $R^{c1}$, $R^{c2}$, $R^{c3}$, and $R^{c4}$ is an optionally substituted aromatic hydrocarbon group, and wherein when the polymerizable fluorene compound (A1) has the radical polymerizable group-containing group, the initiator comprises a thermal radical initiator (C1b), which is at least one type selected from the group consisting of an organic peroxide, an azo compound, a benzoin compound, a benzoin ether compound, an acetophenone compound, and a benzopinacol.

2. The curable composition according to claim 1, wherein the curable composition comprises 90% by mass or more of the titanium oxide microparticles (B1) relative to a mass of the curable composition excluding a mass of the solvent(S).

3. The curable composition according to claim 1, wherein the polymerizable fluorene compound (A1) is a compound represented by a following formula (a1):

(a1)

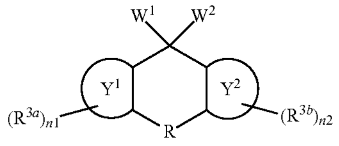

wherein $W^1$ and $W^2$ each independently represent a group represented by the following formula (a2):

(a2)

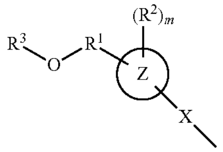

wherein a ring Z represents an aromatic hydrocarbon ring, X represents a single bond or a group represented by —S—, $R^1$ represents a single bond, an alkylene group having 1 or more and 4 or less carbon atoms, or an alkyleneoxy group having 1 or more and 4 or less carbon atoms, and when $R^1$ is an alkyleneoxy group, the oxygen atom in the alkyleneoxy group 1 is bonded with a ring Z, $R^2$ represents a monovalent hydrocarbon group, a hydroxy group, a group represented by —$OR^{4a}$, a group represented by —$SR^{4b}$ an acyl group, an alkoxycarbonyl group, a halogen atom, a nitro group, a cyano group, a mercapto group, a carboxy group, an amino group, a carbamoyl group, a group represented by —$NHR^{4c}$, a group represented by —$N(R^{4d})_2$, a sulfo group, or a group in which at least a part of hydrogen atoms bonded to the carbon atom included in a monovalent hydrocarbon group, a group represented by —$OR^{4a}$, a group represented by —$SR^{4b}$, an acyl group, an alkoxycarbonyl group, a group represented by —$NHR^{4c}$, or a group represented by —$N(R^{4d})_2$, is/are substituted with a monovalent hydrocarbon group, a hydroxy group, a group represented by —$OR^{4a}$, a group represented by —$SR^{4b}$, an acyl group, an alkoxycarbonyl group, a halogen atom, a nitro group, a cyano group, a mercapto group, a carboxyl group, an amino group, a carbamoyl group, a group represented by —$NHR^{4c}$, a group represented by —$N(R^{4d})_2$, a mesyloxy group, or a sulfo group, $R^{4a}$ to $R^{4d}$ independently represent a monovalent hydrocarbon group, m represents an integer of 0 or more, $R^3$ represents a hydrogen atom, a vinyl group, a thiiran-2-ylmethyl group, a glycidyl group, or a (meth)acryloyl group, both $W^1$ and $W^2$ do not have a hydrogen atom as $R^3$, a ring $Y^1$ and a ring $Y^2$ represent the same or different aromatic hydrocarbon ring, R represents a single bond, an optionally substituted methylene group, an ethylene group which is optionally substituent and includes a heteroatom between two carbon atoms, a group represented by —O—, a group represented by —NH—, or a group represented by —S—, $R^{3a}$ and $R^{3b}$ independently represent a cyano group, a halogen atom, or a monovalent hydrocarbon group, and n1 and n2 independently represent an integer of 0 or more and 4 or less.

4. The curable composition according to claim 3, wherein $W^1$ and $W^2$ each comprises a naphthalene ring as the ring Z.

5. The curable composition according to claim 1, wherein the polymerizable fluorene compound (A1) has the cationic polymerizable group-containing group.

6. The curable composition according to claim 1, wherein the polymerizable fluorene compound (A1) has a radical polymerizable group-containing group.

7. A cured product comprising the curable composition according to claim 1.

8. A method for producing a cured film comprising:

forming a coating film by applying the curable composition according to claim 1 onto a substrate; and heating the coating film.

* * * * *